United States Patent
Rollins, III

(10) Patent No.: US 7,131,259 B2
(45) Date of Patent: Nov. 7, 2006

(54) HIGH DENSITY COMBINED CYCLE POWER PLANT PROCESS

(76) Inventor: William S. Rollins, III, 11 W. Lull Pl., New Boston, NH (US) 03070

( * ) Notice: Subject to any disclaimer, the term of this patent is extended or adjusted under 35 U.S.C. 154(b) by 141 days.

(21) Appl. No.: 10/946,347

(22) Filed: Sep. 21, 2004

(65) Prior Publication Data
US 2005/0150230 A1 Jul. 14, 2005

Related U.S. Application Data

(60) Continuation of application No. 10/301,005, filed on Nov. 21, 2002, now Pat. No. 6,792,759, which is a division of application No. 09/783,693, filed on Feb. 14, 2001, now Pat. No. 6,494,045, which is a division of application No. 09/359,813, filed on Jul. 23, 1999, now Pat. No. 6,230,480, application No. 10/946,347, which is a continuation of application No. 10/642,717, filed on Aug. 18, 2003, which is a division of application No. 09/763,920, filed as application No. PCT/US99/19350 on Aug. 24, 1999, now Pat. No. 6,606,848.

(60) Provisional application No. 60/125,576, filed on Mar. 23, 1999, provisional application No. 60/098,468, filed on Aug. 31, 1998.

(51) Int. Cl.
*F02C 6/18* (2006.01)

(52) U.S. Cl. .................................................. 60/39.182

(58) Field of Classification Search ............. 60/39.182; 122/7 R, 7 B
See application file for complete search history.

(56) References Cited

U.S. PATENT DOCUMENTS 3,304,712 A 2/1967 Pacault et al.

(Continued)

FOREIGN PATENT DOCUMENTS

GB 2117056 10/1983

(Continued)

OTHER PUBLICATIONS

James S. Wright, General Electric Company (GE) Power Systems "Steam Turbine Cycle Optimization. Evaluation and Performance Testing Considerations" GE Power Systems, Building 2. Room 115R One River Road, Schenectady, NY 12345 (GE Reference GER-3642 E, 1996).

(Continued)

*Primary Examiner*—Louis J. Casaregola
(74) *Attorney, Agent, or Firm*—Grossman, Tucker, Perreault & Pfleger PLLC

(57) ABSTRACT

A process for increasing the specific output of a combined cycle power plant and providing flexibility in the power plant rating, both without a commensurate increase in the plant heat rate, is disclosed. The present invention demonstrates that the process of upgrading thermal efficiencies of combined cycles can often be accomplished through the strategic use of additional fuel and/or heat input. In particular, gas turbines that exhaust into HRSGs, can be supplementally fired to obtain much higher steam turbine outputs and greater overall plant ratings, but without a penalty on efficiency. This method by and large defines a high efficiency combined cycle power plant that is predominantly a Rankine (bottoming) cycle. Exemplary embodiments of the present invention include a load driven by a topping cycle engine, powered by a topping cycle fluid which exhausts into a heat recovery device.

7 Claims, 55 Drawing Sheets

*PREFERRED EMBODIMENT 725 MW COMBINED CYCLE*

U.S. PATENT DOCUMENTS

| | | | |
|---|---|---|---|
| 3,505,811 A | | 4/1970 | Underwood |
| 3,675,426 A | | 7/1972 | Vidal et al. |
| 3,841,270 A | | 10/1974 | Sokolowski |
| 3,841,271 A | | 10/1974 | Harris, Jr. et al. ............ 122/32 |
| 3,879,616 A | | 4/1975 | Baker et al. |
| 3,930,367 A | | 1/1976 | Gasparoli |
| 4,201,924 A | | 5/1980 | Uram |
| 4,253,300 A | | 3/1981 | Willyoung |
| 4,333,310 A | | 6/1982 | Uram |
| 4,578,944 A | | 4/1986 | Martens et al. |
| 4,627,386 A | | 12/1986 | Duffy et al. |
| 4,896,496 A | | 1/1990 | Zervos |
| 5,109,665 A | * | 5/1992 | Hoizumi et al. ......... 60/39.182 |
| 5,269,130 A | | 12/1993 | Finckh et al. |
| 5,369,950 A | | 12/1994 | Bruckner et al. |
| 5,375,410 A | | 12/1994 | Briesch et al. |
| 5,379,588 A | * | 1/1995 | Tomlinson et al. ...... 60/39.182 |
| 5,428,950 A | | 7/1995 | Tomlinson |
| 5,442,908 A | | 8/1995 | Briesch et al. |
| 5,628,183 A | | 5/1997 | Rice |
| 5,642,614 A | | 7/1997 | Bozzuto et al. |
| 5,647,199 A | | 7/1997 | Smith |
| 5,649,416 A | | 7/1997 | Moore |
| 5,669,220 A | | 9/1997 | Rachid |
| 5,724,807 A | | 3/1998 | Schuetzenduebel et al. |
| 5,790,420 A | | 8/1998 | Lang |

FOREIGN PATENT DOCUMENTS

| | | |
|---|---|---|
| JP | 10037716 | 10/1998 |

OTHER PUBLICATIONS

John K. Reinker, Paul B. Mason. General Electric Company (GE) Power Systems "Steam Turbines for Large Power Applications" GE Power Systems. Building 2. Room 115B, One River Road. Schenectady, NY 12345 (GE Reference GER-3646 D, 1996).

Frank J. Brooks, General Electric Company (GE) Power Systems "GE Heavy-Duty Gas Turbine Performance Characteristics" GE Power Systems, Building 2. Room 115 B. One River Road, Schenectady, NY 12345 (GE Reference GER-3567G, 1996).

David L. Chase Leroy O. Tomlinson, Thomas L. Davidson, Raub W. Smith, Chris E. Maslak General Electric Company (GE) Power Systems. "GE Combined-Cycle Product Line and Performance". Table 14 GE Power Systems. Building 2. Room 115B. One River Road. Schenectady, NY 12345 (GE Reference GER-3574F, 1996).

M. Boss, General Electric Company (GE) Power Systems "Stream Turbines for STAG(TM) Combined Cycle Power Systems" GE Power Systems, Building 2. Room 115B. One River Road. Schenectady, NY 12345 (GE Reference GER-3582E, 1996).

Klaus M. Retzlaff. W. Anthony Ruegger. General Electric Company (GE) Power Systems "Steam Turbines for Ultrasupercritical Power Plants" GE Power Systems, Building 2. Room 115B, One River Road, Schenectady, NY 12345 (GE Reference GER-3945, 1996).

Carolann Giovando. "Explore Opportunities from Today's Steam Turbine", http://www.powermag.com Power Magazine, vol. 142, No. 4 (ISSN 0032-5929, Jul./Aug. 1998, pp. 28-39).

"Dash for Gas Turbines: Prudent Planning or Speculative Bubble?", http://www.powermag.com Power Magazine, vol. 143, No. 2 (ISSN 0032-5929, Mar./Apr. 1999, pp. 13-15).

"Combined Cycle Plant Specifications" International Turbomachinery Handbook 97 Turbomachinery Publications. vol. 38, No. 6 (ISSN 0149-4147, 1997, pp. 140-147).

Energy Information Administration. Office of Integrated Analysis and Forecasting U.S. Department of Energy, Washington. D.C. 20585 "Electricity Prices in a Competitive Environment: Marginal Cost Pricing of Generation Services and Financial Status of Electric Utilities—A Preliminary Analysis Through 2015" U.S. Department of Energy document DOE/ELA-9614. Distribution Category UC-950, Aug. 1997.

Energy Information Administration. Office of Coal. Nuclear. Electric and Alternate Fuels U.S. Department of Energy. Washington. D.C. 20585-0650 "Electric Power Annual 1997—vol. II" U.S. Department of Energy document DOE/EIA-0348(97)/2. Distribution Category UC-950. Oct. 1998.

Jonathan S. Martel "Environmental 'New Source' Scrutiny" The National Law Journal, p. B6, Aug. 23, 1999.

John D. Mountford and Ricardo R. Austria "Keeping the Lights On!" IEEE Spectrum, pp. 34-39, (ISSN 0018-9235, Jun. 1999).

Carson W. Taylor "Improving Grid Behavior" IEEE Spectrum, pp. 40-45, (ISSN 0018-9235, Jun. 1999).

David A. Jones & Ronald L. Skelton "The Next Threat to Grid Reliability—Data Security" IEEE Spectrum, pp. 46-48, (ISSN 0018-9235, Jun. 1999).

William Sweet & Elizabeth A. Bretz. "Toward Carbon-Free Energy", IEEE Spectrum Magazine, vol. 36, No. 11. pp. 28-33 (ISSN 0018-9235. www.spectrum.ieee.org. Nov. 1999).

Marlowe Hood & William Sweet. "Energy Policy and Politics in China", IEEE Spectrum Magazine. vol. 36. No. 11, pp. 34-38 (ISSN 0018-9235. www.spectrum.ieee.org. Nov. 1999).

William Sweet & Marlowe Hood, "Can China Consume Less Coal?", IEEE Spectrum Magazine. vol. 36. No. 11, pp. 39-47 (ISSN 0018-9235. www.spectrum.ieee.org. Nov. 1999).

Elizabeth A. Bretz & Vir Singh. "India's Power Struggles". IEEE Spectrum Magazine. vol. 36. No. 11, pp. 47-56 (ISSN 0018-9235. www.spectrum.ieee.org. Nov. 1999).

Susan E. Avery, "The Electricity Market—Competition Brings More Options", Plants Sites & Parks Magazine. pp. 20-24 (Aug./Sep. 1999).

Copy of Indian Examination Report received in corresponding Indian Application No. IN/PCT/2001/214/DEL, 1 pg.

\* cited by examiner

Rankine Cycle Comparison

| Option | Description | Inlet Press psia | Inlet Temp Degrees F | Reheat Press psia | Reheat Temp Degrees F | Exhaust Pressure psia | First Extract Flow % | Second Extract Flow % | Output BTU/lbm | Input BTU/lbm | Efficiency % | Efficiency Improvement % |
|---|---|---|---|---|---|---|---|---|---|---|---|---|
| 1 | Simple, No Reheat, No FWH | 1800 | 1050 | N/A | N/A | 0.5894 | N/A | N/A | 586.7 | 1458.5 | 40.23% | Base |
| 2 | Reheat, No FWH | 1800 | 1050 | 480.0 | 1050 | 0.5894 | N/A | N/A | 692.3 | 1642.4 | 42.15% | 4.79% |
| 3 | Reheat, No FWH, Higher Press | 2400 | 1050 | 640.0 | 1050 | 0.5894 | N/A | N/A | 701.0 | 1633.9 | 42.90% | 6.65% |
| 4 | Reheat, With FWH | 1800 | 1050 | 480.0 | 1050 | 0.5894 | 21.76 | 8.11 | 550.9 | 1257.1 | 43.82% | 8.93% |
| 5 | Reheat, With FWH, Higher Pressure | 2400 | 1050 | 640.0 | 1050 | 0.5894 | 24.81 | 7.95 | 539.1 | 1214.3 | 44.39% | 10.35% |
| 6 | Supercritical, Double Reheat, No FWH | 3860 | 1070 | 1029.0 | 1112 | 0.5894 | N/A | N/A | 850.5 | 1866.0 | 45.58% | 13.30% |
| 7 | Supercritical, Double Reheat, With FWH | 3860 | 1070 | 1029.0 | 1112 | 0.5894 | 8.72 | 14.12 | 731.8 | 1564.4 | 46.78% | 16.28% |

CONVENTIONAL COMBINED CYCLE
PRIOR ART

Industry Standard GE Model PG7241FA GT Power Curve

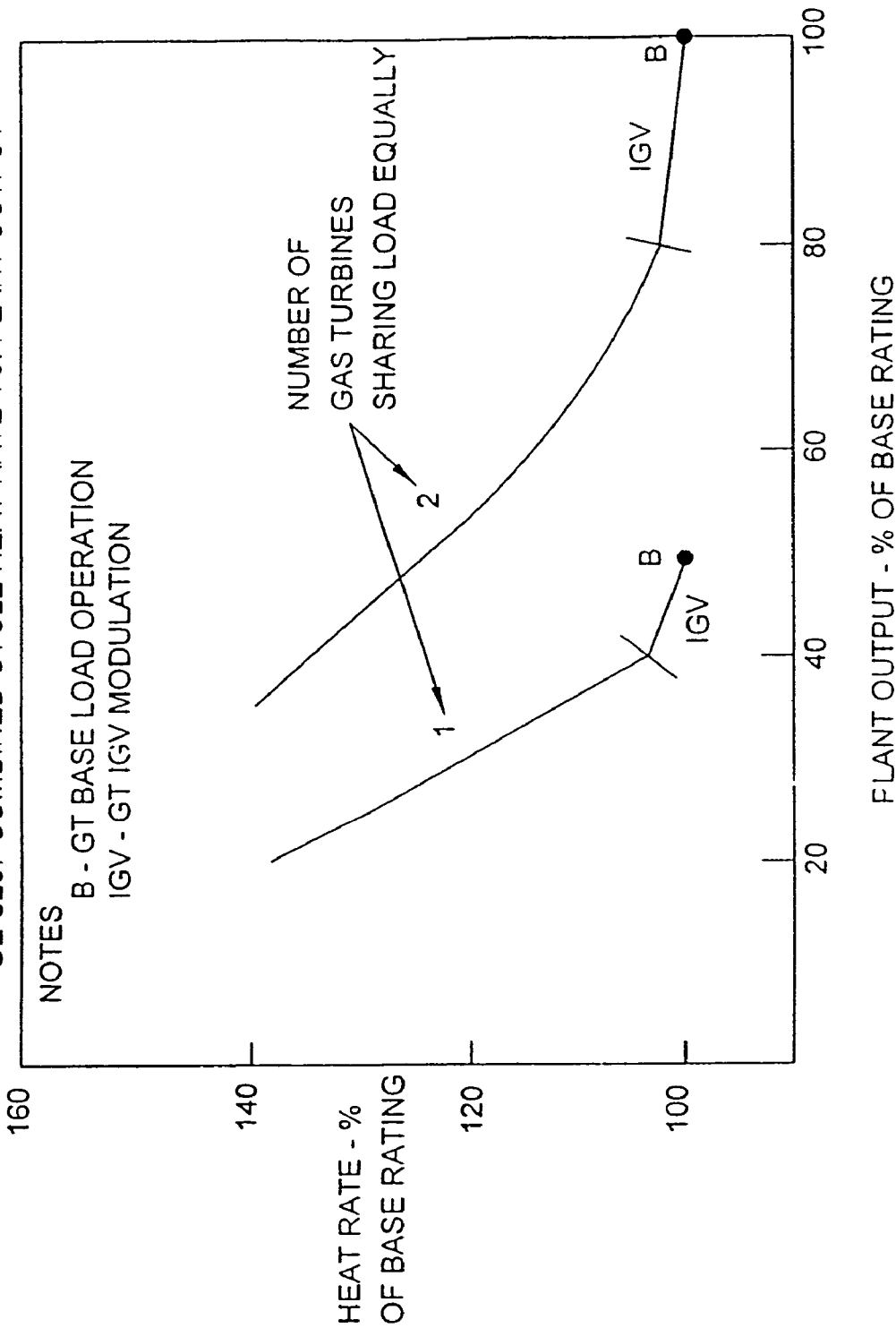

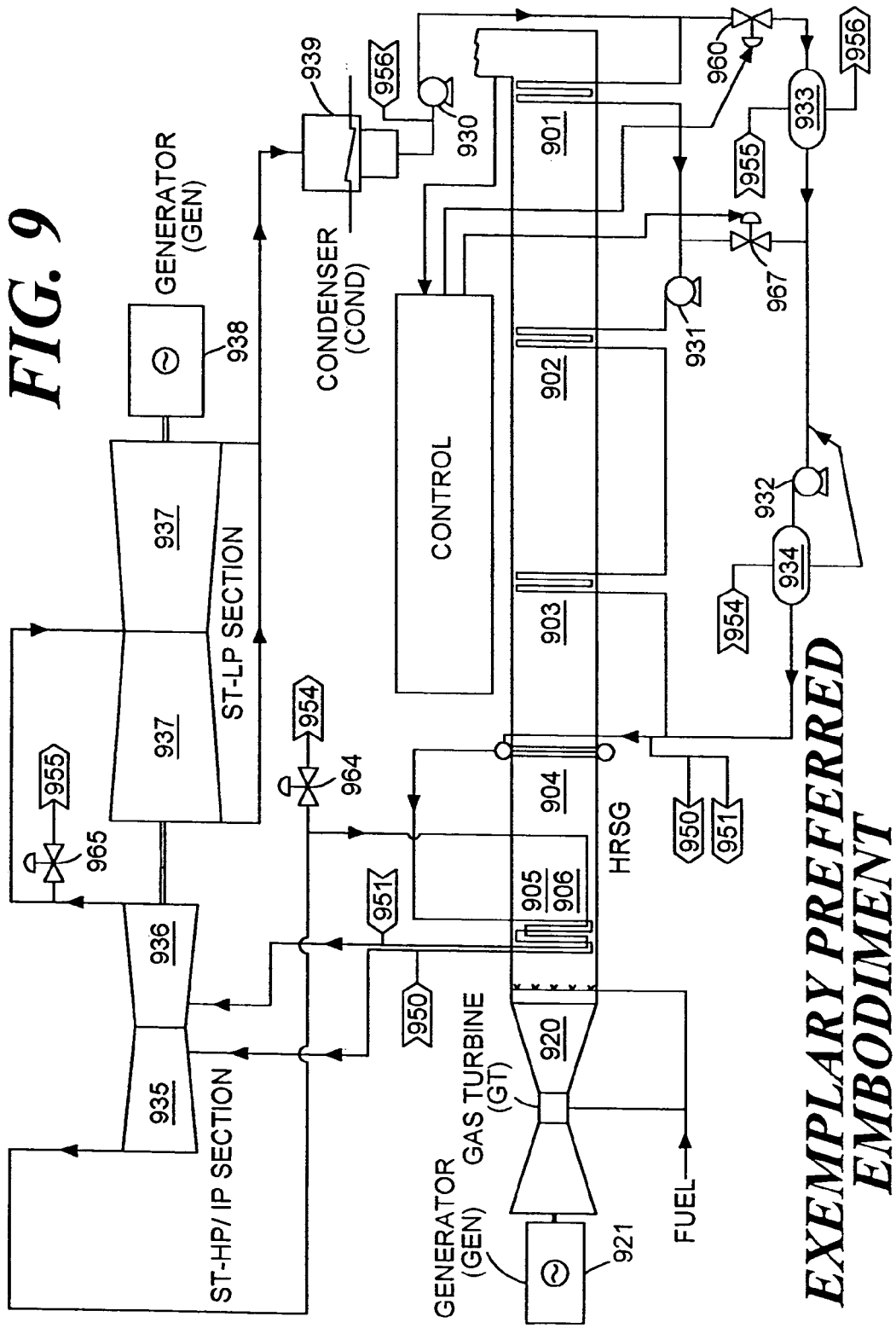

FIG. 10

Energy Flow Analysis Comparison

| Option | GT Output (GTO) % of GTI | GT Loss (GTL) % of GTI | Supp Fire (SFE) % of GTI | HRSG Input (HGI) % of GTI | Exh Loss (HGE) % of GTI | HRSGL (HGL) % of GTI | HRSG Stm (HGS) % of GTI | SC Eff (SCE) % | Aux (AXF) Factor | STG Eff (1-SGL) % | ST Out (STO) % of GTI | Plant Eff (CCE) % | HR-LHV (PHR) BTU/kW |
|---|---|---|---|---|---|---|---|---|---|---|---|---|---|
| Prior Art | 32.31% | 11.48% | 0.00% | 56.21% | 6.04% | 0.50% | 49.67% | 38.78% | 97.50% | 99.00% | 18.59% | 50.90% | 6040 |
| Example | 32.31% | 11.48% | 31.78% | 87.99% | 6.04% | 0.82% | 81.13% | 44.39% | 97.50% | 99.00% | 34.76% | 50.90% | 6041 |
| SuperCrit | 32.31% | 11.48% | 42.48% | 98.69% | 6.04% | 0.93% | 91.72% | 46.78% | 97.50% | 99.00% | 41.42% | 51.75% | 5942 |

| Symbol | Description |
|---|---|
| GTI | GT Input Energy |
| GTO | GT Generator Electrical Output |
| GTL | GT Losses for heat, auxiliaries, generator efficiency |
| SFE | Energy added through supplemental firing |
| HGI | GT exhaust energy at inlet to HRSG |
| HGE | Energy exhausted to atmosphere at HRSG outlet |
| HGL | HRSG heat loss to ambient |
| HGS | Energy in HRSG transferred to steam |
| SCE | Steam cycle basic efficiency |
| AXF | Factor to account for auxiliary loads in steam cycle |
| SGL | Steam Turbine generator losses |
| STO | Steam turbine generator electrical output |
| CCE | Combined Cycle plant efficiency |
| PHR | Overall plant heat rate base on LHV of natural gas |

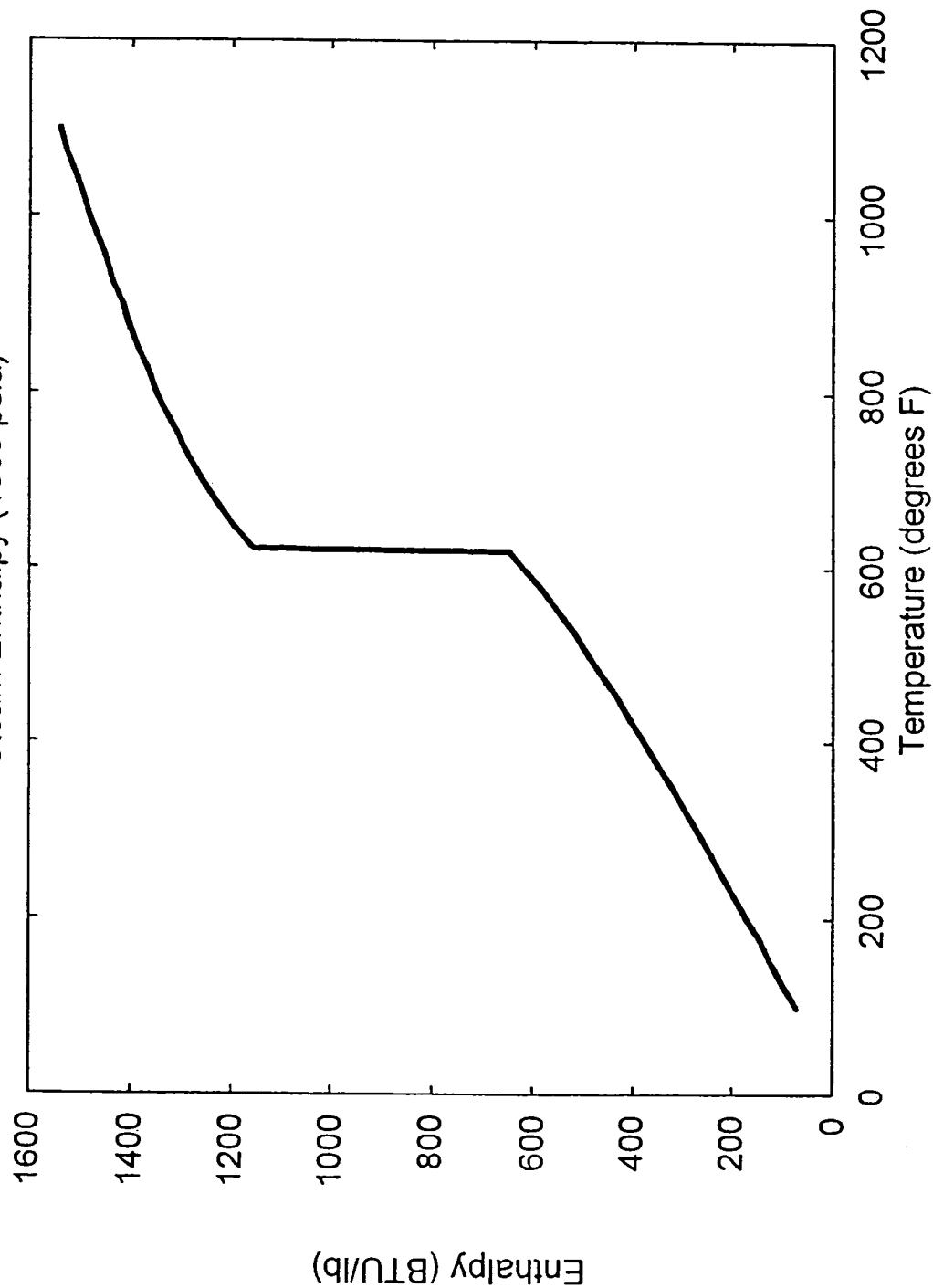

Gas Turbine (GT) Exhaust Gas Enthalpy

GENERIC EXEMPLARY PREFERRED EMBODIMENT

Superheater and Reheater Required LMTDs vs. Flow

Valve/Pump Numbers Refer to FIG. 9

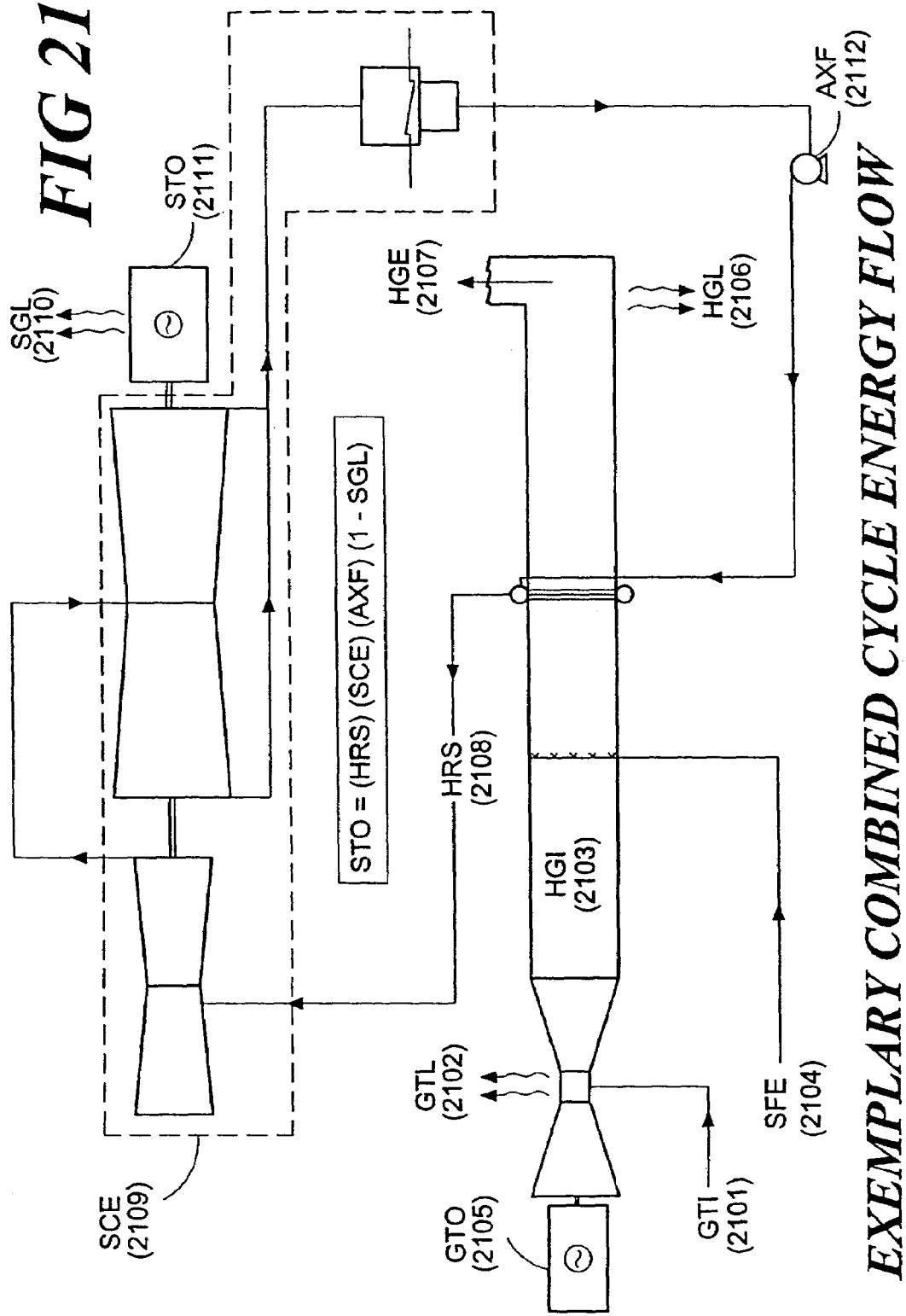

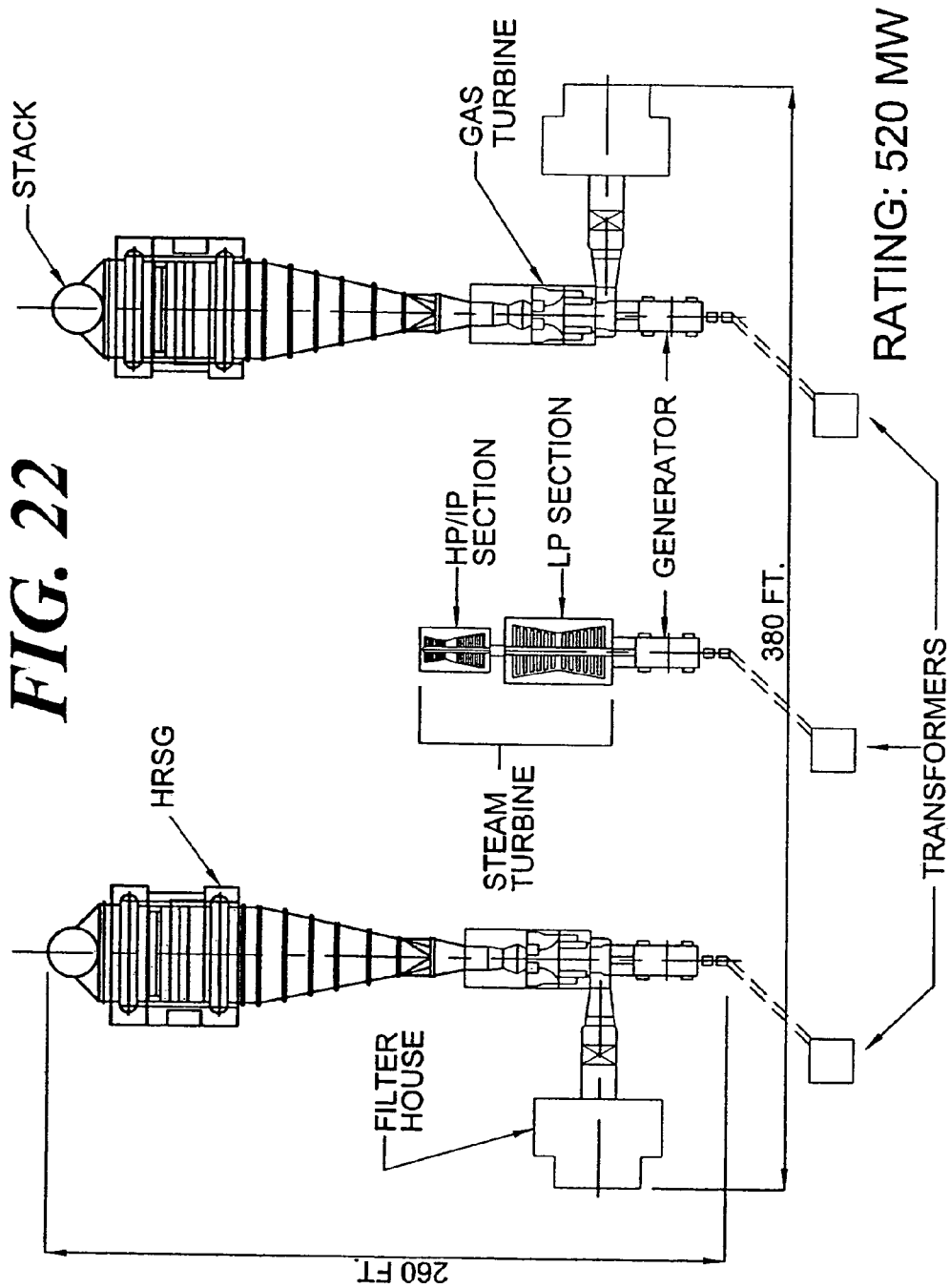

FIG. 23A

GE S207FA Combined Cycle Power Plant
ISO Capacity – 521.6 MW

| Major Equipment | | | |
|---|---|---|---|
| Qty | Equipment | MW | Total MW |
| 2 | GE Model 7241 FA Gas Turbines | 168.8 | 337.6 |
| 1 | GE 1800 psig steam turbine | 190.0 | 190.0 |
| 2 | HRSGs, three pressure levels | | |
| 1 | Auxiliary equipment (BFPs, circulation pumps, etc.) | -6.0 | -6.0 |
| | Net Plant Output | 521.6 | MW |

| Plant Operation Profile | |
|---|---|
| Hours per Week @ Peak Power | 20 |
| Peak Power Heat Rate Correction | 1.00 |
| % of Peak Power | 1.00 |
| Hours per Week @ Intermediate Power Level | 71 |
| Intermediate Power Heat Rate Correction | 1.02 |
| % of Peak Power | 0.80 |
| Hours per Week @ Night Power Level | 77 |
| Night Power Heat Rate Correction | 1.19 |
| % of Peak Power | 0.60 |

| Plant Performance | | |
|---|---|---|
| Plant heat rate at full load | 6040 | BTU/kWh LHV |
| Natural gas fuel ratio HHV/LLV | 1.11 | |
| Plant Capacity Factor | 73.21 | % |
| Heat Rate Correction Factor for Off Peak Operation | 1.0806 | |
| Plant Availability | 8500 | hours/yr |
| Average Natural Gas Cost | $3.00 | per MMBTU |
| Annual Electric Production | 3,246,028,571 | kWh |
| Annual Fuel Consumption | 23,516,781 | MMBTU |
| Annual Fuel Cost | $70,550,343 | |

FIG. 23B

GE S207FA Combined Cycle Power Plant
ISO Capacity – 521.6 MW

| Plant Capital Costs | | |
|---|---:|---|
| Average Installed Cost | $425 | $/kW |
| Total Plant Cost | $221,680,000 | |
| Interest Rate | 8.00% | |
| Finance Period | 20 | years |
| Annual Loan Payment (12 monthly installments) | $22,250,644 | |

| Plant Maintenance | | |
|---|---:|---|
| GT Maintenance Cost | $0.0025 | per kWh |
| ST Maintenance Cost | $0.0005 | per kWh |
| Average Maintenance Cost | $0.0018 | per kWh |
| Annual Maintenance Cost | $5,777,143 | |

| Net Costs per kWh | |
|---|---:|
| Fuel Cost | $0.0217 |
| Capital Cost | $0.0069 |
| Maintenance Cost | $0.0018 |
| Total Fuel, Capital, and Maintenance Costs | $0.0304 |

| NOx Emissions | | |
|---|---:|---|
| Peak Power Exhaust Flow per Gas Turbine | 3,542,000 | lb/hr |
| Peak Power NOx Levels | 9 | ppm |
| Peak Power Exhaust Flow | 100.00% | |
| Intermediate Power NOx Levels | 9 | ppm |
| Intermediate Power Exhaust Flow | 85.00% | |
| Night Power NOx Levels | 9 | ppm |
| Night Power Exhaust Flow | 73.00% | |
| Expected Emissions (No aftertreatment) | 352.41 | tons/yr |
| Expected Emissions (90% Efficient SCR) | 35.24 | tons/yr |

WESTINGHOUSE 2X1 501G COMBINED-CYCLE PLANT

FIG. 25A

Westinghouse 2X1 501G Combined Cycle Power Plant
ISO Capacity – 715.5 MW

| Major Equipment | | | |
|---|---|---|---|
| Qty | Equipment | MW | Total MW |
| 2 | Westinghouse Model 501G Gas Turbines | 239.4 | 478.8 |
| 1 | Westinghouse 1800 psig steam turbine | 244.7 | 244.7 |
| 2 | HRSGs, three pressure levels | | |
| 1 | Auxiliary equipment (BFPs, circulation pumps, etc.) | -8.0 | -8.0 |
| | Net Plant Output | 715.5 | MW |

| Plant Operation Profile | |
|---|---|
| Hours per Week @ Peak Power | 20 |
| Peak Power Heat Rate Correction | 1.00 |
| % of Peak Power | 1.00 |
| Hours per Week @ Intermediate Power Level | 71 |
| Intermediate Power Heat Rate Correction | 1.02 |
| % of Peak Power | 0.80 |
| Hours per Week @ Night Power Level | 77 |
| Night Power Heat Rate Correction | 1.19 |
| % of Peak Power | 0.60 |

| Plant Performance | | |
|---|---|---|
| Plant heat rate at full load | 5830 | BTU/kWh LHV |
| Natural gas fuel ratio HHV/LLV | 1.11 | |
| Plant Capacity Factor | 73.21 | % |
| Heat Rate Correction Factor for Off Peak Operation | 1.0806 | |
| Plant Availability | 8500 | hours/yr |
| Average Natural Gas Cost | $3.00 | per MMBTU |
| Annual Electric Production | 4,452,709,821 | kWh |
| Annual Fuel Consumption | 31,137,342 | MMBTU |
| Annual Fuel Cost | $93,412,027 | |

FIG. 25B

Westinghouse 2X1 501G Combined Cycle Power Plant
ISO Capacity – 715.5 MW

| Plant Capital Costs | | |
|---|---:|---|
| Average Installed Cost | $475 | $/kW |
| Total Plant Cost | $339,862,500 | |
| Interest Rate | 8.00% | |
| Finance Period | 20 | years |
| Annual Loan Payment (12 monthly installments) | $34,112,954 | |

| Plant Maintenance | | |
|---|---:|---|
| GT Maintenance Cost | $0.0045 | per kWh |
| ST Maintenance Cost | $0.0005 | per kWh |
| Average Maintenance Cost | $0.0031 | per kWh |
| Annual Maintenance Cost | $14,013,266 | |

| Net Costs per kWh | |
|---|---:|
| Fuel Cost | $0.0210 |
| Capital Cost | $0.0077 |
| Maintenance Cost | $0.0031 |
| Total Fuel, Capital, and Maintenance Costs | $0.0318 |

| NOx Emissions | | |
|---|---:|---|
| Peak Power Exhaust Flow per Gas Turbine | 4,365,000 | lb/hr |
| Peak Power NOx Levels | 42 | ppm |
| Peak Power Exhaust Flow | 100.00% | |
| Intermediate Power NOx Levels | 50 | ppm |
| Intermediate Power Exhaust Flow | 85.00% | |
| Night Power NOx Levels | 60 | ppm |
| Night Power Exhaust Flow | 73.00% | |
| Expected Emissions (No aftertreatment) | 2554.81 | tons/yr |
| Expected Emissions (90% Efficient SCR) | 255.48 | tons/yr |

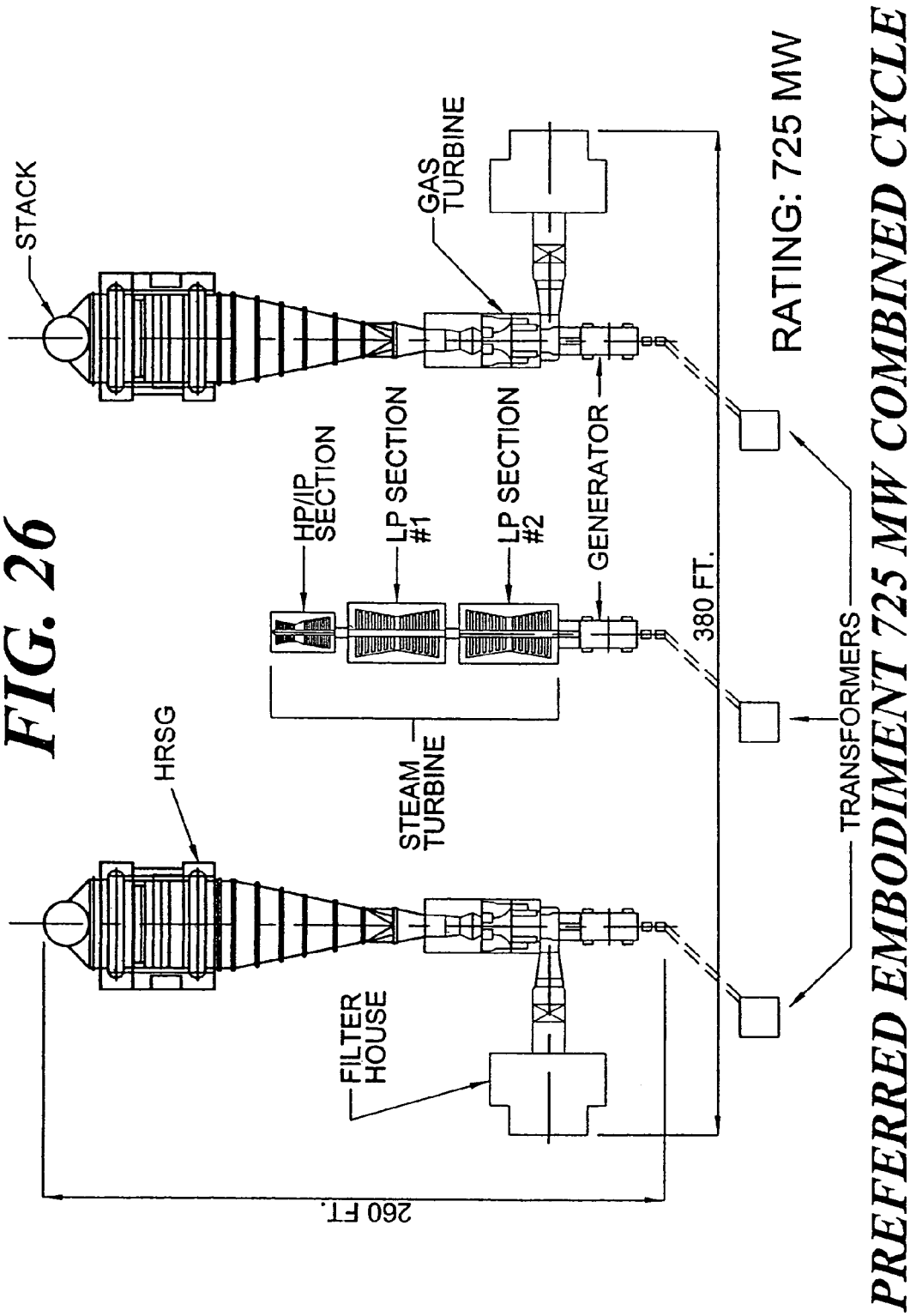

FIG. 27A

Exemplary Preferred Embodiment Combined Cycle Power Plant
ISO Capacity – 725 MW

| Major Equipment | | | |
|---|---|---|---|
| Qty | Equipment | MW | Total MW |
| 2 | GE Model 7241 FA Gas Turbines | 168.8 | 337.6 |
| 1 | GE 2400 psig steam turbine | 395.9 | 395.9 |
| 2 | HRSGs, three pressure levels | | |
| 1 | Auxiliary equipment (BFPs, circulation pumps, etc.) | -8.5 | -8.5 |
| | Net Plant Output | 725 | MW |

| Plant Operation Profile | |
|---|---|
| Hours per Week @ Peak Power | 20 |
| Peak Power Heat Rate Correction | 1.00 |
| % of Peak Power | 1.00 |
| Hours per Week @ Intermediate Power Level | 71 |
| Intermediate Power Heat Rate Correction | 1.00 |
| % of Peak Power | 0.80 |
| Hours per Week @ Night Power Level | 77 |
| Night Power Heat Rate Correction | 1.03 |
| % of Peak Power | 0.60 |

| Plant Performance | | |
|---|---|---|
| Plant heat rate at full load | 6006 | BTU/kWh LHV |
| Natural gas fuel ratio HHV/LLV | 1.11 | |
| Plant Capacity Factor | 73.21 | % |
| Heat Rate Correction Factor for Off Peak Operation | 1.0095 | |
| Plant Availability | 8500 | hours/yr |
| Average Natural Gas Cost | $3.00 | per MMBTU |
| Annual Electric Production | 4,511,830,357 | kWh |
| Annual Fuel Consumption | 30,365,273 | MMBTU |
| Annual Fuel Cost | $91,095,818 | |

FIG. 27B

Exemplary Preferred Embodiment Combined Cycle Power Plant
ISO Capacity – 725 MW

| Plant Capital Costs | | |
|---|---:|---|
| Average Installed Cost | $330 | $/kW |
| Total Plant Cost | $239,250,000 | |
| Interest Rate | 8.00% | |
| Finance Period | 20 | years |
| Annual Loan Payment (12 monthly installments) | $24,014,194 | |

| Plant Maintenance | | |
|---|---:|---|
| GT Maintenance Cost | $0.0025 | per kWh |
| ST Maintenance Cost | $0.0005 | per kWh |
| Average Maintenance Cost | $0.0011 | per kWh |
| Annual Maintenance Cost | $4,737,422 | |

| Net Costs per kWh | |
|---|---:|
| Fuel Cost | $0.0202 |
| Capital Cost | $0.0053 |
| Maintenance Cost | $0.0011 |
| Total Fuel, Capital, and Maintenance Costs | $0.0266 |

| NOx Emissions | | |
|---|---:|---|
| Peak Power Exhaust Flow per Gas Turbine | 3,542,000 | lb/hr |
| Peak Power NOx Levels | 20.9 | ppm |
| Peak Power Exhaust Flow | 100.76% | |
| Intermediate Power NOx Levels | 15.29 | ppm |
| Intermediate Power Exhaust Flow | 92.87% | |
| Night Power NOx Levels | 31.26 | ppm |
| Night Power Exhaust Flow | 50.72% | |
| Expected Emissions (No aftertreatment) | 759.90 | tons/yr |
| Expected Emissions (90% Efficient SCR) | 75.99 | tons/yr |

Preferred Exemplary Embodiment Power Plant Range Selection Chart
(Partial Equipment List Using Common Industry Components)

FIG. 32

Typical Load Profile
(Based upon DOE Information from FIG. 31A)

System Capacity       70  GW

Weekday Profile

| Hour | Period | GW |
|---|---|---|
| 1 | Night | 43 |
| 2 | Night | 42 |
| 3 | Night | 41 |
| 4 | Night | 40 |
| 5 | Night | 40 |
| 6 | Night | 41 |
| 7 | Night | 42 |
| 8 | Night | 47 |
|   |       | 336 |
| 9 | Intermediate | 51 |
| 10 | Intermediate | 53 |
| 11 | Intermediate | 55 |
| 12 | Intermediate | 57 |
| 13 | Intermediate | 59 |
| 14 | Intermediate | 60 |
| 15 | Intermediate | 60 |
|   |       | 395 |
| 16 | Peak | 61 |
| 17 | Peak | 62 |
| 18 | Peak | 62 |
| 19 | Peak | 61 |
|   |       | 246 |
| 20 | Intermediate | 59 |
| 21 | Intermediate | 58 |
| 22 | Intermediate | 56 |
| 23 | Intermediate | 52 |
|   |       | 225 |
| 24 | Night | 48 |

Weekend Profile 8 hours/day @ Intermediate Power Level
16 hours/day @ Night Power Level

Weekday Totals

| Period | Average GW | Average % Capacity | Weekday Hours |
|---|---|---|---|
| Night | 42.67 | 60.95% | 45 |
| Intermediate | 56.36 | 80.52% | 55 |
| Peak | 61.50 | 87.86% | 20 |
| Overall | 52.08 | 74.40% | 120 |

Weekend Totals

| Period | Average GW | Average % Capacity | Weekend Hours |
|---|---|---|---|
| Night | 42.67 | 60.95% | 32 |
| Intermediate | 56.36 | 80.52% | 16 |
| Peak | 0.00 | 0.00% | 0 |
| Overall | 47.23 | 67.47% | 48 |

Totals for Entire Week

| Period | Average GW | Average % Capacity | Hours |
|---|---|---|---|
| Night | 42.67 | 60.95% | 77 |
| Intermediate | 56.36 | 80.52% | 71 |
| Peak | 61.50 | 87.86% | 20 |
| Overall | 50.70 | 72.42% | 168 |

Part Load Efficiency Comparison

FIG. 34

ECONOMIC COMPARISON

| Combined Cycle Plant | GT Technology | Fuel Costs | Capital Costs | Maintenance Costs | Total Major Costs | Net Electricity Produced | Average Cost Per kWh | NOX Emissions | Specific NOX Emissions |
|---|---|---|---|---|---|---|---|---|---|
| | | MM US$ | MM US$ | MM US$ | MM US$ | MM kWh | US$/kWh | tons | tons/MM kWh |
| General Electric GE S207FA (520 MW) | GE "F" Technology | 70.55 | 22.25 | 5.78 | 98.58 | 3,246 | 0.0304 | 35.24 | 0.0109 |
| 725 MW Invention Embodiment | GE "F" Technology | 91.10 | 24.01 | 4.74 | 119.85 | 4,512 | 0.0266 | 75.99 | 0.0168 |
| Net Cost Savings: Annual Savings: $12.35 20 Year Savings: $247.08 | | | | | | | 0.0038 | | |
| Westinghouse W 2X1 501G (715 MW) | W "G" Technology | 93.41 | 34.11 | 14.01 | 141.54 | 4,453 | 0.0318 | 255.48 | 0.0574 |
| 725 MW Invention Embodiment | GE "F" Technology | 91.10 | 24.01 | 4.74 | 119.85 | 4,512 | 0.0266 | 75.99 | 0.0168 |
| Net Cost Savings: Annual Savings: $23.26 20 Year Savings: $465.22 | | | | | | | 0.0052 | | |

NOTES: (1) Fuel costs at $3.00 per MM BTU
(2) Load profile from 60 to 100% utilizing a trend typical for current electrical usage
(3) Capital costs assume a 100% loan at 8% interest for 20 years
(4) Total costs include fuel, capital, and maintenance costs

FIG. 36

Exemplary Preferred Embodiment Heat Balance
725 MW Combined Cycle with 2 - GE Frame 7 GTs, 2400 psig steam cycle
Steam/Feedwater System

| Point | Pressure | Temp | Enthalpy | Flow | Heat Input | Power | Comments |
|---|---|---|---|---|---|---|---|
| | psia | Degrees F | BTU/lb | lb/hr | MMBTU/hr | kW | |
| 1 | 0.59 | 84.66 | 52.689 | 1749377 | | | |
| 2 | 0.59 | 84.66 | 53.754 | 1956488 | | | |
| 3 | 550.00 | 86.29 | 55.793 | 1956488 | | -1169 | Pump power, point 2 - 3 |
| 4 | 539.00 | 86.29 | 55.793 | 994750 | | | |
| 5 | 539.00 | 119.18 | 88.521 | 1775863 | | | Preheat feedwater to dew point of exhaust gases |
| 6 | 528.22 | 386.06 | 360.471 | 1775863 | | | |
| 7 | 528.22 | 386.06 | 360.471 | 1366048 | | | |
| 8 | 3002.96 | 391.62 | 369.655 | 1366048 | | -3676 | Pump power, point 7 - 8 |
| 9 | 2913.55 | 689.56 | 780.423 | 1366048 | | | |
| 10 | 2913.55 | 664.61 | 713.255 | 1776869 | | | |
| 11 | 550.00 | 86.29 | 55.793 | 961739 | | | |
| 12 | 539.00 | 160.93 | 130.200 | 180625 | | | |
| 13 | 550.00 | 160.93 | 130.200 | 781113 | | | Feedwater - Exit FWH 1 |
| 14 | 528.22 | 229.41 | 198.872 | 180625 | | | Feedwater - Exit FWH 2 |
| 15 | 517.66 | 298.23 | 268.796 | 180625 | | | Feedwater - Exit FWH 3 |
| 16 | 507.30 | 355.21 | 327.796 | 180625 | | | Feedwater - Exit FWH 4 |
| 17 | 497.16 | 408.59 | 384.714 | 180625 | | | Feedwater - Exit FWH 5 |
| 18 | 3002.96 | 404.80 | 383.553 | 599668 | | -1634 | Pump power, point 17 - 18 |
| 19 | 2957.92 | 496.07 | 483.061 | 599668 | | | Feedwater - Exit FWH 6 |
| 20 | 2913.55 | 561.37 | 560.245 | 599668 | | | Feedwater - Exit FWH 7 |
| 21 | 2767.87 | 690.92 | 1037.440 | 1776869 | | | Exit Evaporator |
| 22 | 2684.84 | 854.67 | 1336.605 | 1776869 | | | Exit Superheater Section 1 |
| 23 | 2684.84 | 845.18 | 1333.204 | 1786620 | | | Enter Superheater Section 2 |
| 24 | 2681.22 | 1169.43 | 1562.578 | 1786620 | | | Exit Superheater Section 2 |
| 25 | 2627.59 | 1050.00 | 1486.820 | 1965717 | | | ST HP Section Inlet |
| 26 | 672.00 | 667.80 | 1327.813 | 1913817 | | | ST HP Section Outlet |
| 27 | 672.00 | 667.80 | 1327.813 | 1855328 | | | Enter Reheater Section |
| 28 | 618.24 | 1050.00 | 1544.119 | 1855328 | | | Exit Reheater Section |
| 29 | 618.24 | 1050.00 | 1544.119 | 1855328 | | | ST IP Section Inlet |
| 30 | 64.95 | 486.64 | 1276.096 | 1836454 | | | ST IP Section Outlet |
| 31 | 63.65 | 486.37 | 1276.096 | 1825874 | | | ST LP Section Inlet |
| 32 | 0.59 | 84.66 | 973.250 | 1749377 | | | ST LP Section Outlet |

FIG 37

| Exemplary Preferred Embodiment Heat Balance | | | | | | |
|---|---|---|---|---|---|---|
| 725 MW Combined Cycle with 2 - GE Frame 7 GTs, 2400 psig steam cycle | | | | | | |
| Steam/Feedwater System | | | | | | |
| Point | Pressure | Temp | Enthalpy | Flow | Heat Input | Power | Comments |
| | psia | Degrees F | BTU/lb | lb/hr | MMBTU /hr | kW | |
| 33 | 1100.80 | 803.31 | 1386.731 | 51900 | | | 1st Extraction Steam to # 7 Feedwater Heater, 5% Press Drop |
| 34 | 645.12 | 664.75 | 1327.813 | 58489 | | | 2nd Extraction Steam to # 6 Feedwater Heater, 5% Press Drop |
| 35 | 243.32 | 801.33 | 1424.375 | 9462 | | | 3rd Extraction Steam to # 5 Feedwater Heater, 5% Press Drop |
| 36 | 131.39 | 646.41 | 1350.853 | 9411 | | | 4th Extraction Steam to # 4 Feedwater Heater, 5% Press Drop |
| 37 | 62.36 | 486.11 | 1276.096 | 10580 | | | 5th Extraction Steam to # 3 Feedwater Heater, 5% Press Drop |
| 38 | 20.94 | 287.54 | 1185.142 | 9914 | | | 6th Extraction Steam to # 2 Feedwater Heater, 5% Press Drop |
| 39 | 5.45 | 165.93 | 1094.921 | 66583 | | | 7th Extraction Steam to # 1 Feedwater Heater, 5% Press Drop |
| 40 | 1100.80 | 506.07 | 494.933 | 51900 | | | |
| 41 | 645.12 | 418.59 | 395.673 | 110389 | | | |
| 42 | 243.32 | 365.15 | 337.873 | 9462 | | | |
| 43 | 131.39 | 308.23 | 278.313 | 18873 | | | |
| 44 | 62.36 | 239.41 | 207.926 | 29453 | | | |
| 45 | 20.94 | 170.93 | 138.940 | 39367 | | | |
| 46 | 5.45 | 96.29 | 64.305 | 105951 | | | |
| 47 | 528.22 | 386.06 | 360.471 | 101161 | | | |
| 48 | 528.22 | 386.06 | 360.471 | 308654 | | | |
| 49 | 2913.55 | 664.61 | 713.255 | 179097 | | | |
| 50 | 2913.55 | 664.61 | 713.255 | 0 | | | |
| 51 | 2913.55 | 664.61 | 713.255 | 9750 | | | |
| 52 | 528.22 | 93.33 | 62.807 | 101161 | | | |
| 53 | | | | | | -939 | Pump power, cooling water |
| | | | | | | -7418 | Total Auxiliary Load |
| 54 | | | | | | 390878 | ST Generator Output |
| | | | | | | 383460 | Net Steam cycle power |

FIG 38

| Exemplary Preferred Embodiment Heat Balance |||||||
|---|---|---|---|---|---|---|
| 725 MW Combined Cycle with 2 - GE Frame 7 GTs, 2400 psig steam cycle |||||||
| GT/HRSG System |||||||
| Point | Pressure | Temp | Enthalpy | Flow | Heat Input | Power | Comments |
| | psia | Degrees F | BTU/lb | lb/hr | MMBTU/hr | kW | |
| 101 | 14.70 | 59.00 | | 6954954 | | | |
| 102 | 14.59 | 59.00 | | 6954954 | | | |
| 103 | 15.18 | 1123.00 | 412.64 | 7103452 | | | |
| 104 | 15.18 | 1650.65 | 573.79 | 7157276 | | | |
| 105 | 15.09 | 1267.65 | 459.31 | 7157276 | | | |
| 106 | 15.00 | 1002.46 | 384.29 | 7157276 | | | |
| 107 | 14.91 | 711.24 | 303.00 | 7157276 | | | |
| 108 | 14.82 | 417.83 | 223.80 | 7157276 | | | |
| 109 | 14.70 | 156.55 | 155.65 | 7157276 | | | |
| 110 | | | | | -29.93 | | HRSG Heat Loss - 1% |
| 111 | | | | | | 341540 | Net GT power |
| Fuel Gas System |||||||
| 201 | 500.0 | 70.00 | 236.45 | 202322 | | | |
| 202 | 450.0 | 368.92 | 385.28 | 202322 | | | |
| 203 | 427.5 | 368.92 | 385.28 | 148498 | 3551.60 | | |
| 204 | 45.0 | 368.92 | 385.28 | 53824 | 1281.87 | | |

| | Totals | 4833.47 | 725000 |
|---|---|---|---|

| Heat Rate, HHV | 6667 |
|---|---|
| Heat Rate, LHV | 6006 |

FIG. 40

| Exemplary Preferred Embodiment Heat Balance | | | | | | | |
|---|---|---|---|---|---|---|---|
| 1040 MW Combined Cycle with 2 - GE Frame 7 GTs, Ultrasupercritical steam cycle | | | | | | | |
| Steam/Feedwater System | | | | | | | |
| Point | Pressure | Temp | Enthalpy | Flow | Heat Input | Power | Comments |
| | psia | Degrees F | BTU/lb | lb/hr | MMBTU/hr | kW | |
| 1 | 0.59 | 84.66 | 52.689 | 2540732 | | | |
| 2 | 0.59 | 84.66 | 53.782 | 3153031 | | | |
| 3 | 450.00 | 86.21 | 55.450 | 3153031 | | -1541 | Pump power, point 2 - 3 |
| 4 | 450.00 | 86.21 | 55.450 | 795099 | | | |
| 5 | 450.00 | 132.71 | 101.785 | 1775863 | | | Preheat feedwater to dew point of exhaust gases |
| 6 | 427.50 | 430.20 | 408.209 | 1775863 | | | Exit Economizer 1 |
| 7 | 427.50 | 430.20 | 408.209 | 1775863 | | | |
| 8 | 4429.20 | 440.29 | 423.061 | 1775863 | | -7728 | Pump power, point 7 - 8 |
| 9 | 4044.06 | 643.52 | 667.480 | 1775863 | | | Exit Economizer 2 |
| 10 | 4044.06 | 607.00 | 616.610 | 3044712 | | | |
| 11 | 450.00 | 86.21 | 55.450 | 2357932 | | | |
| 12 | 450.00 | 170.32 | 139.348 | 1377168 | | | Feedwater - Exit FWH 1 |
| 13 | 450.00 | 170.32 | 139.348 | 980764 | | | To TCV |
| 14 | 450.00 | 221.51 | 190.697 | 1377168 | | | Feedwater - Exit FWH 2 |
| 15 | 450.00 | 297.81 | 268.179 | 1377168 | | | Feedwater - Exit FWH 3 |
| 16 | 450.00 | 385.80 | 360.096 | 1377168 | | | Feedwater - Exit FWH 4 |
| 17 | 427.50 | 442.21 | 421.528 | 1377168 | | | Feedwater - Exit FWH 5 |
| 18 | 4429.20 | 455.32 | 439.161 | 1392731 | | -6061 | Pump power, point 17 - 18 |
| 19 | 4429.20 | 496.09 | 483.714 | 1392731 | | | Feedwater - Exit FWH 6 |
| | | | | | | | |
| 21 | 4044.06 | 736.63 | 894.294 | 3044712 | | | Exit Evaporator |
| 22 | 4044.06 | 766.46 | 1078.751 | 3044712 | | | Exit Superheater Section 1 |
| 23 | 3851.48 | 752.42 | 1062.496 | 3155706 | | | Enter Superheater Section 2 |
| 24 | 3851.48 | 1074.66 | 1466.947 | 3155706 | | | Exit Superheater Section 2 |
| 25 | 3851.48 | 1070.00 | 1463.488 | 3168594 | | | ST HP Section Inlet |
| 26 | 1049.78 | 694.27 | 1318.409 | 3053493 | | | ST HP Section Outlet |
| 27 | 1049.78 | 694.27 | 1318.409 | 3053493 | | | Enter Reheater Section 1 |
| 28 | 965.80 | 1112.00 | 1569.531 | 3053493 | | | Exit Reheater Section 1 |
| 29 | 965.80 | 1112.00 | 1569.531 | 3053493 | | | ST IP Section Inlet |
| 30 | 218.46 | 698.72 | 1372.625 | 2923510 | | | ST IP Section Outlet |
| 31 | 200.98 | 1102.23 | 1583.042 | 2740311 | | | ST RH2 Section Inlet |
| 32 | 72.79 | 817.36 | 1439.510 | 2814556 | | | ST RH2 Section Outlet |

FIG. 41

| Exemplary Preferred Embodiment Heat Balance |||||||||
|---|---|---|---|---|---|---|---|
| 1040 MW Combined Cycle with 2 - GE Frame 7 GTs, Ultrasupercritical steam cycle |||||||||
| Steam/Feedwater System |||||||||
| Point | Pressure | Temp | Enthalpy | Flow | Heat Input | Power | Comments |
| | psia | Degrees F | BTU/lb | lb/hr | MMBTU/hr | kW | |
| 33 | 66.97 | 816.90 | 1439.510 | 2740311 | | | ST LP Section Inlet |
| 34 | 611.58 | 986.16 | 1509.499 | 50957 | | | 1st Extraction Steam to # 7 Feedwater Heater, 5% Press Drop |
| 35 | 370.65 | 843.53 | 1441.277 | 79026 | | | 2nd Extraction Steam to # 6 Feedwater Heater, 5% Press Drop |
| 36 | 209.72 | 697.82 | 1372.625 | 108953 | | | 3rd Extraction Steam to # 5 Feedwater Heater, 5% Press Drop |
| 37 | 69.88 | 817.13 | 1439.510 | 74245 | | | 4th Extraction Steam to # 4 Feedwater Heater, 5% Press Drop |
| 38 | 19.46 | 452.21 | 1303.095 | 49520 | | | 5th Extraction Steam to # 3 Feedwater Heater, 5% Press Drop |
| 39 | 6.76 | 395.80 | 1207.801 | 150060 | | | 6th Extraction Steam to # 2 Feedwater Heater, 5% Press Drop |
| 40 | 0.59 | 84.66 | 1056.410 | 2540732 | | | ST LP Section Outlet |
| 41 | 611.58 | 452.21 | 432.802 | 166059 | | | |
| 42 | 370.65 | 395.80 | 370.713 | 79026 | | | |
| 43 | 209.72 | 307.81 | 278.021 | 187979 | | | |
| 44 | 69.88 | 231.51 | 199.957 | 262224 | | | |
| 45 | 19.46 | 180.32 | 148.348 | 311744 | | | |
| 46 | 6.76 | 96.21 | 64.235 | 461804 | | | |
| 47 | 427.50 | 430.20 | 408.227 | 150496 | | | |
| 48 | 427.50 | 430.20 | 408.227 | 0 | | | |
| 49 | 4044.06 | 607.00 | 616.610 | 12888 | | | |
| 50 | 4044.06 | 607.00 | 616.610 | 0 | | | |
| 51 | 4044.06 | 607.00 | 616.610 | 110994 | | | |
| 52 | 427.50 | 75.62 | 44.900 | 150496 | | | |
| 53 | | | | | | -1364 | Pump power, cooling water |
| | | | | | | -16694 | Total Auxiliary Load |
| 54 | | | | | | 715154 | ST Generator Output |
| | | | | | | 698460 | Net Steam cycle power |

FIG. 42

| Exemplary Preferred Embodiment Heat Balance |||||||
|---|---|---|---|---|---|---|
| 1040 MW Combined Cycle with 2 - GE Frame 7 GTs, Ultrasupercritical steam cycle |||||||
| GT/HRSG System |||||||
| Point | Pressure | Temp | Enthalpy | Flow | Heat Input | Power | Comments |
| | psia | Degrees F | BTU/lb | lb/hr | MMBTU/hr | kW | |
| 101 | 14.70 | 59.00 | | 6910726 | | | |
| 102 | 14.59 | 59.00 | | 6910726 | | | |
| 103 | 15.33 | 1123.00 | 412.64 | 7103452 | | | |
| 104 | 15.33 | 2465.24 | 865.01 | 7255946 | | | |
| 105 | 15.20 | 1363.91 | 500.48 | 7255946 | | | |
| 106 | 15.07 | 1095.41 | 422.30 | 7255946 | | | |
| 107 | 14.95 | 689.41 | 304.60 | 7255946 | | | |
| 108 | 14.82 | 472.67 | 244.17 | 7255946 | | | |
| 109 | 14.70 | 191.95 | 168.42 | 7255946 | | | |
| 110 | | | | | -44.73 | | HRSG Heat Loss - 1% |
| 111 | | | | | | 341540 | Net GT power |

| Fuel Gas System |||||||
|---|---|---|---|---|---|---|
| 201 | 500.0 | 50.00 | 227.72 | 300992 | | | |
| 202 | 450.0 | 411.70 | 409.38 | 300992 | | | |
| 203 | 427.5 | 411.70 | 409.38 | 300992 | 3546.72 | | |
| 204 | 45.0 | 411.70 | 409.38 | 152494 | 3643.97 | | |

| Totals | 7190.69 | 1040000 |
|---|---|---|
| Heat Rate, HHV | 6914 | |
| Heat Rate, LHV | 6229 | |

Exemplary Embodiment Load Transition

FIG. 44

Retrofit of Existing Steam Plants

Preferred Embodiment vs. Prior Art

| Technology | Steam Inlet Press. | Steam Exhaust Press. | Steam Turbine Section Flows | | | | Gas Turbine Power | Steam Turbine Power | Net Plant Power | Plant Heat Rate | Cost for Steam Turbine Modifications | Total Plant Cost | Plant Cost/ kW |
| --- | --- | --- | --- | --- | --- | --- | --- | --- | --- | --- | --- | --- | --- |
| | | | HP Section Inlet Flow | IP Section Inlet Flow | LP Section Inlet Flow | LP Section Exhaust Flow | | | | | | | |
| | psia | inch HgA | k-lb/hr | k-lb/hr | k-lb/hr | k-lb/hr | MW | MW | MW | BTU/ kWh | MM US$ | MM US$ | $/kWh |
| Conventional Steam Plant (pre-retrofit) | 2415 | 1.20 | 2,354 | 2,209 | 1,815 | 1,587 | 0 | 409 | 400 | 7620 | N/A | 50 | 125 |
| Prior Art - 1 GT | 1815 | 1.20 | 439 | 511 | 528 | 528 | 169 | 97 | 263 | 6090 | N/A | N/A | N/A |
| Prior Art - 3 GTs | 1815 | 1.20 | 1,317 | 1,533 | 1,584 | 1,584 | 506 | 299 | 798 | 6040 | 10 | 240 | 301 |
| Preferred Embodiment - 1 GT | 2225 | 1.20 | 2,182 | 1,952 | 1,784 | 1,593 | 169 | 374 | 535 | 6235 | 0 | 110 | 206 |
| Preferred Embodiment - 2 GTs | 2100 | 1.36 | 2,046 | 1,946 | 1,900 | 1,824 | 338 | 394 | 725 | 6060 | 0 | 170 | 234 |

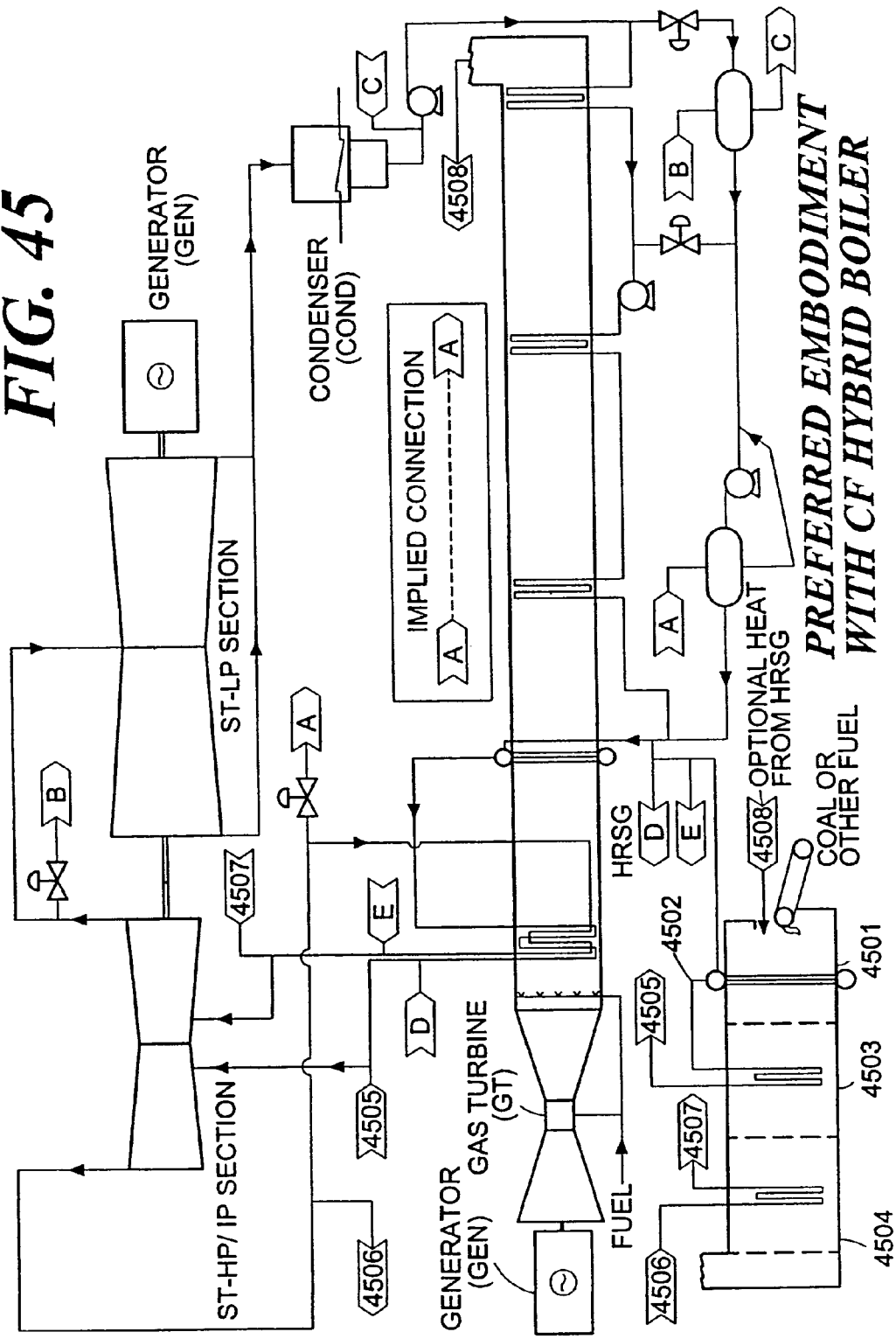

PREFERRED EMBODIMENT HYBRID WITH NUCLEAR OR GEOTHERMAL

EXEMPLARY THREE-CASING, FOUR-FLOW STEAM TURBINE (GE)

HIGH DENSITY COMBINED CYCLE POWER PLANT PROCESS

RELATED APPLICATIONS

This application is a continuation of application Ser. No. 10/301,005, filed Nov. 21, 2002, now U.S. Pat. No. 6,792,759, which is a divisional of application Ser. No. 09/783,693, filed Feb. 14, 2001, now U.S. Pat. No. 6,494,045, which was a divisional of application Ser. No. 09/359,813, filed Jul. 23, 1999, now U.S. Pat. No. 6,230,480, which claimed the benefit of U.S. Provisional Application Nos. 60/098,468, filed Aug. 31, 1998, and 60/125,576, filed Mar. 23, 1999. This application is also a continuation of U.S. application Ser. No. 10/642,717, filed Aug. 18, 2003, which is a divisional of U.S. application Ser. No. 09/763,920, filed Feb. 27, 2001, now U.S. Pat. No. 6,606,848, which was the National Stage of International Application No. PCT/US99/19350 filed Aug. 24, 1999.

FIELD OF THE INVENTION

This invention relates generally to combined cycle power plants that may or may not incorporate cogeneration into their cycle. As will be demonstrated by the following disclosure, the increasing need for more energy efficient and environmentally friendly methods of generating power has prompted a widespread search for systems and methods to achieve these goals. However, current technologies have a generally myopic view of the total economic impact imposed by a concentration on energy efficiency and environmental issues alone.

The present invention proposes to break with tradition and include as part of the economic and environmental analysis the complete equipment complement required to implement a desired plant load (power) rating. By incorporating this analysis into a new system and method of supplemental firing and heat recovery, the present invention dramatically cuts the overall economic and environmental cost of installed power plants by reducing the equipment complement while maintaining or reducing plant emissions. The result of this improvement over the art is cheaper and cleaner electrical energy than would be possible using conventional combined cycle plants that are currently known in the art.

BACKGROUND OF THE INVENTION

Overview

Combined cycle power plants and cogeneration facilities utilize gas turbines (GT(s)) as prime movers to generate power. These GT engines operate on the Brayton Cycle thermodynamic principle and typically have high exhaust flows and relatively high exhaust temperatures. These exhaust gases, when directed into a heat recovery boiler (typically referred to as a heat recovery steam generator (HRSG)), produce steam that can be used to generate more power and/or provide process steam requirements. For additional power production the steam can be directed to a steam turbine (ST) that utilizes the steam to produce additional power. In this manner, the GT produces work via the Brayton Cycle, and the ST produces power via the Rankine Cycle. Thus, the name "combined cycle" is derived. In this arrangement, the GT Brayton Cycle is also referred to as the "topping cycle" and the ST Rankine Cycle is referred to as the "bottoming cycle," as the topping cycle produces the energy needed for the bottoming cycle to operate. Thus, the functionality of these cycles is linked in the prior art.

Rankine Cycle

Steam has been used for power applications for more than a century. Early applications utilized a pump to bring the water up to the desired pressure, a boiler to heat the water until it turned to steam, and a steam engine, typically a piston type engine, to produce shaft horsepower. These power plants were used in factories, on locomotives, onboard steamships, and other power applications.

As technology progressed, the trend for the use of steam engines diminished and the use of steam turbines increased. One advantage of the steam turbine was its overall cycle efficiency when used in conjunction with a condenser. This allowed the steam to expand significantly beyond normal atmospheric pressure down to pressures that were only slightly above an absolute vacuum (0.5 to 2 pounds per square inch absolute (psia)). This allowed the steam to expand further than in an atmospheric exhaust configuration, extracting more energy from a given mass of steam, thus producing more power and increasing overall steam cycle efficiency. This overall steam cycle, from a thermodynamic perspective, is referred to as the Rankine Cycle.

FIG. 1 illustrates the thermodynamic operation of the Rankine Cycle. In FIG. 1, graph (100) illustrates the Rankine Cycle on a Pressure versus Volume plot. From point (101) to point (102), water is pressurized at constant volume. From point (102) to point (103), the water is boiled into steam at constant pressure. Point (103) to point (104) defines the process where the steam expands isentropically and produces work. Then, from point (104) to point (101) the low-pressure steam is condensed back to water and the cycle is complete.

Also in FIG. 1, graph (110) illustrates the Rankine Cycle on a Temperature versus Entropy plot. From point (111) to point (112), water is pressurized. From point (112), the water is boiled into steam at constant temperature until it is all steam, then it is superheated to point (113). Point (113) to point (114) defines the process where the steam expands isentropically and produces work. From point (114) to point (111) the low-pressure steam is condensed back to water at constant temperature to complete the cycle. See Eugene A. Avallone and Theodore Baumeister III, MARKS' STANDARD HANDBOOK FOR MECHANICAL ENGINEERS (NINTH EDITION) (ISBN 0-07-004127-X, 1987) in Section 4-20 for more discussion on the Rankine Cycle.

Power Plant Cycle

For a number of decades, the Rankine Cycle has been used to produce most of the electricity in the United States, as well as in a number of other countries. FIG. 2 illustrates a schematic of the basic Rankine Cycle, with the four primary components being the Boiler Feed Pump (BFP) (201), Boiler evaporator/superheater (BOIL) (203, 205), Steam Turbine (ST) (207), and the Condenser (COND) (209). Note that either one or multiples of any component are possible in the arrangement, but for simplicity, only one of each is shown in FIG. 2. The sub-critical Rankine Cycle (steam pressures less than 3206.2 psia) starts as water at the inlet (211) of the BFP (201). The water is then pumped to a desired discharge pressure by the BFP (201). This pressurized water (202) is then sent to the evaporator (EVAP) (203) where heat is added to the pressurized water. Typically this is accomplished by burning a fuel in the boiler, and the heat of combustion is then transferred to the pressurized water that is routed through tubes and other passages and/or vessels in the boiler. As sufficient heat is added to the pressurized water, it boils and turns into steam (204). This steam now exists in the two-phase region where both steam and water coexist at the same pressure and temperature, called the saturation pressure and saturation temperature. For most applications designed in recent decades, this steam (204) is then sent to a superheater section (SHT) (205) in the boiler where it is heated to a higher temperature than saturation temperature. This steam (206) is now referred to as superheated steam. Superheated steam reduces (but does not eliminate) the risk of water carryover into the steam turbine (207), which is of concern since water carryover can cause extensive internal steam turbine damage. Of more importance, however, is the fact that superheated steam yields better cycle efficiencies. This is of great importance to large central power stations.

Once produced, the superheated steam (206) is sent to the steam turbine (207), typically via one or more pipes. The steam then begins to expand in the steam turbine (ST) and produce shaft horsepower. After traveling through the steam turbine down to a low exhaust pressure, the steam exits the ST (208), and is sent to the condenser (209), where it is then condensed back into water. This device is typically a tubed heat exchanger, but can also be other types of heat exchangers such as a spray chamber, air-cooled condenser, or other heat exchange device used for a similar purpose. After rejecting heat from the low-pressure steam and condensing the steam back to water, the condenser collects the water in an area commonly referred to as the hotwell (HW) (210), where it is then typically pumped through the condensate line (211) and back to the BFP (201). Shaft horsepower produced in the ST is converted into electrical power in the generator (GEN) (212). This cycle of one unit of water from the point of beginning, through the system, and back to the point of origin defines the basic Rankine Cycle.

Current power plants using only steam as the motive fluid typically use a boiler to produce the steam. This boiler may be fueled by a variety of fuels, including oil, natural gas, coal, biomass, as well as others, such as nuclear fuel. The boilers may also use a combination of fuels as well. Depending upon capital cost considerations, fuel costs, maintenance issues, and other factors, the owners and engineers will select the steam pressure and temperature at which the boiler will produce steam.

Due to the size and weight of large steam turbines, they require extended periods for start-up. This is due to the thick metal casings and large heavy rotors that are utilized in their construction. Therefore, these machines require long start-up periods to allow these heavy components to warm up uniformly, and avoid interference between stationary and rotating parts that may occur due to differential thermal expansion.

Although the heavy construction is a deterrent to rapid startup, it provides for robust construction and sustained performance levels. Even after four (4) years of nearly continuous service, the performance decay for a large ST should be less than 2%. This performance decay, combined with the fact that the boiler feed pumps only consume about 2% of the ST output, mean that the performance levels for a ST sustain near optimum levels for extended periods of time, even with decay in the auxiliary loads (BFP). In other words, if the BFP efficiency decays from 75% to 65%, the auxiliary load only increases from 2.00% to 2.31%. This is a small effect on the net output of the Rankine cycle plant, and is another one of its major advantages.

Brayton Cycle

The Brayton Cycle varies quite differently from the Rankine Cycle, as a major part of the cycle involves the compression of the working fluid, which is a compressible gas. This process consumes a great deal of power, therefore, efficient compression of the working fluid is essential to an efficient Brayton Cycle.

Common engines that utilize a Brayton Cycle are aircraft turboprops, jet engines, and gas turbines for stationary application. These engines work by ingesting air (the working fluid), compressing it to a higher pressure, typically 3 to 30 times that of the surrounding ambient air, adding heat through direct combustion (although heat addition from an external source is also possible), and then expanding the resulting high-pressure hot gases through a turbine section. Aircraft engines primarily produce thrust to propel an aircraft through the air. Therefore, some or perhaps none of their output is in the form of shaft horsepower (a turboprop gas turbine engine may drive the propeller, but may also produce some thrust from the high velocity exhaust gases).

For stationary gas turbine applications, the purpose of the engine is to produce shaft horsepower. Approximately $2/3$ of the energy produced by the turbine section of the gas turbine is required to drive the compressor section, with the remaining $1/3$ available to drive a load. This drawback of GT systems may be used to advantage in the present invention as described later in this document.

Aircraft engines utilize the Brayton Cycle because these engines offer high thrust-to-weight ratios. This is needed to minimize the aircraft weight so it can fly. For stationary applications, gas turbines are used to provide electrical power at peak loads. This is another advantage the Brayton Cycle engines have over Rankine Cycle engines: rapid start and stop times (relatively speaking). Since steam turbines are large heavy engines, it is necessary to start them slowly, and allow the heat to slowly soak into the thick casings so as to avoid thermal distortion and potential rubs between the stationary components and rotating components of the engine. A large power plant steam turbine may require a 24-hour warm-up sequence from cold start to reach full load. However, due to the lower operating pressures and lighter weights, gas turbines can be started and brought to fall load within a matter of minutes of start-up.

Therefore, many utilities in the United States and other countries use gas turbines to provide electrical power during peak demand. These turbines are not very efficient in simple cycle (25% to 30% LHV), but meet the electrical demand requirements for a few hours each day.

Steam Turbine Design

When designing a steam turbine for a power plant application (constant speed), the steam turbine design engineer first examines the output rating desired by the customer. This is because the steam turbine will be custom designed and manufactured for the customer to his specification. The steam turbine will not be totally designed from a clean sheet of paper as may be inferred by "custom", but will utilize components from a "family" of hardware and have a unique steam path for the application. After turbine rating, the ST design engineer will look at the plant steam conditions, and based upon these parameters determine an inlet flow to the turbine high-pressure (HP) section. Utilizing this information, the ST design engineer can select the optimum HP casing for the application. In a similar fashion, he can also select the optimum intermediate pressure (IP) and low-pressure (LP) casings as well.

Knowing which casings to use, the engineer then selects the appropriate blading (both stationary and rotating) for the application. This blading size is determined primarily by the volume flow (as opposed to mass flow) of steam through the turbine. With casings and blading determined, the engineer completes the ST design by selecting valves, controls, instrumentation, and other accessories required for operation of the ST. The final design is a high efficiency ST optimized for the customer's steam conditions and desired rating.

An interesting note concerning this design philosophy is that two STs with the same steam conditions but with large differences in rating (for example, 200 MW versus 400 MW) may actually appear almost identical when viewed from the outside. This is because the optimum casings selected were designed to cover the flow range of both units. However, due to the large volume flow differences, the large unit would have blades that are approximately twice the size (height) internally. It is interesting to note, however, that both these units might have nearly the same HP and IP casings. This means that the larger ST, even with a dramatic increase in rating, may be only incrementally more expensive to manufacture than the ST with the lower rating. This fact may be used to advantage in the present invention as described later in this document.

Gas Turbine Design

Unlike the steam turbine, the gas turbine is not a custom designed machine for each customer. Although accessories such as the starting means, lube oil cooler type, and control options may be specified by the customer for a particular application, the core engine is essentially standard. Much of this is due to the fact that the gas turbine is actually a packaged power plant, which needs essentially only fuel to produce power. In contrast, the steam turbine is merely a component of a power plant, and requires a boiler, BFP, and condenser to become a complete power plant. Therefore, the gas turbine compressor section, combustion system, and turbine section must all be designed to work together. Since the design of the GT is a highly intensive engineering task, GT designs are generally completed and extensively tested, after which they are mass produced without variation to the core engine design. This eliminates the customer's ability to specify power output for either a facility with gas turbines only or a combined cycle facility in the prior art. When building a combined cycle plant, the customer simply must choose from a selection of standard offerings by a manufacturer that best meets his needs for power output, efficiency, and cost.

Steam Turbine/Gas Turbine Efficiency and Rating Comparison

The largest and most efficient GT available today for 60-cycle power production is rated at approximately 250 MW with an efficiency of 40.0% LHV (Lower Heating Value). An example of this GT is the Westinghouse model 501G. This is in contrast to STs that can be rated up to as high as 1500 MW and have overall cycle efficiencies in excess of 45% LHV. Therefore, comparing a Rankine Cycle power plant to a Brayton cycle power plant, where each employs the largest and most efficient turbine available, the single ST Rankine cycle is approximately six (6) times larger in rating and 12.5% more efficient than the Brayton Cycle with its best GT. This fact may be used to advantage in the present invention as described later in this document.

Cogeneration/Combined Cycle

One characteristic of the gas turbine is that it expels high volumes of exhaust gases at high temperature. With the advent of the Arab oil embargo of 1973 and higher energy prices, more focus was put on finding ways to utilize the energy contained in these high temperature exhaust gases.

Significantly higher energy prices in the early 1970s signaled the start of a wave of small power plants built using the principles of cogeneration. Cogeneration is defined as the simultaneous production of mechanical or electrical energy in conjunction with thermal energy. In other words, the utilization of an engine (gas turbine or otherwise) to produce power, while at the same time using waste heat from the engine for another process, thus displacing fuel that would otherwise be used for said process. This was a very efficient method from a fuel utilization perspective and was encouraged by the United States Public Utilities Regulation and Policies Act (PURPA) of 1978, which mandated that the local utilities must purchase power from qualified cogenerators, and buy it at a rate which included avoided cost for new power plants.

At first cogeneration projects were small, typically less than 50 MW. They consisted of small gas turbines with a HRSG to produce steam. In many instances, the steam pressures were relatively low (less than 600 psig), as the steam was used for process requirements. Some projects included a steam turbine, while others did not. As the industry matured, larger plants with higher steam pressures were designed to increase bottoming cycle efficiency. In addition, the major gas turbine manufacturers designed and built larger and more efficient gas turbines to meet the needs of the cogeneration marketplace. Soon, due to their high efficiency, low emissions, and low capital cost (dollars per kW of capacity), cogeneration power plants gave way to combined cycle power plants (plants that produced only power and provided no useful thermal energy as was the case with cogeneration plants). Some cogeneration projects are still being proposed and constructed, but they are now typically referred to as combined heat and power (CHP) projects.

Although there was this gradual shift from small cogeneration projects to large combined cycle power plants, the arrangement and overall system and method for producing power was for the most part unchanged. The gas turbine(s) was the primary engine, and a HRSG was utilized to capture the heat in the GT exhaust gases. Optimized for maximum power production, the steam turbine(s) produced additional power equal to approximately 50% of the power produced by the gas turbine(s). The HRSG was typically a two or three pressure level boiler to maximize heat recovery and steam turbine was designed to accept steam from all pressure levels of the HRSG. A review of the manufacturers standard combined cycle offerings will illustrate this trend. The 1997 TURBOMACHINERY HANDBOOK, (USPS 871-500, ISSN 0149-4147), tabulates standard combined cycle power plants available from various manufacturer's including ABB, General Electric, and Westinghouse. In most every instance, the steam turbine's output is within the range of 40% to 60% of the gas turbine(s) output. General Electric informative document GER-3567G, 1996, "GE Heavy-Duty Gas Turbine Performance Characteristics," by Frank J. Brooks provides the output for the gas turbines used in their combined cycle power plants.

In summary, the system and method utilized by the major manufacturer's of combined cycle power plant turbomachinery evolved from the small cogeneration power facilities that were designed to produce both power and thermal energy simultaneously. The sizes for combined cycle power plants have grown from small cogeneration projects under 50 MW to large structured plants producing in excess of 700 MW (as in the Westinghouse 2X1 501G combined cycle). These plants are primarily gas turbine power plants, with the steam turbine producing additional power which is nominally 40% to 60% of the power produced by its associated gas turbine(s). With the gas turbine as the prime engine, the ratings on the standard combined cycle power plants are very rigid, as gas turbines are production line items, versus steam turbines which are largely custom designed and manufactured. A new system and method that offers more flexibility, without compromising the benefits of combined cycle power such as high efficiency, low emissions, and low capital cost, would be welcomed by the industry.

DESCRIPTION OF THE PRIOR ART

Efficiency Optimizations

Feedwater Heater

With Rankine Cycle plants producing billions of dollars of electricity annually, and consuming commensurate amounts of fuel each year, a great deal of design and analysis has been done to optimize the Rankine Cycle by introducing small variations or revised configurations. FIG. 3 illustrates some of the common variations that are used to design a Rankine Cycle for optimum efficiency. Part (303) of FIG. 3 schematically represents a feedwater heater (FWH). This device is typically a shell and tube heat exchanger, but could be a plate and frame heat exchanger, vortex mixing heat exchanger that mixes the feedwater with small amounts of steam, or other heat exchange device used for a similar purpose. Analysis has proven that utilizing extraction steam from the steam turbine to preheat water before it enters the boiler increases the cycle efficiency.

The feedwater heater (303) uses steam that is extracted from the steam turbine at an optimum point to preheat the water between the condenser (319) outlet and the boiler inlet (306). A second feedwater heater (305) is shown in this example. The number of feedwater heaters and their optimum steam conditions are dependent upon a number of factors including but not limited to steam turbine inlet pressure, steam turbine inlet temperature, reheat steam conditions, feedwater heater effectiveness, and other factors. Typically, the number of feedwater heaters, their design, and the inlet steam conditions for these feedwater heaters must be determined for each power plant due to variations in each power plant's design and individual conditions.

Reheat

Another variation on the Rankine Cycle used to improve cycle efficiency is the use of reheat. This variation involves expanding steam in the steam turbine from design inlet conditions down to some specified reheat pressure. At this point, some energy has already been extracted from the steam to produce shaft horsepower. This lower energy content steam is then redirected to the boiler where it is reheated to a higher temperature. This higher energy content steam is then sent back to the steam turbine to produce more power. More than one reheat can be utilized in the cycle. Again, for the given design conditions, inlet pressures, inlet temperatures, and other conditions, the reheat is designed for the greatest benefit and increase in cycle efficiency.

Other Factors

Other factors that affect cycle efficiency include inlet steam pressure, inlet steam temperature, and exhaust pressure. Typically, higher inlet pressures and higher inlet temperatures yield higher cycle efficiencies. Lower exhaust pressures typically also yield higher cycle efficiencies. Exhaust pressures are normally limited by ambient factors, such as the temperature of the river water, ambient air, or other fluid used to cool the condenser. This will set the limit for the exhaust pressure, and the condenser and associated equipment will be designed to approach this limit, based upon evaluated parameters such as size, cooling medium available, environmental factors, and cost.

Design Limitations

Inlet pressure and inlet temperature are typically selected by the plant design engineer. However, there are limits that are imposed in these designs. As the inlet pressures are increased, the stresses on the boiler tubes, steam turbine casing, and steam turbine internals are increased. These stresses impose limits on the manufacturer's ability to produce this equipment, or economic limitations on the feasibility of producing this equipment. In addition, above 3206 psia, steam no longer can coexist as both water and steam. This point is referred to as the critical point of steam, and above this pressure steam does not boil. Instead, both water and steam are a fluid and a more intricate super-critical boiler is required to produce steam above this pressure. At higher temperatures, the allowable stress of the boiler tubes, steam turbine casing, and steam turbine internals is reduced, and near the current limits, conventional steam turbine materials rapidly loose their properties as the temperature is increased only small amounts (50° F.). Conventional large steam turbines built as state of the art machines have HP inlet temperature limits in the range of 1050° F.

Steam Cycle Optimization

Once a boiler steam pressure and temperature is selected, the steam cycle then must be optimized. A typical high efficiency steam cycle will involve the use of feedwater heaters, a reheater, a reheat steam turbine, boiler feed pumps, and a condenser. A descriptive document on cycle optimization is an informative paper issued by General Electric Company (GE) entitled "Steam Turbine Cycle Optimization, Evaluation, and Performance Testing Considerations" (General Electric Reference GER-3642E, 1996) by James S. Wright. This document provides relative performance variations for different cycle parameters such as pressure, temperature, number of reheats, and number of feedwater heaters.

Rankine Cycle Example

FIG. 3 is a schematic representation of a Rankine Cycle with both feedwater heating and reheat. This sub-critical Rankine Cycle works by providing water to the inlet of the boiler feed pump (BFP) (301). The water is then pumped to a desired discharge pressure by the BFP (301). This pressurized water is then sent through the feedwater line (302) to feedwater heater (FWH) (303) and through line (304) to feedwater heater (305). The feedwater heaters (303, 305) preheat the feedwater before it enters the boiler at the boiler inlet (306). This preheated feedwater travels to the evaporator section (307) of the boiler where heat is added to the pressurized water.

Steam exits the boiler section at (308) and continues to superheater section (309) and exits at (310). This superheated steam is sent to the high-pressure (HP) section of the steam turbine (311). The steam expands through the HP section to (312), and then returns to the reheat section of the boiler (RHT) (313) where heat is added to return the steam typically to a temperature at or near the inlet steam temperature. This reheat steam is then sent to the Intermediate Pressure (IP) section of the steam turbine at (314). This steam then expands through the IP turbine section (315) and produces shaft horsepower. The steam then exits the IP section and via the crossover pipe (316) and goes to the LP section of the steam turbine (317).

Due to the high volume flows at low-pressure, the LP section is typically a double flow section on large units, so steam enters the middle of the casing and travels both forward and aft through the blading to produce more shaft horsepower. The steam then exhausts at (318) into the condenser (COND) (319). Condensed steam leaves the hotwell (330) and returns via the feedwater line (320) to the inlet of the BFP (301). For feedwater heating, steam is extracted from the IP and LP sections of the steam turbine at (321) and (324) and sent to feedwater heaters (305) and (303) respectively via lines (323) and (326). Non-return valves are used in these lines, (322) and (325), to prevent backflow of steam to the ST in case of a trip (emergency shutdown) condition when pressures in the turbine will rapidly drop to condenser pressure. These valves are safety devices only, and are either open or closed. Steam from these extraction lines preheats the feedwater on its way to the boiler. The steam from the extraction lines is condensed in the feedwater heaters and the condensate (327, 328) is returned to the inlet of the BFP (301). Again, shaft horsepower produced in the ST is converted into electrical power in the generator (GEN) (329).

For larger, central power plant applications, typical inlet pressures for sub-critical applications are 1800 and 2400 pounds per square inch gauge (psig). For supercritical applications, pressures of 3500 psig and greater are employed. Inlet steam temperatures for most large steam turbines are limited to about 1050° F. for both the inlet and reheat steam. However, some advanced technology steam turbines are utilizing inlet temperatures of 1070° F. for the HP inlet and 1112° F. for reheat, as detailed in a descriptive document on steam turbines issued by General Electric Company (GE) entitled "Steam Turbines for Ultrasupercritical Power Plants" by Klaus M. Retzlaff and W. Anthony Ruegger (General Electric Reference GER-3945, 1996).

Rankine Cycle Efficiency Comparison

Based upon a steam turbine with a 90% efficiency, FIG. 4 illustrates a relative comparison of a basic Rankine Cycle (Option 1), (excluding boiler efficiency and parasitic power requirements) to one that uses only reheat (Option 2, Option 3), and to one that uses both reheat and feedwater heating (Option 4, Option 5). Variations in the inlet pressure with reheat (Option 3) and feedwater heating (Option 5) are also included. Option 6 and Option 7 are for supercritical steam applications. Option 6 is a supercritical steam cycle with ultrasupercritical (inlet or reheat temperatures above 1050° F.) steam conditions and double reheat (steam is reheated twice, at two separate pressure levels, in the boiler). Option 7 is the same as Option 6 with the addition of feedwater heating. For the purposes of this comparison, only two extractions were utilized and the extraction pressures were assumed to be at the cold reheat pressure and the crossover pressure (2nd cold reheat for supercritical applications). More feedwater heaters will yield even better cycle efficiencies. General Electric Company (GE) informative document entitled "Steam Turbine Cycle Optimization, Evaluation, and Performance Testing Considerations" (General Electric Reference GER-3642E, 1996) by James S. Wright provides data for the selection of the optimum number of feedwater heaters, stating that a 1.5% heat rate penalty is assessed for only three feedwater heaters versus seven. Therefore, the feedwater heating cycle efficiency shown on FIG. 4 (Options 4, 5, and 7) has room for improvement. With reheat, optimum feedwater heating, and ultrasupercritical steam conditions, overall plant cycle efficiencies in excess of 45% are possible.

The overall plant cycle efficiency includes not only the basic steam cycle efficiency as shown in FIG. 4, but also the boiler efficiency and parasitic power requirements such as the boiler feed pumps and the condenser circulating water pumps. As stated in POWER MAGAZINE, (ISSN 0032-5929, July/August 1998, page 26):

"Over the last few years, new designs have evolved to boost efficiencies of steam power plants, and the steam turbine is a large part of this effort. Efficiencies of 45% (LHV) [Lower Heating Value] or higher are now possible with the latest fossil-fired steam plants using the highest steam parameters, advanced feedwater heating cycles, boiler and turbine metallurgies, etc."

To obtain an overall plant efficiency of 45% LHV, including the boiler efficiency and parasitic power requirements, typically means that the basic steam cycle efficiency must be even higher than 45%. With a boiler efficiency of 85%, parasitic power requirements of 2.5%, a ratio of HHV (higher heating value) to LHV (lower heating value) of fuel of 1.11 (typical for natural gas), and a plant efficiency of 45% (LHV), the basic steam cycle efficiency would calculate to $$48.9\% = 0.45/(0.85 \times (1 - 0.025) \times 1.11) \tag{1}$$

As seen from FIG. 4, the use of a reheat steam cycle can increase the basic Rankine Cycle efficiency by 4.79% at the tabulated steam pressures. However, the use of reheat as well as increased inlet pressures and feedwater heating can boost efficiency by at least 10.3% for sub-critical steam conditions. (Note that efficiency improvement is the ratio of a particular option efficiency to the base efficiency. Thus, a 40% efficient cycle would convert 40% of the input energy to electricity. That is twice as much as a 20% efficient cycle. Therefore, the efficiency improvement from a 20% efficient cycle to a 40% efficient cycle is 100%, or twice as much output).

Fuel efficiency is of the utmost importance at power plants and a large central coal-fired power plant may expend approximately US$140 million annually for fuel, assuming a plant rating of 1000 MW, 45% thermal efficiency LHV (lower heating value of the fuel), US$2.00 per million BTU for fuel, and 8500 operating hours per year. Given these facts, even a 1% increase in efficiency will equate to large cost savings in fuel (US$1.4 million annually).

Combined Cycle Application

Although the Rankine Cycle has been well proven, today's more strict energy and environmental standards require more emphasis be placed on fuel efficiency and low emissions from power plants. As a result, new combined cycle plants are being designed and built.

FIG. 5 is a conceptual schematic for a combined cycle application. In the general sense, combined cycle is not limited to a Brayton Cycle topping cycle and a Rankine Cycle bottoming cycle, but can be any combination of cycles. The topping and bottoming cycles could be the same cycle using different fluids. Either way, FIG. 5 would be applicable. In FIG. 5, the topping cycle fluid (TCF) (501) enters the topping cycle engine (TCE) (502) where fuel (CFT) (503) is added to raise its temperature. The fluid performs work that is converted by the topping cycle engine into shaft horsepower. This shaft horsepower drives the topping cycle load (TCL) (504). This load could be an electrical generator, pump, compressor, or other device that requires shaft horsepower. The exhausted fluid from the topping cycle engine is directed through an exhaust line (505) to a heat recovery device (HRD) (506), and then exhausts to an open reservoir (507).

For this example, the topping cycle is an open cycle. In other words, the topping cycle fluid is taken from a large reservoir and discharges to that same reservoir. The heat recovery device (506) captures a portion of the topping cycle exhaust energy and transfers it to the bottoming cycle fluid (BCF) (508). In this example, the bottoming cycle fluid is heated at three separate pressure levels: a high-pressure line (509), intermediate pressure line (510), and low-pressure line (511). These fluids then travel to the bottoming cycle engine (BCE) (512) where it produces shaft horsepower to drive the bottoming cycle load (BCL) (513). Again, this load could be an electrical generator, pump, compressor, or other device that requires shaft horsepower.

From the bottoming cycle engine, the bottoming cycle fluid enters a heat exchanger (HEX) (514) where heat is rejected. The bottoming cycle fluid then enters a pump or compressor or other fluid transfer device (FTD) (515) where it is then returned to the heat recovery device (506). For this example, the bottoming cycle is a closed cycle, meaning that the bottoming cycle fluid is continuously circulated within a closed loop. There could be more than two cycles in this process, and any of the cycles could be either open or closed loop. This describes the basic fundamentals of a combined cycle application.

HRSG In Combined Cycles

In many cogeneration and combination GT/ST power plants built today, combined cycle plants have come to mean power plants that utilize a Brayton Cycle as the topping cycle and a Rankine Cycle as the bottoming cycle. These plants utilize a gas or combustion turbine (GT) as the prime mover (Brayton Cycle machine), with a boiler at the exhaust of the gas turbine to recover the waste heat. This boiler is typically referred to as either a waste heat boiler (WHB) or a heat recovery steam generator (HRSG). It may also have burners in place to increase the exhaust gas temperature and produce more steam than that available from just the waste heat (supplemental firing). The HRSG produces steam that is then sent to the steam turbine (ST) to produce more power. Due to the high temperatures of the working fluid in the GT (approximately 2400° F. for GE industry standard "F"-class technology machines and 2600° F. for Westinghouse industry standard "G"-class technology machines), and recovery of the waste heat, the combined cycle plants are much more fuel efficient than the conventional steam plants. In addition, with advances in GT technology and the use of either distillate oil or natural gas fuel, the emissions from the combined cycle plants are extremely low. FIG. 6 illustrates a typical combined cycle application.

The HRSG is distinctly different from a conventional Rankine Cycle boiler. A Rankine Cycle boiler is fueled by a variety of fuels, including oil, natural gas, coal, biomass, as well as others. These Rankine Cycle boilers may also use a combination of fuels as well. The HRSG may not utilize any fuels at all, but only capture and utilize the exhaust heat from the GT. If it is supplementary fired, the HRSG will require more refined fuels such as natural gas or distillate oil. Solid fuels such as coal and biomass are not typically utilized in these types of boilers.

As seen from FIG. 6, there are numerous sections to the HRSG, including three evaporator sections (one for each pressure level), economizers, superheaters, and a reheater. Sections (601) and (602) are economizers. These are large tubed sections in the HRSG that preheat water before it is converted into steam in the Evaporator. Sections (603), (606), and (609) are LP, IP, and HP evaporators respectively. Sections (604), (605), and (607) are feedwater heaters. Section (608) is the IP superheater while sections (610) and (612) are HP superheaters. Section (611) is the reheater section. These HRSGs are typically very large and heavy pieces of equipment with literally miles of tubes inside.

Steam from each pressure level is utilized in the power plant where required, but essentially, most steam is generated for the purpose of producing additional power in the ST. This means that the lower pressure levels of steam must be introduced or admitted to the ST at the proper point on the ST other than the HP inlet. It also means that the ST must have provisions (openings, nozzles, connections, trip valves, etc.) where this steam may be admitted, and that at the operating conditions the steam pressure in the ST at these connections must be less than the pressure of the steam from the HRSG corresponding boiler sections. Otherwise, steam will not flow into the ST.

As noticed from a comparison of FIG. 6 with FIG. 3, the conventional Rankine Cycle utilizes feedwater heaters that take steam from the ST to preheat feedwater, while the HRSG utilizes the GT exhaust heat to provide this function. Therefore, conventional steam fed feedwater heaters are not typically employed in combined cycle applications. In GE informative document GER-3582E (1996), entitled "Steam Turbines for STAG™ Combined Cycle Power Systems", M. Boss confirms that feedwater heaters are not utilized in the prior art:

"Exhaust sizing considerations are critical for any steam turbine, but particularly so for combined-cycle applications. There are usually no extractions from the steam turbine, since feedwater heating is generally accomplished within the HRSG".

Another modification typically used for combined cycle applications is the use of two boiler feed pumps (630), and (631), typically referred to as the LP and HP BFPs respectively. This arrangement allows the LP pump to provide pressurized water for the LP and IP pressure levels and the HP pump provides water for the HP pressure level, which saves pump horsepower. For large combined cycle applications, the steam turbine/condenser arrangement is similar to the Rankine Cycle depicted in FIG. 3, (although internally, the steam path designs are totally dissimilar).

HRSG/Combined Cycle Disadvantages

General Disadvantages

With current technology, maximum inlet pressures to the steam turbine for combined cycle applications are nominally 1800 psia with inlet steam temperatures near the limit of 1050° F. for both the inlet and reheat steam. Some of the disadvantages of this HRSG arrangement for combined cycle applications are as follows:

1. Steam cycle efficiencies are much lower than those of conventional steam power plants.
2. Multiple evaporator sections are required to maximize heat recovery. This results in increased equipment and maintenance costs.
3. Multiple evaporator sections require the plant operators and control systems to monitor and control all boiler (evaporator) drum levels.
4. The HRSGs with the multiple sections are very large, require large amounts of infrastructure building volume, large amounts of floor space, and large foundations to support the weight of the HRSG.
5. The HRSGs are expensive (approximately $10 million for a HRSG that recovers exhaust gas heat from one GE Frame 7 GT).
6. Maintenance increases with the number of components, evaporator sections, controls, and other devices.

7. Low-pressure steam (steam other than the highest pressure steam) has much less ability to produce power in the ST than higher pressure steam.
8. Partial load, off design operation, and other conditions besides the design conditions typically have reduced heat recovery and lower cycle efficiencies.
9. Increased amounts of tubing in the HRSG to enhance heat recovery add flow restriction to the exhaust gases from the GT and this increased back pressure decreases GT output and efficiency.
10. Gas turbine exhaust temperatures are not sufficient to produce some of the elevated steam conditions now used in advanced steam cycles (600° C. which is equivalent to 1112° F.).
11. Balancing problems in the reheat lines with multiple GTs (typically three or more) make it difficult to utilize large STs in combined cycle power plants in the prior art. For modern, large, and efficient combined cycle plants such as a GE S207FA, the steam turbine rating is approximately 190 MW, which is much smaller than GE's large steam turbines which can exceed 1200 MW. For more information on large steam turbines, reference the informative paper issued by General Electric Company (GE) entitled "Steam Turbines for Large Power Applications" by John K. Reinker and Paul B. Mason (General Electric Reference GER-3646D, 1996).

Part Load Operation Inefficiencies

Another disadvantage of the combined cycle application is partial load (part load) operation. As the system to which a power plant is connected reduces its load requirement, the power plant must respond by providing less output. This load modulation allows for a constant speed on the machinery and a constant frequency of power (e.g., 60 Hz in the United States and 50 Hz in Europe). To modulate the load at a combined cycle plant, less fuel is burned in the GT, and the power output is reduced. This typically requires a reduction in the GT firing temperature and/or a reduction in GT airflow.

Part load operation reduces the efficiency of the GT, thus reducing the efficiency of the entire combined cycle plant. FIG. 7 illustrates a typical curve for a large modern GT with inlet guide vanes (IGVs) to modulate inlet airflow. Even with the enhanced part load efficiency gained by the use of IGVs, at 60% load (Generator Output—Percent Design), the GT consumes over 70% of the fuel required at full load (Heat Consumption—Percent Design). This represents a 17.5% increase in heat rate (specific fuel consumption). For GTs without IGVs, this decay in performance would be even more pronounced.

To help offset this part load decay, plus provide more power output for a given amount of hardware (sometimes referred to as power density), manufacturers can provide combined cycle power plants with two GTs, each with its own HRSG, feeding into one ST (referred to as a 2-on-1 arrangement). With an arrangement such as this, when the power plant load decreases to slightly less than 50% for a 2-on-1 arrangement (2-GTs, 1-ST), one GT can be shut down, and the remaining GT can return to near 100% output. This mode of operation increases part load efficiency below 50% of total plant load as illustrated graphically in FIG. 8. This graphically illustrates a typical two GT comparison taken from GE informative document GER-3574F (1996), entitled "GE Combined-Cycle Product Line and Performance" by David L. Chase, Leroy O. Tomlinson, Thomas L. Davidson, Raub W. Smith, and Chris E. Maslak for a curve of GE combined cycle part load performance with a 2-on-1 arrangement. For a 3-on-1arrangement, switchover from three to two GTs could occur slightly below 67% load. This still provides for substantial increase in plant heat rate at part load conditions. Note that providing this increase in part load efficiency occurs as a result of higher equipment costs. The prior art has yet to solve the efficiency problem without the addition of more equipment that increases the overall power plant costs.

Supplementary Firing of HRSG

Another solution to add flexibility to the operation of a combined cycle power plant is the use of supplementary firing in the HRSG. This mode of operation is when fuel is burned in the HRSG just after the GT (or at some intermediate point within the HRSG). This increases the temperature of the exhaust gas to the HRSG and produces more steam that can be sent to the ST. This allows the plant to produce more power. However, the plant heat rate increases, and fuel efficiency decreases accordingly. This result is stated by Moore of GE in U.S. Pat. No. 5,649,416. This patent, as well as U.S. Pat. No. 5,428,950 by Tomlinson, is referenced by Rice in U.S. Pat. No. 5,628,183. Therefore, supplementary firing of the HRSG is considered by the manufacturers to be a means to obtain more output, but with a penalty on efficiency. GE informative document GER-3574F (1996) entitled "GE Combined-Cycle Product Line and Performance" by David L. Chase, Leroy O. Tomlinson, Thomas L. Davidson, Raub W. Smith, and Chris E. Maslak states that "incremental efficiency for power produced by supplemental firing is in the 34–36% range based upon lower heating value (LHV) of the fuel."

Also in this GE document, Table 14 indicates that HRSG supplemental firing can increase combined cycle plant output in the prior art by 28%, but only with an increase in overall combined cycle heat rate (specific fuel consumption) of 9%. No technique has been shown in the prior art to eliminate this heat rate penalty associated with supplemental firing.

Additionally, supplemental firing in the prior art can be utilized to achieve higher ST/GT ratios than is typical for conventional combined cycles. However, operation at these high levels of ST/GT output are typically short in duration to meet peak power demands, and long term operation at these ratios is not economical. Therefore, conventional combined cycle power plants that are designed with ST/GT ratios approaching unity do not operate predominantly as Rankine cycle power plants, but do so only to satisfy temporary peak plant loads, and do so with a significant efficiency penalty at all operating conditions.

Gas Turbine Performance Decay

As mentioned in the discussion on the Brayton cycle, approximately ⅔ of the energy produced by the turbine section of the gas turbine is required to drive the compressor section, with the remaining ⅓ available to drive a load. This power consumed by the compressor at 67% of the turbine output, is much higher than the Rankine cycle example where the boiler feed pumps (BFP) only consumed 2% of the turbine power. Therefore, the GT is susceptible to performance decay if the compressor does not maintain optimum efficiency.

For example, a typical efficiency for an axial flow air compressor used with a large GT might be 90%. Therefore, if the compressor requires 67% of the turbine section output, the ideal power (100% efficient) would only be (0.67*0.90) =0.603 or 60.3%. If the compressor efficiency were to decay by 2.5%, its new efficiency would be (0.90*0.975)=0.8775 or 87.75%. The compressor power required would now be (0.603/0.8775)=0.6872 or 68.72%. Turbine net output would be reduced from 33% (1.00−0.67) to 0.3128% (1.00−0.6872). This represents a 5.2% loss in output (0.3128/0.33=0.9479). Therefore, it can be readily seen that small decreases in efficiency for the GT compressor lead to large decreases in efficiency and output for a GT.

The efficiency and rating loss of 5% from the above example is typical of many GTs after about one or two years of operation. This efficiency decay is largely a result of worn clearances in the compressor and erosion of the compressor blade tips. New blades and seals will typically restore the compressor efficiency to almost "new" condition efficiency. However, this is a costly and time consuming repair, and would probably only be done at major inspections, which are scheduled approximately every four years for modern GTs. Therefore, plant owners and operators will need to plan on this performance decay between major overhauls of the GTs.

Candidates for Improvement in the Prior Art

From the foregoing discussion it can be seen that parameters of the current and defined technology that are candidates for improvement may be described as follows:

Flexibility

Due to the electrical load demand in a particular region or marketplace, the electric utility (which distributes electrical power to the end users) determines the need for power based on current demand and future projections. For example, if this load was determined to be 850 MW, in a conventional Rankine cycle configuration the utility/Power Developer would contract with an Architect/Engineering (AE) firm to design and build such a plant. The boiler, pumps, condenser, steam turbine, and all the other plant auxiliaries would then be designed for the specified output of 850 MW. This can be accomplished largely due to the fact that steam turbines are custom designed and manufactured. However, with gas turbines being production line items, and combined cycles being primarily gas turbine based power plants, to achieve the highest efficiencies and best capital cost, a utility and/or power developer can no longer specify just their plant output, but must find the best fit for their needs from the available combined cycle offerings from the various manufacturers. For example, a review of the available combined cycle plants from the 1997 TURBOMACHINERY HANDBOOK, (USPS 871-500, ISSN 0149-4147), indicates that there are no 850 MW combined cycle plants available for 60 HZ applications. Thus, a plant developer's design flexibility is constrained by the current state of the art of combined cycle power plant equipment. This implies that in certain circumstances the equipment complement for a given power plant installation will not be optimal because of constraints placed on plant equipment configurations by the current state of the art.

Efficiency

Combined cycle power plants are extremely energy efficient compared to other conventional means of producing electricity. However, a large central combined cycle power plant rated for 1000 MW at 55% thermal efficiency LHV (lower heating value of the fuel) operating 8500 hours per year at full load with a fuel cost of US$3.00 per million BTU of fuel will expend approximately US$175 million annually for fuel. Even a 1% increase in efficiency will equate to large savings in fuel (US$1.75 million annually).

In U.S. Pat. No. 4,333,310 issued to Robert Uram, a control method is utilized which monitors the steam temperature to the ST and modulates the afterburner (supplemental firing) to control the temperature of the superheated steam. While providing optimum ST inlet temperatures, this function does little to affect load. In this patent, Uram states "It is desired that the steam turbine be operated in what is called a "turbine following" mode wherein the plant is supplying electrical power to a load, such that the steam turbine follows the gas turbines and each afterburner positively follows a respective gas turbine. In other words, the heat contributed by the afterburner follows the temperature of the gas turbine exhaust gas, and the steam produced by the gases exhausted from the afterburners is used in total by the steam turbine."

These teachings of the prior art are in direct contrast to that of the present invention in which the heat contribution via supplemental firing is independent of the gas turbines, and the gas turbines are designed to operate substantially at their optimal full rated capacity.

Installed Cost

Next to fuel costs, the largest cost for a combined cycle plant is typically debt service. Manufacturers, engineering firms, and owners are always interested in finding ways to reduce the installed cost of power plants. At 8% interest and US$450 per kW of capacity, a 1000 MW combined cycle power plant would have a debt service of approximately US$45 million per annum for 20 years. Reducing the capacity cost, in US$/kW, directly reduces the debt service.

Temporary Capacity Extension During Peak Demand Loading

One dilemma that faces power plant owners and utilities is the proper selection of power plant capacity. Selecting a plant that is too small results in power shortages, brownouts, and/or the need to purchase expensive power from other producers. Selecting a plant that is too large results in operation at lower efficiency during part load and increased capital cost per kWh produced. In many situations the problem faced by power plant developers is the need to provide for peak power needs and temporary demand loading. This peak may occur only in certain seasons for a limited span of time. Typically in the summer months during peak hours on the hottest days is the most challenging time for power producers to meet the system load. Having the ability to provide excess capacity during this time period is highly desirable, and in the emerging arena of electrical power deregulation, it may prove to be very lucrative. For example, in the early summer of 1999, power shortages in the Northeast United States have caused concern for the system's ability to meet peak power demands. Some local newscasts have reported costs for capacity at $30/MWh during normal periods and as high as $500/MWh during peak. However, even much greater capacity costs have been incurred, as reported in POWER MAGAZINE, (ISSN 0032-5929, March/April 1999, page 14): "Reserve margins are down nationwide from 27% in 1992 to 12% in 1998, according to Edison Electric Institute, Washington, D.C., because deregulation uncertainty has caused capacity additions to stall. Last summer's Midwest [United States] price spikes, up to $7000/MWh, garnered most of the press coverage, but spikes of $6000/MWh also occurred in Alberta . . . "

However, providing peak power will not be lucrative if the power plant owners have to pay for this capacity, pay the debt service, and yet make revenue on this extra capacity only during a few days of the year. Therefore, power plants that can provide more output than normal during peak demand hours are needed to help supply system load during these peak demands.

Reference FIG. 31B for a graphic illustrating the relative percentage of time that a typical power plant spends in peak, intermediate, and base loading conditions. From this graphic it can be surmised that it would never be profitable to design a power plant to peak loading conditions, as they occur less than 10% of the time. Since prior art power plants are generally incapable of wide variations in peak power output, the only practical option available for present power providers is to purchase power over the electrical grid during times of peak power demand. The present invention teaches a system and method which permits this peak demand to be satisfied without the need for purchasing external power over the electrical grid, thus providing an economic advantage over the prior art.

Non-Local Power Generation/Distribution Reliability Issues

One significant problem with the prior art is that the plant capacity is in general a relatively fixed and narrow range of power generation operation. When peak power demands are placed on the electrical grid, electrical power must be purchased from elsewhere on the grid where electrical demand relative to remote plant capacity is lower. There are several major problems with this mode of providing for peak power by rerouting remotely generated power plant capacity.

First, there exist losses associated with transmission of power from remote sites to the place where the electrical power is being demanded. For example, a hot summer day in New York City may require diversion of power from Canada or the western United States, resulting in significant line losses during transmission.

Second, there is a reliability drawback in purchasing power from distant parts of the grid during periods of peak load. While it is possible to redistribute power, the tradeoff is instability in the electrical grid. What can happen is that small failures in remote parts of the grid can cascade throughout the grid to either cause additional equipment failures or cause instability in the grid voltage. Thus, while purchasing power from remote power plants may alleviate some local reliability problems with respect to providing electric power, the tradeoff is an overall reduction in the reliability of the entire electrical grid. Thus, relatively insignificant events in remote parts of the country can cascade throughout the electrical grid and result in serious electrical failures in major metropolitan areas.

Thus, given the above reliability concerns, it is in general always better to be able to provide electrical power local to the demand for that power. While the existing prior art relies heavily on power sharing and distribution, the present invention opts for the more reliable method of generating the power locally to provide a power generation system that is more efficient and reliable that the current state of the art. It is significant to note that the prior art limitations on plant output during peak load generally preclude local generation of the required peak power demand. This forces traditional power plants to purchase power from remote power plants at a substantial (10× to 250×) price penalty.

Operation and Maintenance Costs

Costs for personnel, fuel, maintenance, water, chemicals, spare parts, and other consumables, including other costs such as taxes and insurance, all contribute to Operation and Maintenance (O&M) costs. As the plant size grows, the amount of equipment increases, and as the complexity of the equipment increases, O&M costs also increase. In the quest for higher efficiency, more elaborate and expensive technology is being utilized in the gas turbines. The maintenance costs associated with exotic new materials, intricate blades, and complex hardware is projected to be significantly more expensive than the slightly less efficient, proven gas turbine hardware and associated plant designs.

To be prepared for an equipment failure, plant owners must retain large quantities of spares on hand at their facility. This constitutes inventory that has high costs in terms of both unused capital and taxes. Methods to reduce O&M costs are always desired by the plant owners and operators.

Fuel Gas Compression

Current projections are that natural gas will have a stable supply and price structure until the year 2010. This fuel is clean, efficient, and inexpensive, and thus is the preferred fuel for combined cycle applications. However, if the power plants are not located in close proximity to major natural gas pipelines, the lower pressure natural gas may have to be compressed to a sufficient pressure to be used in the GT. In addition, the higher efficiency GTs such as the Westinghouse model 501G require higher fuel gas pressure than GTs with lower pressure ratios, such as a GE model PG7241FA GT. This need for higher pressure natural gas requires expensive natural gas compressors that are critical service items (the plant cannot operate without them). These natural gas compressors require frequent maintenance and also consume parasitic power (the power to run the compressors reduces the net power available from the power plant to the grid). Reducing the need for these components reduces the plant installed cost, reduces real estate requirements, improves reliability, and increases the plant net output.

Plant Reliability

Electrical power reliability has become a facet that is demanded by both the residential consumer and industrial user of electricity. Therefore, the technology to produce power must be proven and reliable. In U.S. Pat. No. 5,628, 183, Rice proposes a higher efficiency combined cycle power plant. However, this system requires the use of diverters in the HRSG, natural gas reformers, and the use of steam superheated to 1400° F. These systems will all add greatly to the installed cost and O&M costs. In addition, to date, boiler tubes, HRSGs and STs have not demonstrated long term reliable operation at elevated temperatures above 1150° F., and HRSGs with diverters and natural gas reformers are as yet unproven in the marketplace.

Air Consumption

GT engines consume large quantities of air. A typical combined cycle installation will consume approximately 20 lbs. of air per kW of electricity produced. This equates to approximately 260 cubic feet (at sea level) per kW. This air must be filtered before it enters the GT to prevent foreign object damage in the GT. Periodically, the air filters must be cleaned and/or replaced. This adds to the O&M costs and increases plant downtime (time when the plant is out of service and unavailable to produce power).

In addition, the air consumed by the GT is discharged to the HRSG and then exhausted to atmosphere. As more air is consumed, more air must be exhausted. This represents an efficiency loss as the HRSG exhaust temperature is typically about 180° F. In addition, this airflow serves to heat the atmosphere and contribute to local air quality problems.

Plant Emissions

In order to obtain a permit to operate, a power plant must first obtain an air permit. This permit typically states the allowable levels of certain criteria pollutants that a plant may emit. Combined cycle power plants are very clean producers of power compared to other conventional methods, but are typically plagued by one criteria pollutant, nitrous oxides (NOX). This criteria pollutant is usually controlled by steam and/or water injection into the GT, dry low NOX combustion systems, and/or exhaust gas aftertreatment. The exhaust gas aftertreatment typically employed is "Selective Catalytic Reduction" (SCR) which essentially works by injecting ammonia ($NH_3$) into the exhaust gas stream in the presence of a catalyst at a specified temperature range to return the NOX formed by the combustion process into N2 and $H_2O$.

In U.S. Pat. No. 3,879,616 by Baker, et al., U.S. Pat. No. 4,578,944 by Martens et al., and U.S. Pat. No. 5,269,130 by Finckh, et al., the plant load is controlled by changes in the GT output. However, at partial load, GT NOX emissions are typically increased. Therefore, it may be necessary to introduce more ammonia into the exhaust gases for emission reduction. This increases O&M costs, and can be significant to the point where, at the plant design stage, the desired GTs cannot be used due to high emission levels at part load operation. Also, if run at full load, some plants may not require SCR, but due to part load operation, SCR will be required. Another factor related to emissions is air consumption. GTs require large amounts of air, and the more air that is consumed, the more potential there is for emissions.

Environmental Considerations

Besides air emissions, a power plant must be concerned with other environmental impacts as well. To operate a steam plant, a clean source of water must be available to provide make-up water. This make-up water is used to replace steam/water that is lost to ambient through leaks, blowdown, or other loss. Blowdown is the water that is taken from the evaporator sections of the HRSG and dumped to the sewer. This blowdown typically is taken from a low point on the HRSG to remove feedwater that has high concentrations of minerals and deposits. This process helps keep the steam path clean and minimizes ST deposits and blade failure due to stress corrosion cracking. This blowdown must be discharged into rivers, streams, etc. and as such requires water permits that may be difficult and time consuming to obtain from regulatory authorities.

Distributed Plant Control System (DCS)

Modern combined cycle plants typically use a distributed control system (DCS) to control the entire plant. These DCS controls integrate with the individual control systems on the GTs and STs. Many other parameters can be monitored and controlled by the DCS. Use of controls to better either efficiency or operation is described in U.S. Pat. No. 3,879,616 by Baker et al., U.S. Pat. No. 4,201,924 by Uram, and U.S. Pat. No. 4,578,944 by Martens et al. None of these patents, however, provide control of heat transfer in the HRSG. In U.S. Pat. No. 5,269,130 by Finckh et al., a method of controlling excess heat in the HRSG is utilized for part load operation of the GT. This method, however, does not provide comprehensive control, but only a means for recovering low temperature waste heat. None of the aforementioned patents has devised a method to control the exhaust gas temperature of the HRSG to its optimum temperature.

Plant Operational Efficiency

Combined cycle power plants in the prior art that are designed for maximum efficiency typically utilize multipressure HRSGs, commonly at three pressure levels. For each HRSG, and for each pressure level, the operations staff must monitor the steam drum level. Also, parameters such as water quality and chemical content must be monitored for each HRSG. Since the system load for any utility is constantly changing, combined cycle power plants are required, like other power producing plants, to be dispatched, or provide load as required to the electrical grid. This means the power plant will not operate at a fixed load, but will constantly be modulating load to meet the system demand. To increase load, supplementary firing (additional fuel burned at or near the inlet to the HRSG to add energy to the exhaust gases) can be accomplished. However, this is detrimental to overall plant efficiency. This is noted by Rice in patent U.S. Pat. No. 5,628,183 with references to Westinghouse and General Electric studies. Moore in patent U.S. Pat. No. 5,649,416 states that "Supplemental firing of the heat recovery steam generator can increase total power output and the portion of the total power produced by the steam turbine, but only with a reduction in overall plant thermal efficiency."

Therefore, it is common in combined cycle plants to see little or no supplemental firing used. Therefore, to change and meet varying system loads, the GTs are brought from full load to part load operation.

As well as increasing emission levels as previously mentioned, this part load operation also has a detrimental effect on efficiency. FIG. 7 is a representative curve of GT efficiency versus load. At 100% load it consumes 100% fuel, however, at 60% load, it consumes 70.5% of full load fuel. This is an increase of 17.5% in specific fuel consumption. For large central power plants, this factor equates to significant added fuel costs. In addition, operation at part load on the GT typically increases the emission levels for the most difficult criteria pollutant, NOX. Part load operation of the GT also changes the exhaust gas flow through the HRSG. This change in flow upsets the heat transfer in the HRSG since this device is constructed with fixed heat exchange surface area. This phenomenon, as well as reduced GT efficiency, contributes to poorer overall efficiency at part load operation. If part load operation changes temperatures in the HRSG significantly, this could lead to ineffective operation of the SCR.

Steam Turbine Exhaust End Loading

Besides inlet pressure and temperature limitations, another common limitation for the steam turbine (ST) is the exhaust end loading. This essentially is a function of two parameters, exhaust end flow and exhaust pressure. These two factors essentially determine the volumetric flow through the last stage blading of the ST. For optimum operation, there is a range of volumetric flow typically specified by the ST manufacturers. As this volumetric flow increases, larger blades and/or more exhaust sections may be required.

However, due to mechanical limitations (centrifugal force), once the largest available blade volumetric limits are reached, more sections and more blades must be added to the exhaust end of the ST to accommodate this flow. This adds to the installed cost and increases the real estate requirements of the ST. Due to its configuration, a conventional combined cycle sends HP steam to the ST HP inlet, then adds steam from the IP section of the HRSG to this flow at the ST IP section inlet, then adds more steam from the LP section of the HRSG to this flow at the ST LP section inlet.

Therefore, in this arrangement, the HP and IP sections of the ST see relatively lower flows and lower volumetric efficiencies than the LP section. This arrangement leads to STs that are at or near the exhaust end limit of the ST. This provides for little in the way of temporary capacity extension for peak power production and leaves little or no ability to uprate (increase) the ST in the future to a higher power rating. Overall, this ST arrangement is less efficient than conventional steam plant STs since the HP and IP sections have low volumetric flows.

In GE informative document GER-3582E (1996), entitled "Steam Turbines for STAG™ Combined Cycle Power Systems", by M. Boss, the author discusses the exhaust end loading that is associated with STs in the prior art:

"Exhaust sizing considerations are critical for any steam turbine, but particularly so for combined-cycle applications. There are usually no extractions from the steam turbine, since feedwater heating is generally accomplished within the HRSG. Generation of steam at multiple pressure levels (intermediate pressure and/or low-pressure admissions to the turbine downstream of the throttle) increases the mass flow as the steam expands through the turbine. Mass flow at the exhaust of a combined cycle unit in a three-pressure system can be as much as 30% greater than the throttle flow. This is in direct contrast to most units with fired boilers, where exhaust flow is about 25% to 30% less than the throttle mass flow, because of extractions from the turbine for multiple stages of feedwater heating".

Real Estate

A combined cycle installation, although typically smaller than conventional steam plants, still occupies a large area. The HRSGs with their stacks are particularly large and require a great deal of floor area (the HRSG for one Westinghouse model 501G gas turbine is approximately 40 feet wide, 70 feet high, and 200 feet long). With the trend towards deregulation of electrical power, plant owners will be seeking the ideal site for their power plants. In many instances, this is near to the electrical load, which is usually in either an urban or industrial area. This puts the power plant close to the end user of electricity, and eliminates the need for high voltage transmission lines (which also require large amounts of real estate). However, available real estate for a large combined cycle power plant may be difficult and expense to attain in these areas.

Some prime real estate for these combined cycle power plants will be existing power plants that can be repowered as combined cycle facilities. These sites have the advantage of being properly zoned with the necessary electrical and mechanical infrastructure. The drawback is that the site may lack the necessary real estate for a combined cycle repowering project. Therefore, it is desirable from a space efficiency viewpoint as well as from a cost perspective to keep plants as small as possible.

Noise/Public Acceptance

Public acceptance is becoming increasing difficult for many utility power plant projects. Factors such as noise, traffic increase, unsightliness, pollution, hazardous waste concerns, and others contribute to public disapproval of power plants in close proximity to populated areas. A plant that can be built smaller, quieter, with less equipment, lower emissions, and maintain a low profile is preferred over a larger, more obvious plant. Therefore, more compact, higher "power density" (power per unit volume) combined cycle power plants are desired.

However, to meet the current trends in demand for power consumption, conventional power plants being constructed today simply replicate existing proven plant designs to meet the increased energy consumption demand. No attention is currently being given to the issue of whether plants may be redesigned to consider the ancillary issues associated with the public acceptance of the plants themselves.

Heat Rejection

Both conventional steam and combined cycle power plants require some form of heat rejection. This is typically to condense the low-pressure steam from the ST exhaust back into water. This heat rejection can be to the air, river, lake, or other "reservoir" that will absorb the heat. Since this heat rejection will have an effect on the local environment and possibly the local biological life (i.e., fish in a river), methods to reduce heat rejection requirements are always in demand.

Gas Turbine Performance Decay

Although combined cycle power plants demonstrate high efficiencies, these efficiencies are for "new" power plants. Since the combined cycles in the prior art are primarily GT based, their efficiency levels are very susceptible to GT performance decay, a phenomenon in which the efficiency of the GT degrades substantially (2% to 6%) within only a year or two of operation. This can be a significant factor in the cost of fuel as the overall combined cycle efficiency also degrades as the GT performance decays.

OBJECTS OF THE INVENTION

Accordingly, the objects of the present invention are to circumvent the deficiencies in the prior art and affect the following objectives:

1. Provide a combined cycle power plant that has more design flexibility than current offerings so that developers can have state-of-the-art facilities, but purchase them at the capacity they need.
2. Reduce overall fuel consumption at rated output, but especially at part load conditions, as the plant will likely spend only a small fraction of its operating time at rated load.
3. Reduce installed cost of the power plant such that the debt service is substantially reduced and that financing by a bank or other lending institution is much easier for the owner.
4. Leverage the time value of money with regards to capital, maintenance, and fuel costs to make the creation of power plants more economically efficient and hopefully reduce the overall cost of electric power generation.
5. Provide the ability for the power plant to meet peak demand loads without sacrificing normal operation efficiency or significantly increasing the installed cost.
6. Reduce inefficiencies and losses associated with the transmission of power over long distances.
7. Increase the overall reliability of the electrical grid by permitting electrical power to be generated local to the demand during times of peak demand loads.
8. Reduce O&M costs. Besides fuel costs, the objective is also to reduce costs for maintenance, supplies, inventory, insurance, and other operating expenses.
9. Reduce the need for fuel gas compression.
10. Improve reliability.
11. Reduce air consumption and air filtering requirements.
12. Lower emissions of criteria pollutants, especially NOX.
13. Minimize the discharge of water from HRSG blowdown and other sources.
14. Utilize controls to the maximum extent feasible to increase efficiency, reliability, and heat recovery.

15. Simplify operation and devise methods and/or strategies to increase part load efficiency and reduce emission levels.
16. Optimize the ST efficiency by utilizing designs with improved volumetric efficiency and excess capacity to meet peak power demands.
17. Conserve space and land mass required to house the power plant by designing a compact, high power density arrangement.
18. Reduce noise, size, space requirements, and equipment to minimize the effect the power plant has on local residents and the community.
19. Keep heat rejection to a minimum.
20. Provide for economic and space efficient retrofit of existing steam power plant and combined cycle installations so as to reduce capital costs and the economic burden associated with major equipment additions and added real estate requirements.
21. Provide economic incentive for new plant construction to use environmentally friendly designs.
22. Design combined cycle power plants that are less susceptible to gas turbine performance decay.

These objectives are achieved by the disclosed invention that is discussed in the following sections.

BRIEF SUMMARY OF THE INVENTION

Briefly, the invention is a system and method permitting the use of fewer and/or smaller gas turbines (GTs) and heat recovery steam generators (HRSGs) in a combined cycle application. This conventional combined cycle equipment is replaced by a larger steam turbine and continuously fired heat recovery steam generators to provide a variety of economic, energy conservation, and environmental benefits.

Present technology utilizes multi-pressure HRSGs to maximize the heat recovery from exhaust gases of a GT. This arrangement is commonly used because the prior art teaches away from using continuously fired HRSGs because of the common belief that these configurations have lower thermal efficiencies. Despite this commonly held belief, the present invention teaches that continuously fired HRSGs can be configured with thermal efficiencies on par or better than current combined cycle practice. However, to obtain this level of efficiency, the continuously fired HRSGs and ST must be configured and designed differently than current practice.

In several preferred embodiments of the present invention, the GTs are unchanged from the present art and exhaust to an HRSG. This HRSG, however, is designed as a single pressure level steam generator (SPLSG) (or primarily a single pressure level) which is optimized for continuous firing to produce higher pressure steam than in conventional combined cycle practice. In addition, the HRSG is designed to have controlled feedwater flows through the economizer/feedwater sections to maximize heat recovery. Also, the ST is designed as a larger unit, typical of that which would be found in a conventional Rankine Cycle plant, with reheat and conventional ST extraction steam fed feedwater heaters to maximize plant thermal efficiency. This benefit of a larger ST typical of a conventional steam plant is described by Moore in patent U.S. Pat. No. 5,649,416 which is assigned to General Electric:

"Conventional steam power plants benefit in both lower cost and higher efficiency through the economies of scale of large ratings. A traditional rule of thumb regarding cost is that the doubling of plant rating results in a ten percent reduction in cost. The cost of one large generating unit according to this rule would be expected to cost on the order of ten percent less than that for a plant with two half-size units. Efficiency is also improved with increased size and power ratings. As with all turbomachinery, the internal efficiency of the steam turbine is a strong function of the inlet volumetric flow, which is directly proportional to the rating. Also, as is well known, the thermal efficiency of the Rankine Cycle increases with the pressure at which steam is generated. Increasing pressure, however, reduces the volumetric flow of the steam at the turbine inlet, reducing the internal expansion efficiency. The offsetting effect in overall efficiency, however, is much greater at low volumetric flow than at high volumetric flow. Therefore, an additional performance related benefit of increasing turbine size is that higher steam throttle pressure can be utilized more effectively."

With the use of ample supplemental firing in the HRSG, the bottoming cycle with the present invention is given the liberty to be more independent from the GT operation. Therefore, the GTs can be operated at full load while the overall plant load is modulated over a wide range of its full load capability by only changing the supplemental firing rate and the STs load. This increases the overall plant rating when utilizing a given set of GTs, provides flexibility for the combined cycle plant rating through variation in the rate of supplemental firing, as well as increases the overall plant thermal efficiency at part load. In addition, it simplifies operation, and has the potential to reduce emissions.

By designing the HRSGs to be capable of firing to 2400° F., an exemplary single 2-on-1 arrangement of two GTs and one large ST replaces two 2-on-1 arrangements (4-on-1 arrangements are typically not available when reheat is utilized due to balancing problems on the reheat lines). This exemplary configuration saves two GTs, two HRSGs, one ST, three switchgear, three transformers, and the accessories, real estate, and maintenance required to support this equipment. Capital costs for the power plant in US$/kW are thus greatly reduced using the teachings of the present invention.

All this is accomplished by utilizing proven turbomachinery technology and hardware. The continuously fired HRSG with a single pressure is a novel concept for this application, but is not beyond technological practice nor capability for implementation in the current art. Therefore, there are little or no compromises in reliability. The general architecture for several preferred embodiments of the present invention is illustrated in FIG. 13, with several exemplary embodiments having more detail illustrated in FIG. 9 and FIG. 15.

Improvements Over the Prior Art

The present invention solves the problems present in the prior art by achieving the following objectives:

1. Providing more design flexibility in the combined cycle power plant so that developers can still achieve state-of-the-art efficiency, but yet specify the capacity they need.
2. Reducing overall fuel consumption by improving both full load and part load efficiency.
3. Reducing installed costs by increasing the power density of the installation (more power output per a given amount of equipment).
4. Reducing the overall cost of producing electricity by reducing the three major factors associated with its production: fuel consumption, capital costs, and maintenance costs.
5. Provide temporary capacity for attaining peak loads by utilizing supplemental firing to produce more steam, as well as having the option to operate the ST at overpressure (inlet pressure slightly above rated) and reducing extraction steam flow to the feedwater heaters.

6. Increasing the efficiency of the power grid by permitting local generation of power during periods of peak loading. By permitting local power generation during these peak periods, inefficiencies associated with "importing" power from other areas of a given country (and outside a country) are reduced or eliminated. (These are energy losses associated with transmitting power through power transmission lines).

7. Increasing the reliability of the electrical power grid by reducing the long haul transmission of electrical power during times of peak power loading.

8. Reducing O&M costs, primarily by reducing the amount of equipment and systems and utilizing equipment that has lower maintenance costs per kWh produced (low maintenance cost STs versus high maintenance cost GTs).

9. Minimizing the need for fuel gas compression by utilizing fewer GTs and GTs with lower fuel gas pressure requirements in the cycle in conjunction with a larger ST.

10. Improving reliability by reducing the complexity of the power plant design.

11. Reducing air consumption by utilizing fewer GTs.

12. Lowering emissions of criteria pollutants, especially NOX, by operating the GTs at a steady, low emissions operating point, utilizing cleaner GTs, and utilizing fewer GTs.

13. Minimizing blowdown and other discharge through higher efficiency cycles that require less steam flow per kW of electricity generated.

14. Utilizing controls to increase efficiency, reliability, and heat recovery.

15. Simplifying operation by running the GTs at full load over a wide range of operation (total combined cycle plant output) and reducing HRSG pressure levels to only one.

16. Maximizing ST efficiency by increasing volumetric flows, especially in the HP and IP sections.

17. Conserving space and land mass with less equipment and higher power density designs.

18. Reducing noise, size, and space requirements with less equipment.

19. Keeping heat rejection to a minimum by utilizing high efficiency cycles with less heat rejection per kWh produced.

20. Providing a combined cycle design that is more compatible with existing steam power plants allowing for more compact and cost effective retrofits of these existing plants to high efficiency combined cycle technology.

21. Minimizing air consumption, emissions of criteria pollutants, and heat rejection to the atmosphere, but providing these environmental benefits with lower cost than the conventional combined cycles.

22. Reducing the impact of gas turbine performance decay by utilizing a combined cycle power plant that is less dependent upon the gas turbines and their efficiency.

BRIEF DESCRIPTION OF THE DRAWINGS

For a fuller understanding of the advantages provided by the invention, reference should be made to the following detailed description together with the accompanying drawings wherein:

FIG. 4 illustrates a comparison table of efficiencies between the basic Rankine Cycle and the Rankine Cycle with various efficiency enhancements;

FIG. 8 illustrates part load performance for a General Electric combined cycle power plant with two GE S207 GTs via graphs indicating performance characteristics for one and two gas turbine (GT) operation;

FIG. 9 illustrates a general arrangement of one preferred embodiment of the present invention as applied to the application of an electric power plant;

FIG. 10 illustrates a tabular comparison of the efficiencies that may be realized using the teachings of the present invention as compared to the prior art;

FIG. 11 illustrates a typical graph of steam enthalpy versus temperature at 1800 psia pressure assuming water as the motive fluid;

FIG. 21 graphically illustrates the sources of energy inputs, losses, and efficiencies that are accounted for in an overall energy flow analysis;

FIG. 22 illustrates a typical GE 207FA combined cycle power plant configuration;

FIGS. 23A and 23B illustrate tabulated performance data for a typical GE 207FA 521 MW combined cycle power plant assuming a typical projected operation profile;

FIGS. 25A and 25B illustrate tabulated performance data for a typical Westinghouse 2X1 501G 715 MW combined cycle power plant assuming a typical projected operation profile;

FIG. 26 illustrates a typical 725 MW combined cycle power plant defined by a preferred embodiment of the present invention;

FIGS. 27A and 27B illustrate tabulated performance data for a 725 MW preferred embodiment of the present invention using a water-walled HRSG assuming a typical projected operation profile;

FIG. 32 illustrates a typical conservative weekly load profile utilizing the data contained in FIG. 31A;

FIG. 34 tabulates an economic comparison of an exemplary power plant utilizing the teachings of the present invention to both a GE S207FA combined cycle power plant and a Westinghouse 2X1 501G combined cycle power plant, both from the prior art;

FIGS. 36, 37, and 38 tabulate some of the process data associated with FIG. 35;

FIGS. 40, 41, and 42 tabulate some of the process data associated with FIG. 39;

FIG. 44 tabulates data for the comparison of a retrofit of an existing steam power plant to combined cycle technology between the preferred embodiment and the prior art;

FIG. 45 illustrates a preferred embodiment combined cycle power plant utilizing a hybrid fuel arrangement with a combustible fuel (CF) boiler;

DESCRIPTION OF THE PRESENTLY PREFERRED EXEMPLARY EMBODIMENTS

Exemplary Disclosure

Figure 1:
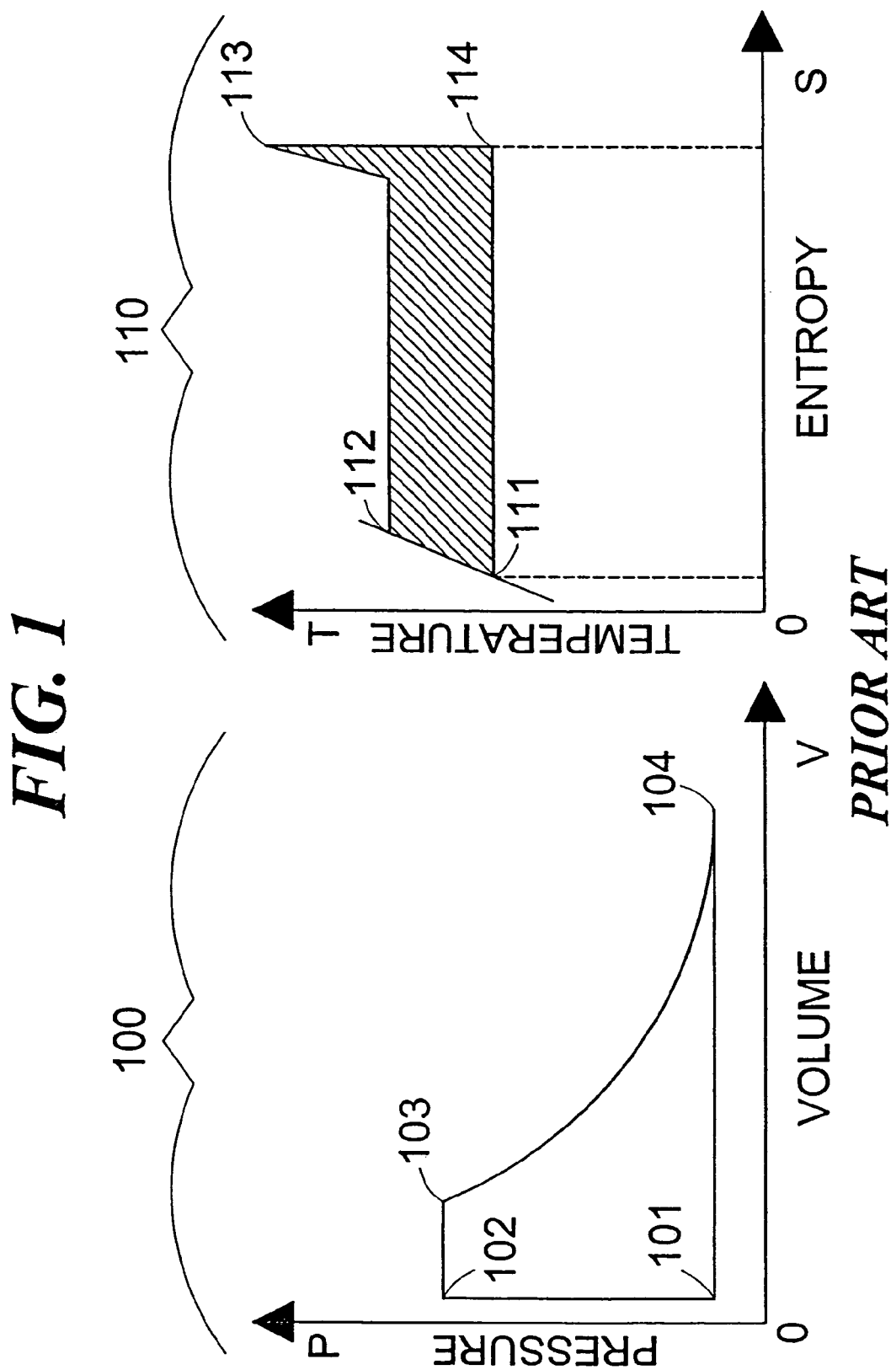
FIG. 1 illustrates a basic Rankine thermodynamic cycle.
Figure 2:
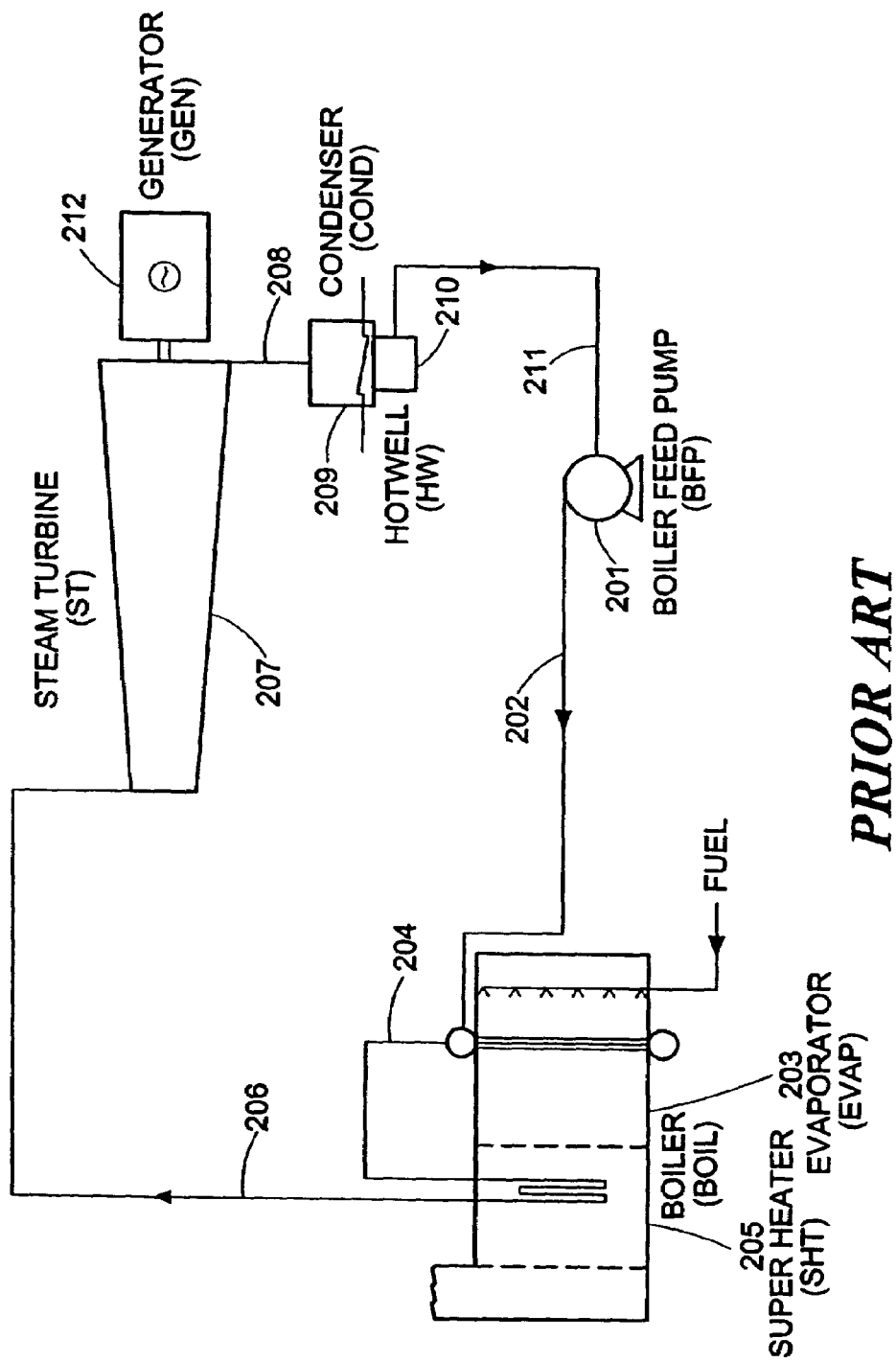
FIG. 2 illustrates a schematic of a conventional prior art power generation system implementing the basic Rankine Cycle.
Figure 3:
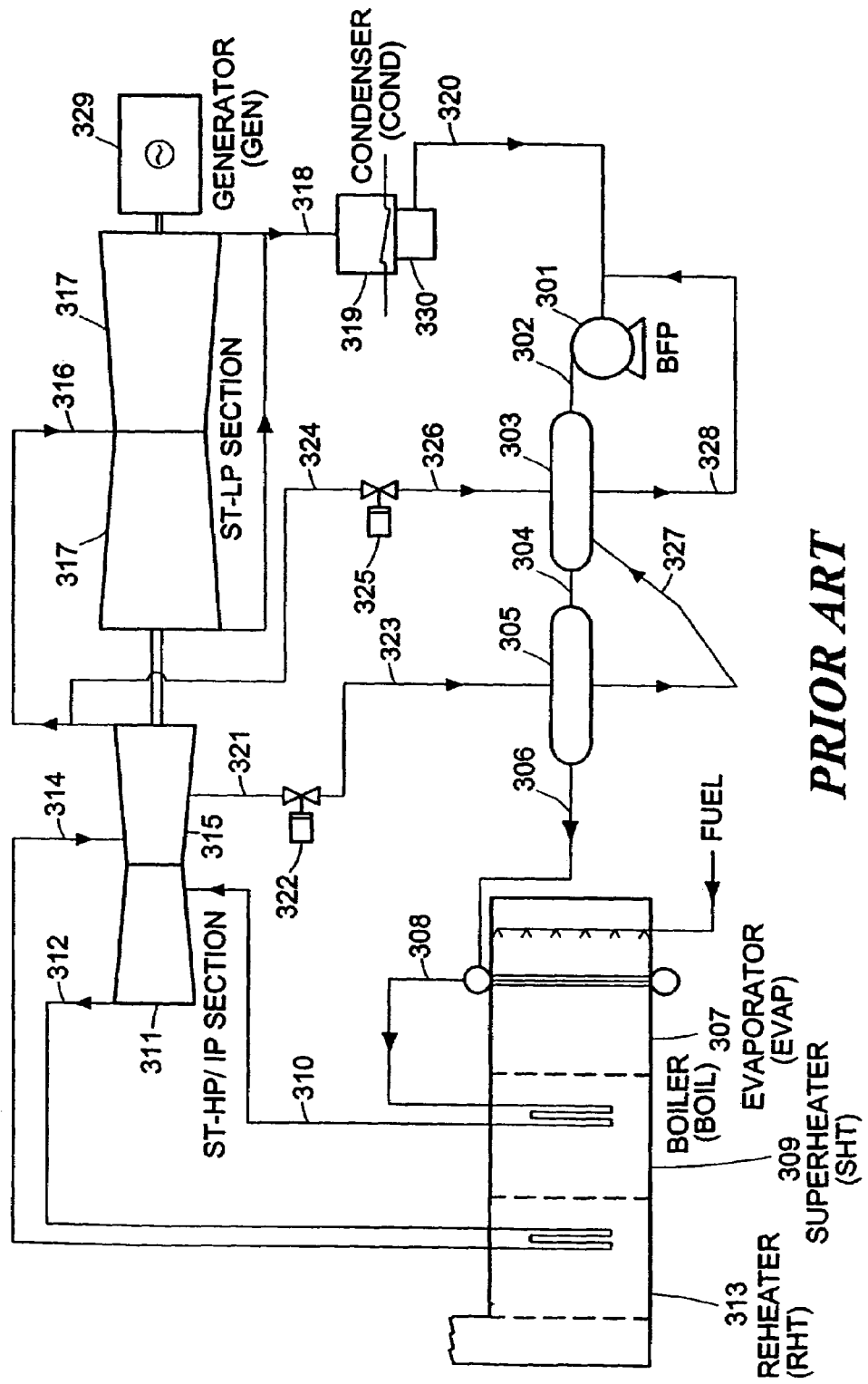
FIG. 3 illustrates a schematic of the Rankine Cycle including a reheat cycle and extraction steam feedwater heating as applied to a conventional prior art power plant application.

While this invention is susceptible to embodiment in many different forms, there is shown in the drawings and will herein be described in various detailed preferred embodiments of the invention with the understanding that the present disclosure is to be considered as an exemplification of the principles of the invention and is not intended to limit the broad aspect of the invention to the embodiment illustrated.

Diagrams and Flowcharts

It should be noted specifically within the context of the descriptions given in this document that schematics, flowcharts, diagrams, and the like may be augmented with components and/or steps with no reduction in the generality of the teachings of the present invention. Similarly, components and/or steps may be removed and/or rearranged in the following descriptions with no loss of generality. This notice is especially important with respect to exemplary process flowcharts, in which the teachings may be used by one skilled in the computer arts to generate control systems that are functionally equivalent, but which may rearrange or modify the disclosed steps and processes yet achieve the results as dictated by the present invention teachings.

Equipment

Throughout the discussion of the present invention contained throughout this document mention will be made to specific equipment from General Electric, Westinghouse, and other manufacturers. Specifically, much of the disclosure makes reference to the GE model S207FA power plant comprising GE model PG7241FA gas turbines as well as comparable equipment by Westinghouse and others. These references are exemplary only, and given to provide the reader who is skilled in the art a framework in which to understand the teachings of the present invention.

Rather than speak in terms of fictitious equipment which may not be familiar to those skilled in the art, this disclosure attempts to be more practical by illustrating the teachings of the present invention in terms of equipment that one skilled in the art will be familiar with and which is currently in use within the electric power industry. Nothing in this disclosure should be interpreted to limit the scope of the teachings of the present invention to a specific manufacturer or model of equipment. On the contrary, the present disclosure should be interpreted as broadly as possible with respect to the equipment to which the teachings may apply.

Overview

Steam has been used for power applications for decades, dating back to steam locomotives that burned solid fuel such as wood or coal to produce power. Up to and into the 1980's, steam power plants were still producing the bulk of the electrical power in the United States in either coal, oil, or nuclear-fueled power plants.

However, by the 1980's, many smaller cogeneration power plants were being designed and built. These plants utilized a gas turbine as their main engine with a heat recovery steam generator (HRSG) connected to the exhaust of the gas turbine to recover waste heat (typically 900° F. to 1200° F. exhaust gases) and convert it into steam. This steam was then utilized for various purposes, district heating, process steam, or generation of additional power in a steam turbine. This plant configuration, gas turbine, HRSG, and steam turbine became known as a combined cycle arrangement, and due to its high efficiency, low cost, and ease of construction, has become the preferred power plant for the emerging Independent Power Producers (IPPs).

However, through evolution, this combined cycle power plant has become a power plant that utilizes the gas turbine as its prime engine and the steam turbine as its secondary engine. An examination of the standard combined cycle packages offered by gas turbine manufacturers today will verify this statement, as in most combined cycle plants in the prior art, the gas turbines produce about two thirds of the total power output, with the steam turbines producing about the remaining one third. A review of the manufacturer's standard combined cycle offerings will illustrate this trend. The 1997 TURBOMACHINERY HANDBOOK, (USPS 871-500, ISSN 0149-4147), tabulates standard combined cycle power plants available from various manufacturer's including ABB, General Electric, and Westinghouse. In most every instance, the steam turbine(s) output is within the range of 40% to 60% of the gas turbine(s) output. General Electric informative document GER-3567G, 1996, "GE Heavy-Duty Gas Turbine Performance Characteristics", by Frank J. Brooks, provides the output for the gas turbines used in their combined cycle power plants.

Several preferred embodiments of the present invention recognize the combined cycle arrangement for its high efficiency, low cost, and ease of construction. However, the present invention takes a different perspective on the relative size of the individual engine types. Although modern gas turbines have efficiency levels in the 30 to 40% range (LHV), they require the use of an HRSG and steam turbine to achieve the combined cycle efficiency of 50 to 60% (LHV). In addition, to effectively recover the heat of the exhaust gases, these HRSGs typically have three pressure levels for the steam, high-pressure, intermediate pressure, and low pressure. The use of the intermediate and low-pressure steam results in an overall steam cycle efficiency of only 34 to 36%.

Modern large power plant steam cycle efficiencies, however, are in the 45% to 50% efficiency range. To achieve these levels, the use of low-pressure steam, as is the case with conventional combined cycles, is unacceptable. Therefore, several preferred embodiments of the present invention describe a method that utilizes only high-pressure steam to achieve high steam cycle efficiencies in a combined cycle configuration, yet still recovers as much heat from the exhaust gases of the gas turbine as the high efficiency, combined cycle technology in the prior art.

By this implementation, the new technology combined cycle power plant diverges from the typical arrangement in the prior art where the gas turbine (GT) was the prime (larger) engine and the steam turbine to gas turbine power ratio was approximately 1:2, to an arrangement where the steam turbine (ST) is typically the prime (larger) engine and the ST to GT power ratio (ST/GT) can typically be selected to be in the range of 0.75:1 to 2.25:1 or greater. This ratio is easily adjusted by the design of the steam turbine, the rated amount of supplemental firing, and the steam cycle.

During the operation of any power plant, the operations staff must modulate the power plant's output to the load on the system (power consumption by all users in the electrical grid). As the system load fluctuates, the total power produced by all the power plants connected to the grid must change to meet this fluctuation, otherwise, the speed of the equipment will change, and the resulting power produced will no longer be at 60 Hz (60 cycles per second for U.S. plants, etc.). This will have a dramatic effect on the equipment that the end users have in service (i.e. electric clocks will not keep accurate time, electric motors will not operate at appropriate speeds, etc.). Therefore, the utility and power plant personnel are responsible for maintaining a constant frequency or speed on their equipment. To achieve this, they must constantly change their power output to match that of the system. Note in European and various other countries this standard frequency is 50 Hz, versus 60 Hz in the United States and other countries in the Western Hemisphere such as Canada.

Figure 31A:
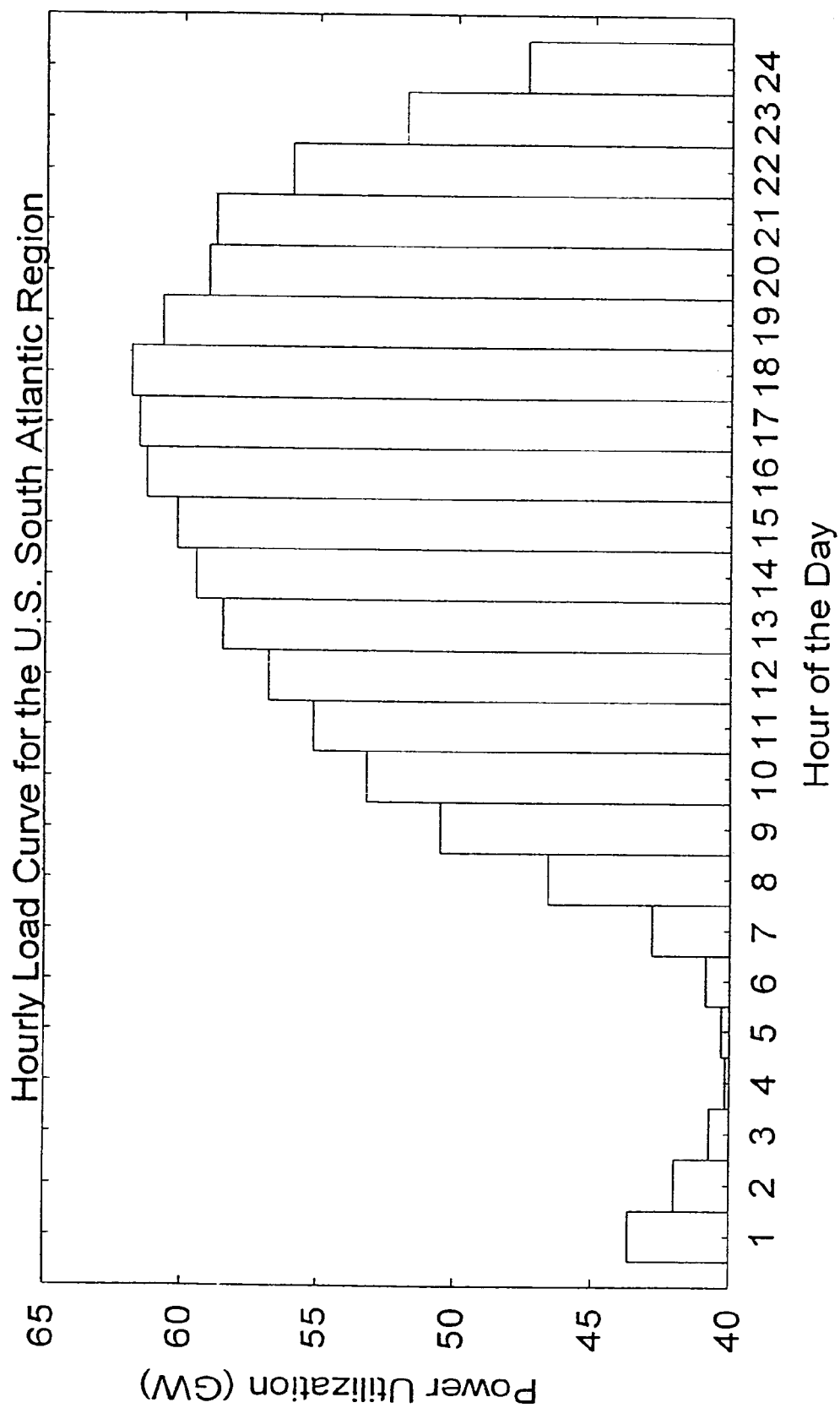
FIG. 31A graphically illustrates a typical hourly regional system load curve (from "Electricity Prices in a Competitive Environment: Marginal Cost Pricing of Generation Services and Financial Status of Electric Utilities" (DOE Report number DOE/EIA-0614))
Figure 31B:
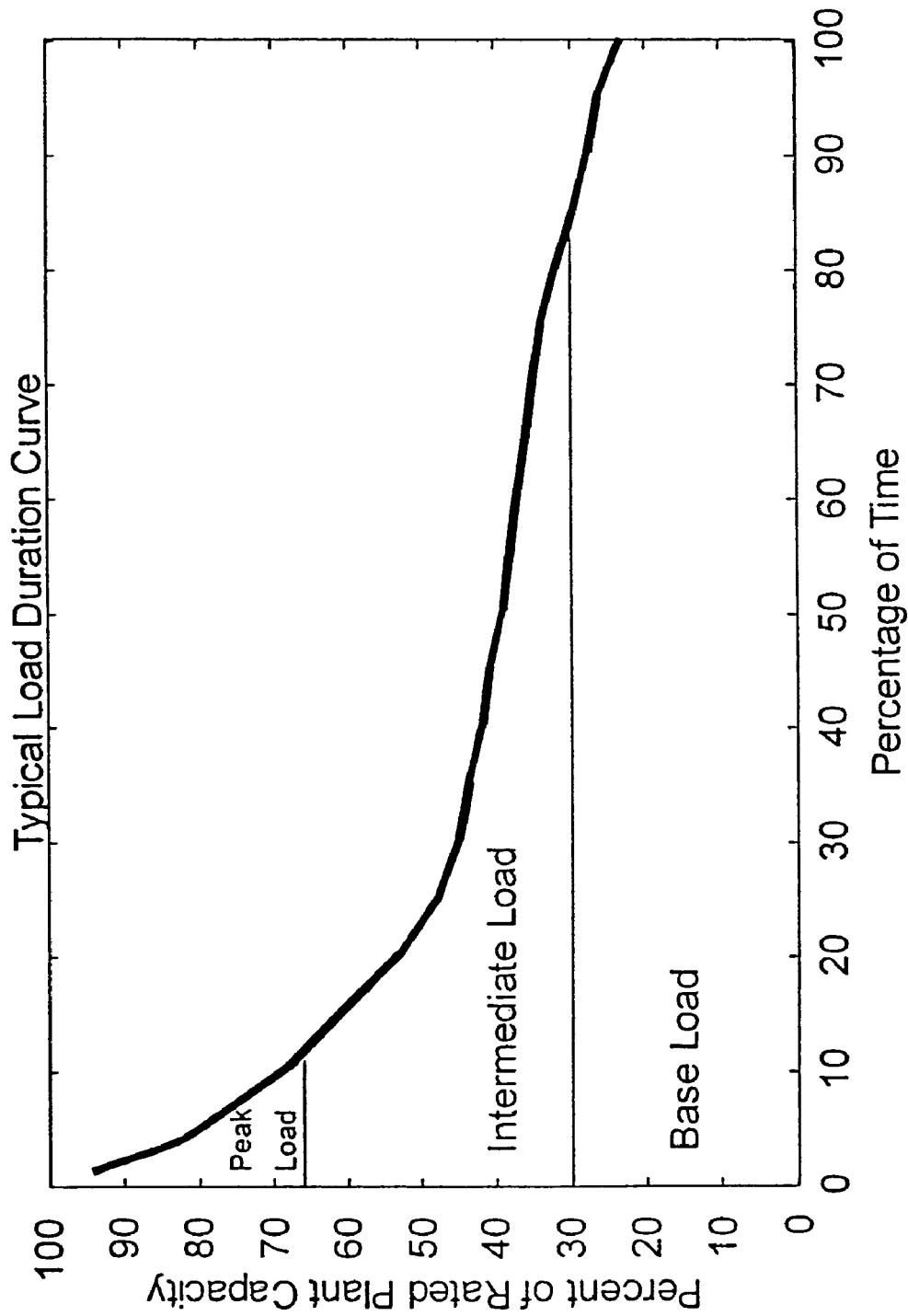
FIG. 31B graphically illustrates a typical load duration curve which depicts the overall long term use of rated plant capacity (data obtained from Duke Energy Power Services, Inc., http://www.panenergy.com/power/epdb2_5.htm)

During the hot summer months and on extremely cold days in the winter, the system load is near its seasonal peak. Also, typically between 4 PM and 8 PM on weekdays, the system is near its daily peak. However, during nights and weekends, the system load might only average 60% of the weekday peak. Due to these dynamics for the system load, it is uncommon for a dispatched power plant (dispatched means controlled by the utility to meet system load) to operate at its rated output, or any steady load, for an extended period of time. Instead, it is typically operated at high loads during weekday peak hours (not necessarily its rated output) and at relatively low loads (approximately 60% output) for extended hours during nights and weekends. Refer to FIGS. 31A, 31B, and 32 for more information on typical load profiles.

Therefore, to be efficient, a power plant must have the flexibility to operate continuously at varying loads between 50% and 100%. Conventional combined cycle power plants are efficient, but sacrifice a great deal of efficiency when operating at part load. This is especially true of plants where the GT is the primary engine. In these plants, to reduce load initially from full load, the more sophisticated GTs equipped with inlet guide vanes (IGVs) will reduce airflow through the engine, thus reducing their pressure ratio. In addition, to further reduce load, these engines must reduce their turbine inlet temperatures (also referred to as firing temperature) to operate at part load. Reducing these pressures and temperatures greatly reduces the operating efficiency of the GT engine.

To improve combined cycle plant efficiency, reduce cost, lower emission levels, reduce the plant real estate requirements, and simplify operations and maintenance (O&M), the present invention teaches the use of an HRSG optimized for continuous supplemental firing that utilizes a single pressure level evaporator (boiler) with equal or greater ST inlet pressures than are typically employed in combined cycle applications in the prior art. In addition, it proposes the use of some features used in conventional Rankine Cycles not employed in conventional combined cycles.

Refer to FIG. 9 for an exemplary embodiment of this new cycle. As in a typical combined cycle application in the prior art, this new arrangement utilizes one or more GTs (920) as the topping cycle power device. Also, as in the typical combined cycle application in the prior art, the GT exhaust gases are fed into the HRSG. From this point, however, the cycle is changed from conventional combined cycle practice. A single pressure level HRSG is utilized rather than a multiple pressure level HRSG. To maximize cycle efficiency, the pressure of steam produced can be much higher than the nominal 1800 psia typically seen. This pressure could be supercritical (greater than 3206 psia) if desired. For simplicity, this discussion will focus on a sub-critical application (2400 psig rating) with an exemplary implementation example. However, performance curves for supercritical steam conditions will be included and discussed.

Energy Flow Analysis

First, it is instructive to examine the overall energy flow in a conventional combined cycle application. From a simple energy analysis, FIG. 21 illustrates the energy flow in a combined cycle application while FIG. 10 quantifies, for the Prior Art option, the flow of energy in a conventional combined cycle plant (see the subsequent section on Preferred Embodiment Cycle Optimization for the equations used to calculate the values in FIG. 10). This table documents performance for a GE model PG7241(FA) GT at ISO conditions with 3.0 inches $H_2O$ inlet air pressure drop and 10.0 inches $H_2O$ exhaust pressure drop. ISO conditions are defined as 59° F. and 14.696 psia ambient pressure. Referring to FIG. 21, of the initial fuel input to the GT, GTI (2101) 32.31% (all percentages based on HHV) is converted into electricity, which is the GT output, GTO (2105). Based upon the GT exhaust gas flow and its enthalpy, only 56.21% of the input energy is sent to the HRSG, HGI (2103), meaning that 11.48% is lost between the GT and the HRSG GTL (2102). This is likely GT generator losses, GT heat loss, gear driven accessories, motor driven accessories, windage loss, and other miscellaneous losses. For this example, no energy from supplemental firing will be added, therefore, SFE (2104) is zero. Of this remaining 56.21% of the GT input energy sent to the HRSG HGI (2103), about 10.7% (which equals (0.107)(0.5621) or 6.04% of initial GT input energy) is lost up the exhaust stack HGE (2107).

Of this remaining energy available in the GT exhaust gases to produce steam in the HRSG, 1% is considered to be lost as heat to ambient HGL (2106). Converted into terms of GT input energy, this equates to losses of 6.04% of the GT input energy for exhaust loss and 0.50% of the GT input energy for HRSG heat loss. This now leaves 49.67% of the GT input energy as energy transferred to the steam HRS (2108) which is available for recovery and conversion to electricity by the ST.

With a published heat rate of 6040 BTU/kWh (LHV) for a GE STAG™ S207FA plant with two GE Frame 7s and one ST, the plant efficiency based on the higher heating value (HHV) of natural gas is 50.90%. If the GT converts 32.31% of the fuel input GTI (2101) into electricity, then by subtraction the ST must convert 18.59% of the fuel input GTI (2101) input energy into electricity. With a steam turbine generator efficiency of 99% (or 1% loss, SGL (2110)), and a auxiliary load factor of 97.5%, and 49.67% of the fuel input HRS (2108) available to the ST cycle, then the basic steam cycle efficiency calculates to 38.78% ((18.59/49.67)/(0.975)(0.99)). This is significantly less than the 46.78% efficient operation from advanced steam cycles in a Rankine Cycle only plant (see FIG. 4).

This steam cycle efficiency is confirmed by General Electric in their informative document GER-3574F (1996), entitled "GE Combined-Cycle Product Line and Performance" by David L. Chase, Leroy O. Tomlinson, Thomas L. Davidson, Raub W. Smith, and Chris E. Maslak. In discussing supplemental firing of the HRSG, this document states ". . . the incremental efficiency for power production by supplemental firing is in the 34–36% range based upon the lower heating value [(LHV)] of the fuel."

Since supplemental firing adds heat only to the steam cycle, it therefore follows that the steam cycle efficiency of GE's combined cycle plants is as stated.

Cycle Efficiency

The next question to be answered is how does one achieve conventional steam plant cycle efficiencies with the steam portion of a combined cycle? In a review of FIG. 4, it should be observed that reheat helps improve steam cycle efficiency. However, reheat is already employed by many of the high efficiency combined cycles, such as the GE STAG™ plant S207FA which utilizes two GE Frame 7s and one ST to achieve a heat rate of 6040 BTU/kWh LHV (refer to GE informative document GER-3574F (1996), entitled "GE Combined-Cycle Product Line and Performance" by David L. Chase, Leroy O. Tomlinson, Thomas L. Davidson, Raub W. Smith, and Chris E. Maslak). Therefore, other steam cycle efficiency enhancements are the use of higher inlet pressures, a higher volumetric flow steam turbine (for higher ST efficiency) and feedwater heating. These enhancements will be applied in several preferred embodiments of the present invention.

Most modern high efficiency GTs such as the GE model PG7241(FA) have internal firing temperatures near 2400° F. These GTs are designed to have exhaust gas temperatures at rated load in the range of 1100° F. For the PG7241(FA), at ISO conditions corrected for an HRSG exhaust loss of 10.0 inches $H_2O$, the exhaust gas temperature is 1123° F. The corresponding exhaust gas flow is 3,552,000 lb/hr. At 1800 psia inlet pressure, 1050° F. inlet temperature, with reheat to 1050° F., exhausting at 1.2 inches of mercury absolute (HgA), this steam cycle would require 1642.4 BTU/lb of heat input (reference FIG. 4, Option 2). With an inlet enthalpy of the exhaust gases of 412.6 BTU/lb, and exhaust gas enthalpy of 159.2 BTU/lb, the exhaust gases have the energy content to produce 548,000 lb/hr of steam flow. However, closer examination reveals a flaw in this logic. At 1800 psia, steam boils at 621° F. Since heat flows from higher temperatures to lower temperatures, a reasonable temperature for the exhaust gases leaving the evaporator section would be 650° F. If water preheated to an enthalpy of 648 BTU/lb was supplied to the evaporator (an optimistic assumption), the energy required for steam production would be 1642.4−648=994.4 BTU/lb.

However, at 650° F., the exhaust gases have an enthalpy of 281.3 BTU/lb. Therefore, the exhaust gases have the ability to boil and reheat only 469,000 lb/hr (3,552,000) (412.6−281.3)/994.4. Hence, the issue becomes a heat exchange problem, as there is insufficient high level (high temperature) energy to provide the steam at higher pressures.

Conversely, from 650° F. exhaust gas temperature to exhaust at 180° F., there is sufficient energy to preheat 729,000 lb/hr of water ((3,552,000)(281.3−159.2)/(648−53)) from the hotwell at 53 BTU/lb to saturation enthalpy of 648 BTU/lb. Therefore, for heat recovery, in the prior art, the single pressure boiler is inefficient and either makes excess hot water, which has little or no use in a power production facility, or has an HRSG exhaust temperature that greatly exceeds optimum. This result has prompted the introduction of the multi-pressure level HRSG within the prior art. This arrangement makes use of the aforementioned hot water or exhaust gas energy by providing a lower pressure evaporator section(s) in the HRSG that converts what would be non-usable hot water/exhaust gas energy to lower pressure steam. Although it has less energy content and less ability to produce power in the ST than the high-pressure (HP) steam, this low-pressure (LP) steam nonetheless does add to the power output of the ST and serves to reduce the plant's heat consumption for a given power output (heat rate).

Supplemental Firing

Another method to alleviate the heat transfer shortcomings of a single pressure HRSG, without adding more pressure levels as in the prior art, is to add energy at or near the inlet of the HRSG through supplemental firing. However, the current teachings are that supplemental firing reduces overall plant thermal efficiency. This is noted by Moore in U.S. Pat. No. 5,649,416 in which he states "Supplemental firing of the heat recovery steam generator can increase total power output and the portion of the total power produced by the steam turbine, but only with a reduction in overall plant thermal efficiency."

In addition, Rice, in U.S. Pat. No. 5,628,183 states

"Supplementary firing in front of the HRSG does not offer a viable solution towards higher cycle efficiency."

Thus, the prior art specifically teaches away from this technique of supplemental firing. In addition, Rice references other documents by GE and Westinghouse that concur with his statement. GE informative literature, GER-3574F (1996), entitled "GE Combined-Cycle Product Line and Performance" by David L. Chase, Leroy O. Tomlinson, Thomas L. Davidson, Raub W. Smith, and Chris E. Maslak states ". . . the incremental efficiency for power production by supplemental firing is in the 34–36% range based upon the lower heating value of the fuel."

This states that although combined cycle efficiency is 56% based on the lower heating value (LHV) of the fuel at full load, power produced through supplemental firing is added at an efficiency equal to or less than 36% LHV.

Also in this document, (GE informative document GER-3574F, 1996, entitled "GE Combined-Cycle Product Line and Performance" by David L. Chase, Leroy O. Tomlinson, Thomas L. Davidson, Raub W. Smith, and Chris E. Maslak), another source which identifies supplemental firing as a detriment to efficiency (heat rate) is Table 14 which indicates that HRSG supplemental firing can increase combined cycle plant output in the prior art by 28%, but only with an increase in overall combined cycle heat rate (specific fuel consumption) of 9%.

Present Invention Energy Flow

It will now be instructive to reexamine the overall energy flow in a combined cycle application as utilized in several embodiments of the present invention. From a simple energy analysis, FIG. 21 illustrates the energy flow in a combined cycle application while FIG. 10 quantifies the energy flow in a preferred exemplary embodiment combined cycle (see the following section on Preferred Embodiment Cycle Optimization for the equations used to calculate the values in FIG. 10). Again, GT performance is for a GE model PG7241(FA) GT at ISO conditions and 3.0 inches $H_2O$ inlet air pressure drop and 10.0 inches $H_2O$ exhaust pressure drop. Referring to FIG. 21, of the initial fuel input to the GT, GTI (2101), 32.31% (all percentages based on HHV) is converted into electricity, which is the GT output, GTO (2105). Based upon the GT exhaust flow and enthalpy, only 56.21% of the GT input energy is sent to the HRSG HGI (2103), meaning that 11.548% is lost between the GT and the HRSG, GTL (2102). Of this remaining 56.21% of the GT input energy sent to the HRSG, about 10.7% of it is lost up the exhaust stack HGE (2107), leaving 50.17% of GT input energy to the HRSG. To this point, the energy flow is unchanged from the prior art.

To ensure maximum heat recovery in the HRSG, several of the preferred embodiments of the present invention prescribe increasing the feedwater flow through the HRSG until there is a sufficient balance of heat gain by the feedwater to match the necessary heat loss from the exhaust gases for optimum heat recovery (i.e. reduce HRSG exhaust gas temperature to approximately 180° F.). Secondly, through the addition of fuel at the HRSG inlet (supplemental firing), the exhaust gas energy in the HRSG is raised until there is sufficient energy to convert most or all the feedwater flow into steam. Using Option 3 from FIG. 4, heat must be added at 1633.9 BTU/lb to produce the desired steam conditions. Since the heat capacity of the exhaust gases is approximately 0.25 BTU/lb/° F., and the heat capacity of the returning condensate is approximately 1.0, the steam flow should be near 0.25 lb of steam per lb of exhaust gas flow. For two GE frame 7 GTs this yields a steam flow of 1,776,000 lb/hr.

To produce this amount of steam will require 2894 MMBTU/hr (million BTU/hr). With 1% loss to ambient from the HRSG, HGL (2106), the heat input requirement becomes 2923 MMBTU/hr. With exhaust loss, the necessary HRSG input energy required to produce this steam is 87.99% of the GT input energy. Since the HRSG input energy HGI, (2103) minus the HRSG exhaust loss, HGE (2107), equals 50.17% (56.21−6.04), of GTI (2101), an additional amount of energy equal to 31.78% of the GT input energy must be added as heat from supplemental firing SFE (2104), yielding a total of 81.95% of GTI (2101). Adjusting for a 1% loss to ambient, HGL (2106), 81.13% of GTI (2101), the GT input energy, converts to steam. This steam is now available for conversion to electricity by the ST.

With a ST for use in a preferred exemplary embodiment, higher pressure, reheat, and feedwater heating may all be employed. In addition, the ST rating will be an estimated 2.5 times that of a conventional combined cycle plant. This would lead a reasonable designer to use the steam cycle efficiency of 44.39% as shown for Option 5 in FIG. 4 (as per Moore, ST efficiencies increase with rating, but for demonstration purposes, an overall 90% has been retained for this example).

Utilizing a 44.39% efficient basic steam cycle, 36.01% of the available heat is converted to shaft horsepower, utilizing a factor of 97.5% to account for auxiliary loads and a 99% efficient generator. ST electrical output is therefore 34.76% of GTI (2101), GT input energy. With the GT output, GTO (2105), equal to 32.31% of GTI (2101), the ST output equal to 34.76% of GTI (2101), and with an additional supplemental fuel input of 31.18% of GTI (2101), combined cycle efficiency therefore becomes (output divided by input) ((0.3231+0.3476)/(1+0.3118)) which equals 50.90%. Utilizing only two (2) FWHs in the cycle, the efficiency of this exemplary preferred embodiment is on par with the GE conventional combined cycle plant. For supercritical applications, the overall combined cycle efficiency in several of the preferred embodiments increases to 51.75% and lowers the heat rate to 5942 BTU/kWh LHV (reference FIGS. 10 and 21).

Therefore, from an overall energy perspective, it is apparent that supplemental firing is NOT detrimental to overall combined cycle efficiency IF a commensurate increase in bottoming cycle efficiency accompanies the supplemental energy addition to the bottoming cycle.

Preferred Embodiment Cycle Optimization

As stated, one of the major improvements for several of the preferred embodiments of the present invention is the flexibility. With supplemental firing, the new combined cycle power plant can be designed with a combination of various gas turbines together with a custom designed steam turbine(s) to provide a much wider range of application for the new combined cycle power plant.

Since efficiency is defined as output divided by input, the energy flow analysis can be used to determine the steam cycle efficiency required at a given rating. Therefore, for overall combined cycle efficiency, the output is the combination of both the steam turbine and gas turbine(s) electrical output. The input is the total of the GT input energy along with the energy added to the duct burners through supplemental firing. Therefore, referring to FIG. 21, the equation for combined cycle efficiency (.eta.) of several of the preferred embodiments of the present invention is given by the relation:

$$\eta = \frac{(GTO + STO)}{(GTI + SFE)} \quad (2)$$

where
GTO=gas turbine(s) electrical output
STO=steam cycle electrical output
GTI=gas turbine(s) input energy
SFE=HRSG input energy through supplemental firing.

In the above exemplary equation, the values of GTO, GTI, and SFE are typically known. The unknown variable is the steam cycle electrical output, STO. This number is a function of several other inputs, including steam turbine generator efficiency, HRSG exhaust loss, auxiliary load factor, and finally steam cycle efficiency. First, it is necessary to calculate the amount of energy that is transferred to the steam from the HRSG. This is defined as HRS (2108) and is calculated from the following equation:

$$HRS = [HGI + SFE - HGE] (1 - HGL) \quad (3)$$

where
HRS=HRSG energy transferred to steam
HGI=GT exhaust heat
SFE=supplemental firing heat
HGE=HRSG exhaust loss
HGL=heat loss to ambient The above exemplary equation essentially calculates the heat into the steam as the sum of: the GT exhaust heat, plus the heat added from supplemental firing, minus the HRSG exhaust loss, with a correction for heat loss to ambient. This now defines the quantity of energy available to the steam cycle. To determine the electrical output from this energy, STO (2111), this energy input must be adjusted for the steam cycle efficiency, SCE (2109), the ST generator losses, SGL (2110), and the auxiliary loads, AXF (2112). The equation for steam turbine generator output becomes:

$$STO = HRS \times SCE \times AXF \times (1 - SGL)$$

where
HRS=HRSG energy transferred to steam
SCE=steam cycle basic efficiency
AXF=auxiliary load factor
SGL=steam turbine generator losses
=(1−steam generator efficiency (SGE))

The steam cycle efficiency value therefore converts steam energy into ST shaft power, which is then corrected to steam cycle electrical output by corrections for both the generator efficiency and the reduction of power output by the auxiliary loads.

Knowing these equations, and also knowing the desired output for a given GT arrangement (see FIG. 29 for range of outputs of several of the preferred embodiments of the present invention), the required steam cycle efficiency can be determined which will yield a preferred embodiment combined cycle plant efficiency equal to that of the conventional (lower rating) combined cycle plant from the prior art which was based on the same GTs. FIG. 30 illustrates the steam cycle efficiencies that are required as the combined cycle plant described by several of the preferred embodiments of the present invention is increased in rating. Note that the parameter along the horizontal axis is the ratio of ST power output to the total of all GT(s) power output.

Figure 29:
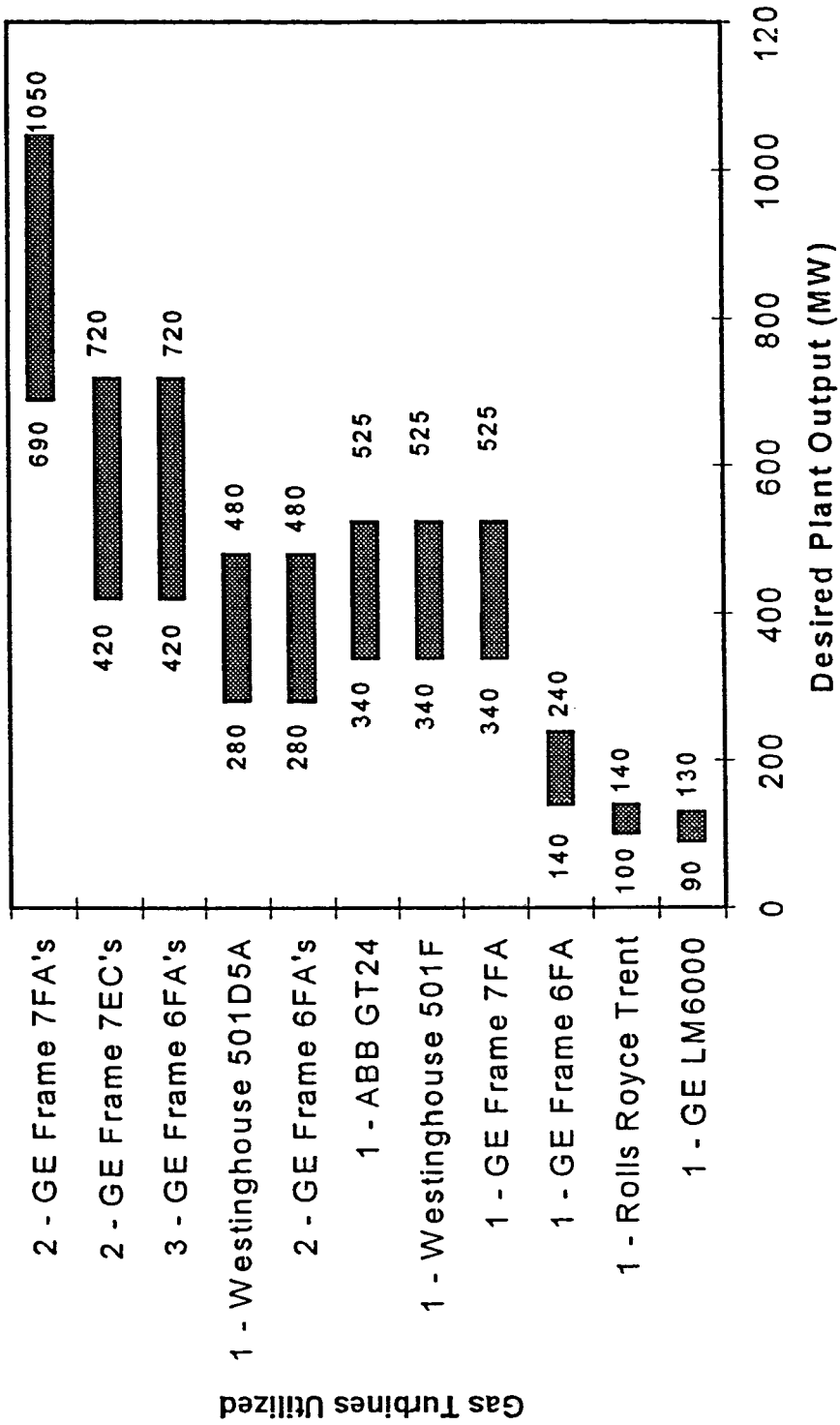
FIG. 29 graphically illustrates several exemplary power plant configurations and their nominal range of available specified power ratings using the teachings of the present invention.
Figure 30:
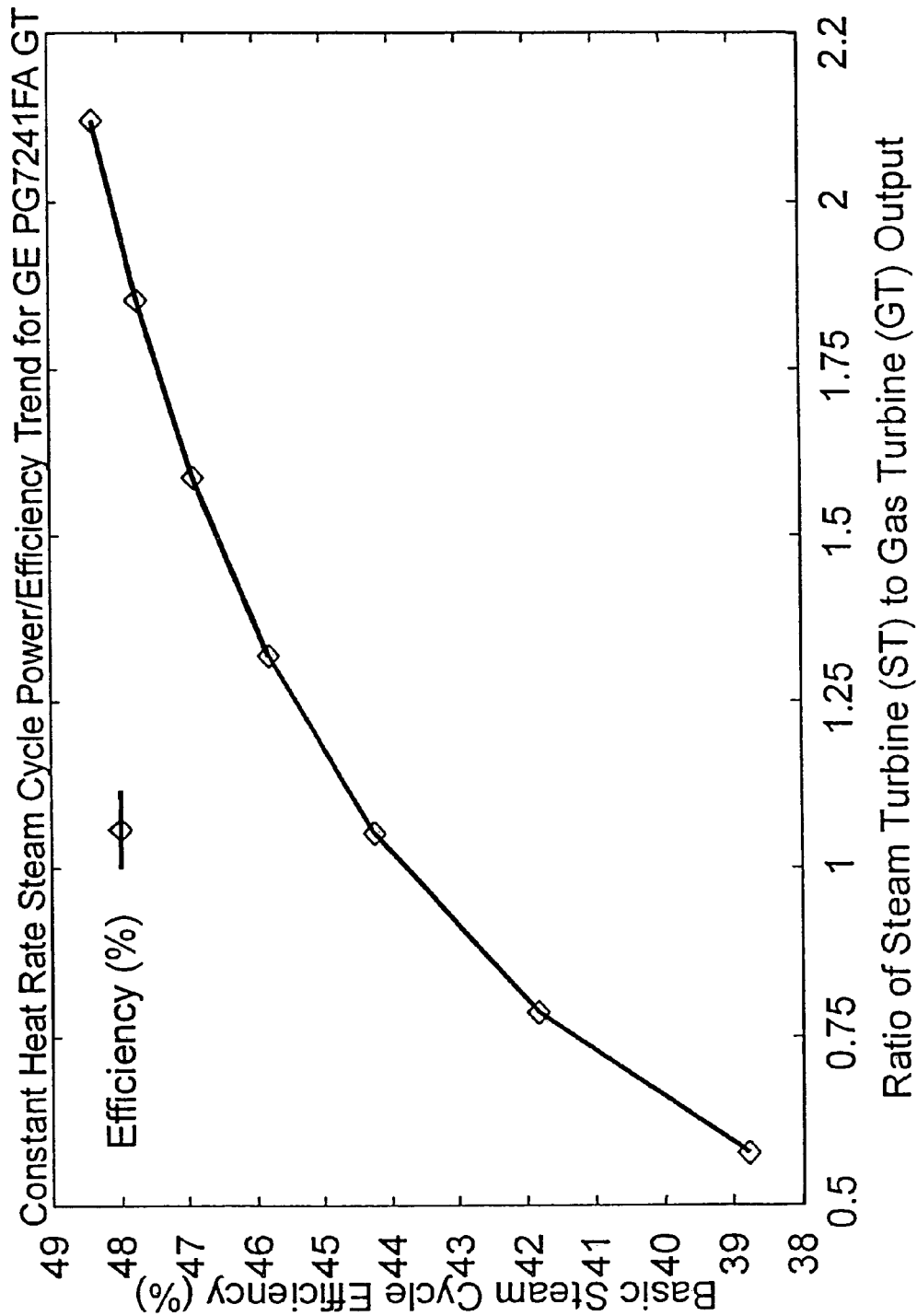
FIG. 30 graphically illustrates the basic steam cycle efficiency required for an exemplary power plant configuration utilizing two industry standard General Electric (GE) Model PG7241(FA) Gas Turbines to meet prior art efficiency levels over a range of power ratings.

Utilizing FIG. 29, FIG. 30, and the aforementioned equations for steam cycle efficiency and overall plant efficiency, a design engineer skilled in the art can determine which GT combination is most favorable from both an energy efficiency and economic perspective, and determine the relative complexity of the steam cycle (subcritical steam conditions, amount of feedwater heating, inlet temperatures, etc.) that will yield the desired overall plant efficiency. Refer to FIGS. 47–50 illustrating a plant design/construction method for the selection, design, and financing of the preferred embodiment of the present invention.

Preferred Embodiment Flexibility

As previously mentioned, flexibility is one of the major advantages to the present invention. From an examination of FIG. 30, it can be seen that at lower ST/GT ratios, a steam cycle of more moderate efficiency can be utilized to provide on par plant efficiency utilizing the teachings of the present invention. However, it would be possible at low ST/GT ratios to utilize ultrasupercritical steam conditions to exceed the efficiency of a combined cycle power plant from the prior art. If the exemplary preferred embodiment in FIG. 26 at 725 MW were to use an ultrasupercritical bottoming cycle, the heat rate would be reduced from 6006 BTU/kWh to 5912 BTU/kWh.

However, unlike preferred embodiments with higher ST/GT ratios, this configuration yields less operational flexibility than preferred embodiments with higher ST/GT ratios. With these lower ratios, the control of the preferred embodiment will be more like that of the prior art in that the GTs will need to be modulated to control plant load at a higher plant operating point. Depending upon the economics, high efficiency, low efficiency, or capital costs will determine which ST/GT ratio is ultimately chosen by the power plant developer.

Preferred Embodiment Potential Ratings and ST-GT Ratio

FIG. 30 illustrates the approximate steam turbine rating increases that are attainable from several of the preferred embodiments of the present invention. A conventional combined cycle power plant from the prior art could have a ST output that is nominally 55% of the total GTs output. Therefore, total plant output could be defined as 1.55 (1.00 for GTs plus 0.55 for the ST) of GTs output. With this example of several of the preferred embodiments of the present invention, the ST could be designed to be as much as 2.1 times the output of the GTs, such that total plant output is 3.1 (1.0 for GTs plus 2.1 for the ST) times the output of the GTs.

This example of a preferred embodiment of the present invention has a rating that is 3.1/1.55=2.0 times that of the prior art. To remain on par in efficiency with the prior art, however, the basic steam cycle efficiency needs to be 48.3% (refer to FIG. 30). With supercritical steam conditions, advanced steam parameters, and feedwater heating, basic steam cycle efficiencies can come close to this benchmark. Therefore, several of the preferred embodiments of the present invention have the ability with certain gas turbine arrangements to nearly double combined cycle power plant output as compared to the prior art, drastically reduce the amount of hardware that would have been required in the prior art to attain this output, yet still manage to achieve efficiency levels that are on par with the prior art.

Since the present invention teaches the use of a single pressure level HRSG, and to efficiently utilize a single pressure level HRSG, the feedwater flow through the low temperature section of the HRSG must be adequate to absorb the GT exhaust gas energy, analysis has shown that an ST/GT ratio minimum of approximately 0.75 is required to meet this objective. Assuming a relative GT power output of 1.0 and a ST/GT power ratio of 0.75, yields a total plant power output of 1.75 times the GT output, resulting in a GT to total power output of (1.0/1.75) or approximately 0.57 or 57% of the total plant power output.

Design Limitations

Although several of the preferred embodiments of the present invention offers a more expansive range of combined cycle ratings for a given set of gas turbines than was available in the prior art, there are still limitations on the design of these new technology combined cycle power plants. Some of these limitations are as follows:

1. Above approximately a 1600° F. duct-fired gas temperature at its inlet, the HRSG will require a more expensive water-wall construction.
2. With water-wall construction, the HRSG may be limited to approximately a 2400° F. duct-fired gas temperature.
3. The HRSG exhaust gases must contain sufficient oxygen to support the combustion of additional fuel.
4. The duct burners that provide additional heat input to the HRSG must be able to maintain low NOX levels even at high prescribed firing rates.
5. The cycle must be designed to operate within the steam turbine design parameters for pressure and temperature.
6. The cycle must be designed so as to maintain the proper efficiency, cost, emissions, or other limiting parameters that may exist to make the project economically and environmentally acceptable.

Considering these limitations, FIG. 29 illustrates an approximate range of rated power for combined cycle power plants described by several of the preferred embodiments of the present invention. Note that these power plants are based upon either one or two GTs and cover a range from less than 150 MW up to 1050 MW. FIG. 29 is not meant to represent all possible GT combinations which can utilize the preferred embodiment of the present invention, but represents only a sample of various GTs for demonstration purposes.

Impact of Economic Considerations on Plant Design

All power plant design engineers skilled in the art review numerous plant design options for their relative economic merit before selecting a final configuration for a power plant. This is true with the combined cycle plants from the prior art and will be true of combined cycle plants utilizing the system and method described by several of the preferred embodiments of the present invention. New plants must be commercially feasible if they are to be constructed.

The power plant design engineer may examine alternatives such as a low cost cell type cooling tower with a high auxiliary load (electric motor driven fans) versus a high cost hyperbolic style cooling tower with only a small auxiliary load (natural draft air flow, no fans required). This becomes an economic evaluation of the energy saved versus the capital cost expended to save said energy. Based upon current and projected economic factors for energy costs, capital costs, and other factors, the developer of the power plant project will select the most economical arrangement. The most efficient selection from an energy conservation perspective is not always the most economical selection.

These same type of evaluations will need to be presented with several of the preferred embodiments of the present invention. Although ultrasupercritical steam conditions yield higher steam cycle efficiencies, the incremental savings in fuel may not outweigh the added cost for the more intricate hardware. If interest rates are high, several of the preferred embodiments of the present invention will allow large capacity increases with only a nominal percentage increase in price. With low fuel costs, larger plants without the commensurate increase in steam cycle efficiency may be appropriate. Again, several of the preferred embodiments of the present invention allow the design engineer skilled in the art along with the plant developer to chose from a wider range of alternatives to find the most commercially viable option for the power plant.

Figure 51:
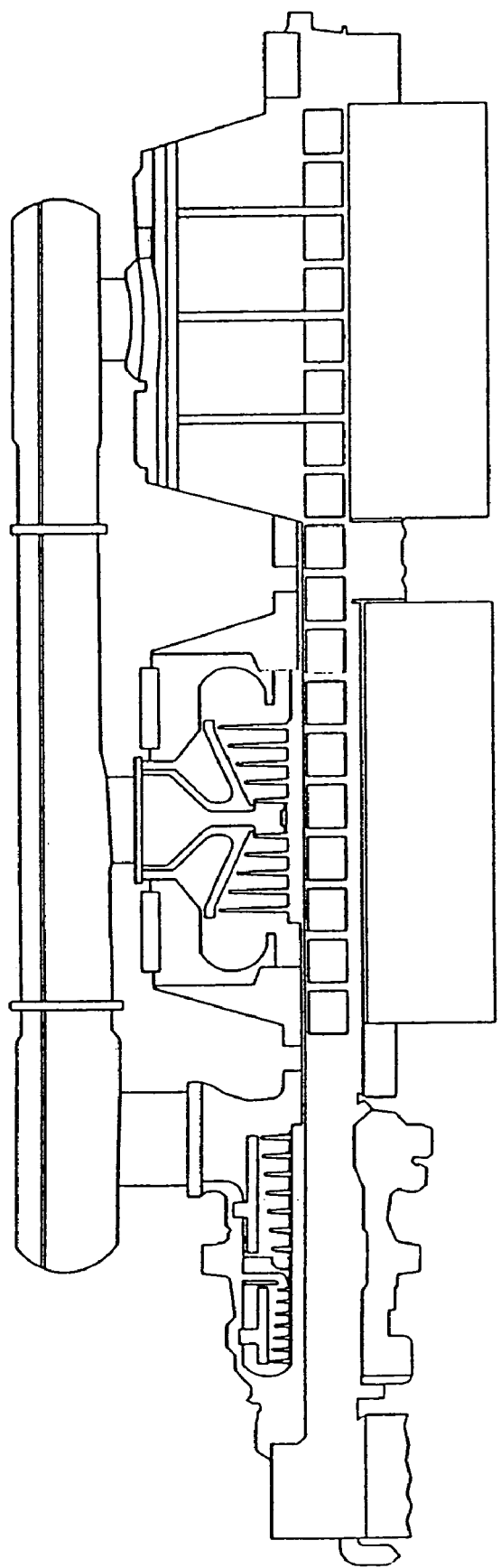
FIG. 51 illustrates a GE three casing, four-flow steam turbine with a combined HP/IP section and two double flow LP sections.

With several of the preferred embodiments of the present invention becoming primarily a steam plant rather than primarily a GT plant, there are a couple economic evaluations that are usually of key interest. Since these steam turbines will be large and have high exhaust end flows, they typically utilize either one, two, or three exhaust casings, each of which has a double flow arrangement. FIG. 51 is an illustration of a General Electric (GE) steam turbine a from GE informative document entitled "Steam Turbines for Large Power Applications" by John K. Reinker and Paul B. Mason (General Electric Reference GER-3646D, 1996). The casing to the left is the combined HP/IP section, while the two larger sections to the right are the double flow exhaust (LP) sections. Differing sizes of exhaust casings are available which are designed around the blade lengths in the last stage. There can be substantial cost differentials between the different exhaust casings.

The selection of the steam turbine last stage blade height, exhaust casing size, and number of exhaust casings is one very common economic evaluation for a large steam plant. The steam cycle may become more efficient by an increase to the next larger exhaust casing or perhaps even through the addition of another exhaust casing. However, the incremental increase in steam cycle efficiency must be weighed against the increase in cost for the additional hardware. Another factor that comes into play is the sizing of the condenser and heat rejection equipment. Again, lower exhaust pressures yield higher steam cycle efficiencies, but the cost of the equipment to provide incremental reductions in exhaust pressure must not outweigh the fuel savings.

In consideration of the economics of operation, the developer must provide the design engineer with an operation scenario for the new power plant. Since the system electrical load is very dynamic and constantly changing, a load profile needs to be established which exemplifies the load on the plant as a function of time. FIG. 31A is from a U.S. Department of Energy report numbered DOE/EIA-0614 entitled "Electricity Prices in a Competitive Environment: Marginal Cost Pricing of Generation Services and Financial Status of Electric Utilities". FIG. 31A illustrates a typical load profile for a system (electrical grid) on an hourly basis for a single day. On a weekly basis, this profile would indicate lower load on weekends and holidays, and on an annual basis, there would be adjustments for seasonal changes. Since most power plants will operate a majority of their lifetime at partial load, the optimum economical arrangement results from designing these plants to be most efficient at some average or mean load point of operation, versus at the plant's rating.

This is noted by M. Boss in GE informative document GER-3582E (1996), entitled "Steam Turbines for STAG™ Combined-Cycle Power Systems". In this paper, the author explains that although the efficiency of the steam cycle may be maximized when the ST exhaust annulus velocity at the last stage blade is approximately 550 feet per second, the economic optimum is typically with an exhaust annulus velocity of between 700 and 1000 feet per second at the rated point of the ST. James S. Wright, in GE informative document GER-3642E (1996), entitled "Steam Turbine Cycle Optimization, Evaluation, and Performance Testing Considerations" provides an evaluation for steam turbine exhaust casing selection. In the example, the selection is made between three different sized exhaust casings, with the efficiency of the exhaust casings increasing with each larger size. The largest casing is not selected because its incremental gain in efficiency does justify its added cost per the economic parameters. By the same token, the smallest casing is not selected because its incremental savings in capital cost does not justify the large loss in efficiency. Therefore, the medium sized casing is selected because it is the economic optimum.

Single Pressure HRSG

Figure 12:
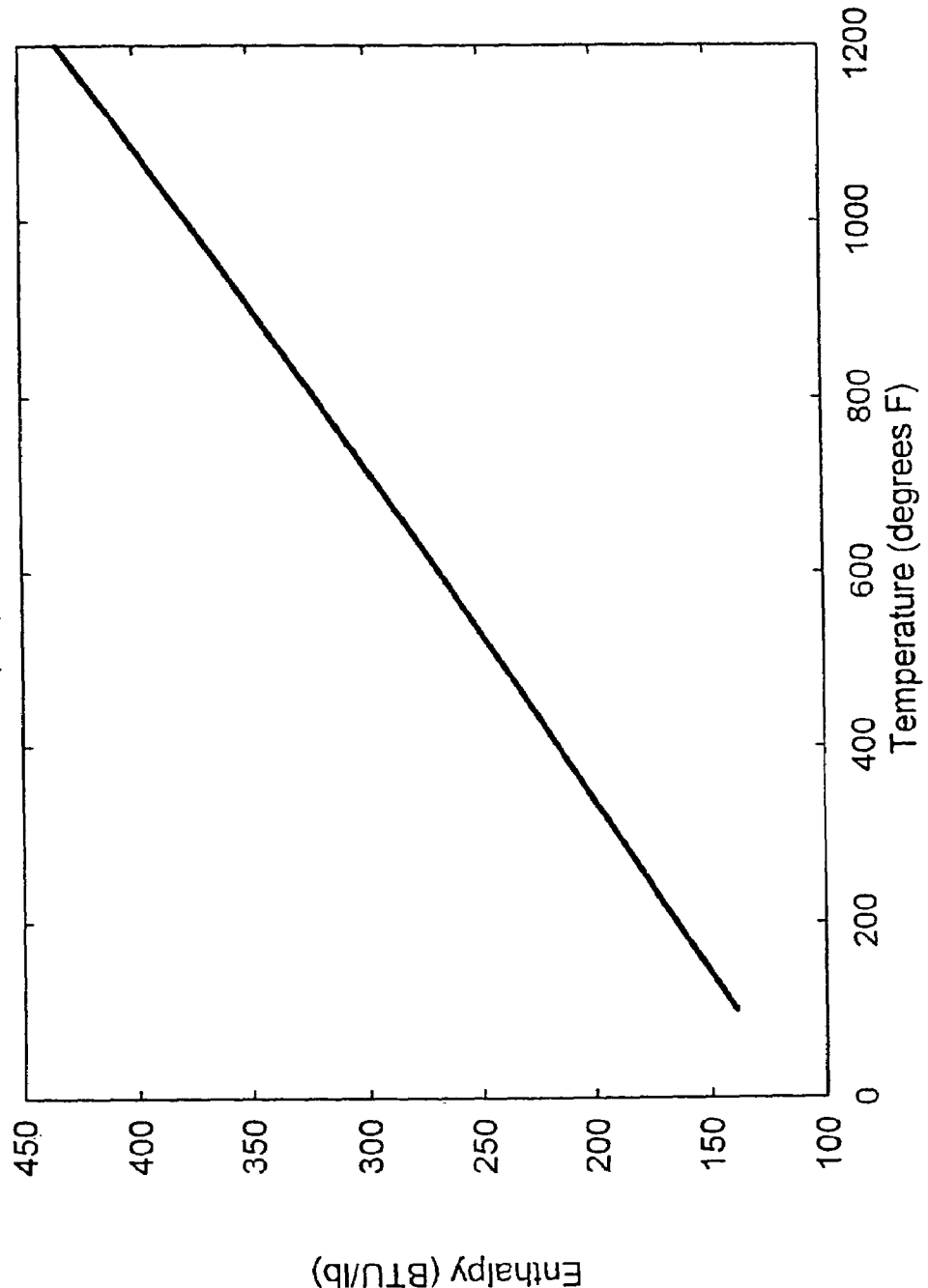
FIG. 12 illustrates a typical graph of gas turbine exhaust gas enthalpy versus exhaust gas temperature.

To make an HRSG effective at a single pressure level, its design effectiveness must first be examined. FIG. 11 is a curve of steam enthalpy versus temperature for a pressure of 1800 psia. As can be readily seen, the heat content of the steam is not a linear function with respect to temperature. This phenomenon greatly complicates the heat transfer with the exhaust gases that have a nearly linear characteristic (see FIG. 12). As is seen in FIG. 11, at the boiling point of 621° F., the water/steam mixture increases in enthalpy from 648 BTU/lb to 1154 BTU/lb without any increase in temperature. The heat absorbed in this section of the HRSG (evaporator) will be much greater than any other section for a given temperature change.

Between the temperatures of 100° F. and 400° F., the average heat capacity of water is 1.014 BTU/lb/° F. This value is essentially linear and changes only slightly with pressure. Therefore, heat transfer in this region between the water and exhaust gases will be relatively consistent.

To maximize the effectiveness of heat recovery in the HRSG, and to still provide the maximum amount of steam to the ST, a system control method is required that optimizes the feedwater/steam flow through each section of the HRSG. This optimization scheme will be programmed in the power plant's DCS control system.

System Control

There are numerous possible control techniques for the ST, however, two popular methods are flow control and sliding pressure control. With flow control, the ST includes a set of valves that is controlled to maintain design inlet pressure. With sliding pressure operation, the inlet pressure to the ST is allowed to "slide" or change with the load (steam flow) to the ST. For combined cycle plants, where heat recovery is employed, it is often advantageous to use sliding pressure control. This control method allows for high volumetric flows in the steam turbine by utilizing lower specific volume steam (lower pressure) at part load. This maintains ST efficiencies at or near design levels. In addition, lower pressure steam boils at a lower temperature than higher pressure steam, therefore, the lower temperature exhaust gases in the HRSG associated with lower loads can produce more steam.

Energy Utilization

As demonstrated previously, in order to produce high-pressure steam in the HRSG, it is necessary not only to have the overall energy content to produce the steam (total required BTUs), but the energy must be at the appropriate temperature to affect the necessary heat transfer. In addition, it is desired to maximize the use of waste heat, and not produce large quantities of hot water or greatly increase HRSG exhaust temperature above its optimum point. The use of supplemental firing becomes extremely useful in meeting these goals.

It is now useful to consider the concept of a single pressure HRSG used with a GT. As previously demonstrated, this arrangement, when designed for an HRSG exhaust temperature of 180° F., would produce either an excess of hot water or a high HRSG exhaust gas temperature in the prior art. Again, this is due to the non-availability of sufficient heat input at the higher temperatures, and an overabundance of heat available at the lower temperatures. For illustration purposes, consider an HRSG that added heat to the exhaust gases without an increase in temperature (not a likely arrangement for a GT/HRSG assembly). Imagine that to add heat, the HRSG was designed to ingest more fuel and more air, but without an increase in its inlet temperature. This scenario would provide for the production of a larger quantity of GT exhaust gases and thus a larger quantity of steam. However, it also would provide for a larger quantity of hot water. Effectiveness of the HRSG would not be changed, only its capacity would be increased proportional to the heat addition.

This concept is important, because not only does it apply to the HRSG, but it applies to the conventional combined cycle practice when supplemental firing is utilized. In the prior art, supplemental firing increased steam flows, but did not improve the effectiveness of the steam cycle.

Due to excess oxygen in the exhaust gases from a GT (oxygen levels reduce from 21% $O_2$ in ambient air to approximately 12–15% at the GT exhaust at full load), fuel can be burned directly in the HRSG without the need for additional air. This practice allows supplemental firing to increase the temperature of the exhaust gases. The combustion and heat recovery process for supplemental firing is essentially 99% efficient, as only 1% of the HRSG heat input is lost to ambient surroundings. This is a dramatic improvement over conventional Rankine cycle boilers that might only be 80 to 90% efficient. The primary reason for this large differential in efficiency between the conventional Rankine cycle boilers and HRSGs is that conventional Rankine cycle boilers ingest cold ambient air for combustion and may then exhaust in the range of 350° F. to 400° F., versus the HRSG which receives preheated GT exhaust gases at temperatures between 800° F. and 1200° F., and then exhaust in the range of 160° F. to 200° F.

This increase in the energy level of the exhaust gases as a result of supplemental firing, greatly improves the ability (heat transfer capability) of these exhaust gases to produce high-pressure, high temperature steam. In addition, more energy at the high end of the HRSG offsets or balances the excess energy at the low end of the HRSG typical in the combined cycle from the prior art.

In other words, additional heat input at the HRSG inlet that increases the exhaust gas temperature, can be transferred to the feedwater flow that had insufficient energy to become HP steam. Not only is the overall steam flow increased, but the effectiveness of the steam cycle is also increased by producing a higher proportion of HP steam. Thus, the addition of fuel into the bottoming cycle, as well as providing additional heat input, can be used to increase the overall effectiveness of the bottoming cycle.

System Overview

Figure 13:
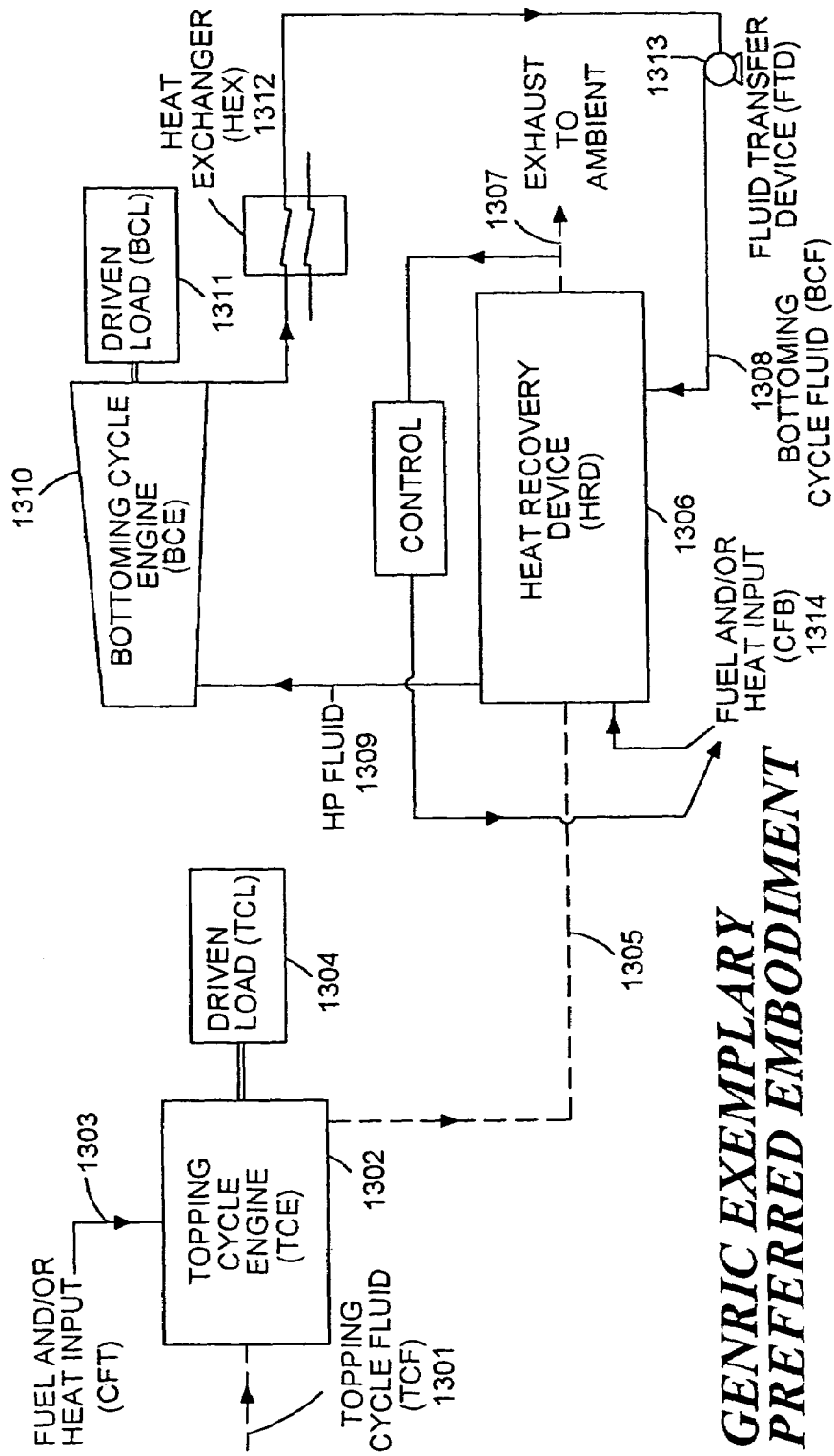
FIG. 13 illustrates a schematic of the general principles of the present invention as implemented in a combined cycle application.

FIG. 13 is a conceptual schematic for a combined cycle application with heat addition to the bottoming cycle. In FIG. 13, the topping cycle fluid (TCF) (1301) enters the topping cycle engine, (TCE) (1302) where fuel and/or heat (CFT) (1303) is added to raise its temperature. The fluid performs work that is converted by the topping cycle engine into shaft horsepower. This shaft horsepower drives the topping cycle load, (TCL) (1304). This load could be an electrical generator, pump, compressor, or other device that requires shaft horsepower. The exhausted fluid from the topping cycle engine is directed through and exhaust line (1305) to a heat recovery device (HRD) (1306). In addition, fuel and/or heat (CFB) (1314) is added to the topping cycle fluid at the point where it enters the heat recovery device. After passing through the HRD, the topping cycle fluid exhausts to an open reservoir (1307).

For this example, the topping cycle is an open cycle. In other words, the topping cycle fluid is taken from a large reservoir and discharges to that same reservoir. The heat recovery device (1306) captures a portion of the topping cycle exhaust energy and transfers it to the bottoming cycle fluid (BCF) (1308). In this example, the bottoming cycle fluid is heated at a single pressure level, a high-pressure (HP) line (1309). This fluid then travels to the bottoming cycle engine (BCE) (1310) where it produces shaft horsepower to drive the bottoming cycle load (BCL) (1311). Again, this load could be an electrical generator, pump, compressor, or other device that requires shaft horsepower.

From the bottoming cycle engine, the bottoming cycle fluid enters a heat exchanger (HEX) (1312) where beat is rejected. The bottoming cycle fluid then enters a fluid transfer device (FTD) (1313) where it is then returned to the heat recovery device. For this example, the bottoming cycle is a closed cycle, meaning that the bottoming cycle fluid is continuously circulated within a closed loop.

Figure 5:
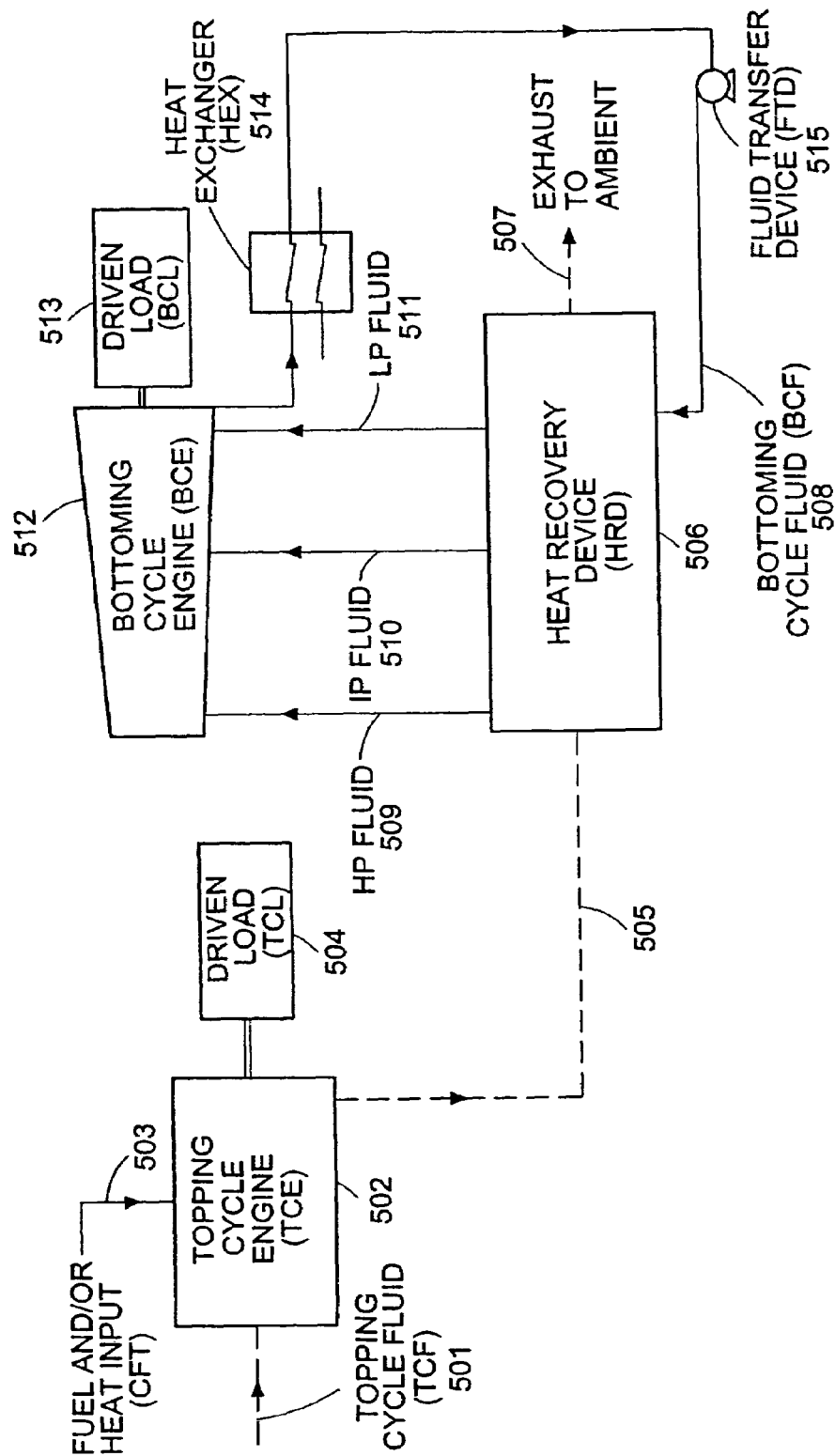
FIG. 5 illustrates a schematic of the basic principles of a combined cycle.

The present invention exemplary embodiment illustrated in FIG. 13 contrasts to FIG. 5 in two major ways:
1. Fuel and/or heat is added (1314) to the heat recovery device (1306) which is not added in FIG. 5; and
2. In FIG. 13 there is only one fluid, HP fluid (1309), which is supplied to the bottoming cycle engine (1312), versus HP fluid (509), IP fluid (510), and LP fluid (511) in FIG. 5 which are supplied to the bottoming cycle engine (512).

By utilizing fuel and/or heat addition to the bottoming cycle, not only has the energy to the bottoming cycle increased, but so has the cycle's effectiveness, as now all the IP and LP fluid has been upgraded to HP fluid. This HP fluid has the ability to do more work per unit mass flow than either the IP or LP fluids.

There are a number of different fluids that could be applied to the conceptual combined cycle arrangement, including water, air, steam, ammonia, refrigerants, mixtures, and many others. The intent of a preferred exemplary embodiment is not to limit the number of cycles used in the combined cycle, limit the fluids in the combined cycle to any specific fluid, limit the fluid pressures that may be utilized, or limit any cycle to being either an open or closed cycle, but to demonstrate that the process of upgrading thermal efficiencies of combined cycles can often be accomplished through the strategic use of additional fuel and/or heat input.

Heat Transfer Analysis

HRSG LP Economizer Section

As mentioned previously, the problem in producing HP steam in conventional combined cycle power plants is the distribution of the energy between the exhaust gases and the steam being produced. In addition, to optimize heat recovery, it is desired to have the exhaust gas temperature at the HRSG exit to be optimum. Therefore, a more in-depth look at the heat recovery process must be made.

To optimize heat recovery in the lower temperature regions of the HRSG (approximately 470° F. exhaust gas entering temperature to the 180° F. exhaust gas exit temperature range), a sufficient amount of heat must be removed by the pressurized feedwater. The average heat capacity of the exhaust gases in this range (470° F. to 180° F.) is 0.257 BTU/lb/° F. (note that this value can vary slightly with exhaust gas oxygen content/amount of supplemental firing). Between the temperatures of 100° F. and 400° F., the average heat capacity of water is 1.014 BTU/lb/° F. Therefore, to obtain an increase in feedwater temperature to correspond to a commensurate decrease in exhaust gas temperature, the flow ratio should be (1.014/0.257) or 3.95 lbs of exhaust gas per lb of feedwater in this temperature range of the HRSG. A flow ratio at or near this number will optimize heat recovery for this section of the HRSG. Changes in parameters such as exhaust gas oxygen content, inlet water temperature, and other factors can be monitored in the plant DCS control system and the optimum feedwater flow through each section of the HRSG can be calculated and controlled.

Experience has determined that providing cold water temperatures at the inlet to the LP economizer section (feedwater directly from the condenser) can have detrimental effects on the life of the economizer components. This is due to corrosion problems in the economizer as a result of tubes and fins in the economizer being colder than the dew point of the exhaust gases of the HRSG. Since these components are typically constructed of a carbon steel or low alloy steel, the condensed moisture on the tube and fin surfaces corrodes away these components and reduces heat exchanger effectiveness. Two common methods are utilized to alleviate this problem. One is to use a feedwater preheater to introduce warmer water into the economizer. The other method is to construct a portion of the LP economizer from non-corroding material, such as stainless steel. Either method is acceptable, and the one selected is usually the one that is determined to be economically optimum.

HRSG HP Economizer Section

The HP economizer section of the HRSG heats the feedwater from approximately 400° F. (exit of the LP economizer), ideally to the saturation temperature of the pressure in the evaporator section. Using an average pressure for this example of 1800 psia, the saturation temperature at this point is 621° F. In this range, the average heat capacity of the feedwater is 1.230 BTU/lb/° F. To heat this water, GT exhaust gases will need to enter the section approximately 50° F. above the feedwater exit temperature, or 671° F. The average heat capacity of the exhaust gases in this range (671° F. to 470° F.) is 0.264 BTU/lb/° F. (note that this value can vary slightly with exhaust gas oxygen content/amount of supplemental firing). Therefore, for this section of the HRSG, the flow ratio should be (1.230/0.264) or 4.66 lbs of exhaust gas per lb of feedwater. Since this flow ratio does not match with the LP economizer optimum flow ratio, an adjustment will need to be made to compensate for this mismatch (differing optimum flows through each section).

HRSG Evaporator Section

The evaporator section (sub-critical applications) is unique from other sections in the HRSG in that its inlet and outlet temperatures are essentially constant (for constant pressure operation). This adds stability to the heat exchange process, and the Log Mean Temperature Difference (LMTD) fluctuates less with variations in flow than that of other sections since the outlet temperature is essentially constant. The LMTD is a non-linear heat transfer variable that is used to determine the heat transfer capability of a heat exchanger.

Due to this constant temperature factor, the sections downstream of the evaporator, the HP and LP economizers, see relatively constant (slight variation with pressure/load) input temperatures. However, in several preferred embodiments, supplemental firing will greatly alter the inlet temperatures to the evaporator section, as well as the superheater and reheater sections. These increasing and decreasing temperatures will determine the steam flow through the HRSG, and ultimately, the ST output. Therefore, unlike the economizer sections, an optimized flow ratio is not truly applicable for the upstream sections of the HRSG.

Since the evaporator section of the HRSG absorbs a major share of the heat available, and actually produces the steam, its output is modulated mostly by the section exhaust gas inlet temperature, which is largely a function of the HRSG exhaust gas inlet temperature. Therefore, the control of this section is done primarily through fuel input.

HRSG Superheater and Reheater Sections

These sections are similar in that they both heat steam to a higher temperature. The superheater section receives saturated steam from the evaporator section and heats it to the HP turbine inlet temperature. A desuperheater is used at the exit of this section to control the temperature to the desired value.

The reheater section receives steam from the HP turbine section exhaust and reheats it back to the IP turbine inlet temperature. A desuperheater can be used at the exit of this section to control the reheat temperature, but does so at a cost in cycle efficiency. This is noted by Eugene A. Avallone and Theodore Baumeister III in MARKS' STANDARD HANDBOOK FOR MECHANICAL ENGINEERS (NINTH EDITION) (ISBN 0-07-004127-X, 1987) in Section 9-24 through 9-25 which states:

"The attemperation of superheated steam by direct-contact water spray . . . results in an equivalent increase in high-pressure steam generation without thermal loss . . . Usually, spray attemperators are not used for the control of reheat-steam temperature since their use reduces the overall thermal-cycle efficiency. They are, however, often installed for the emergency control of reheat steam temperatures."

Figure 14:
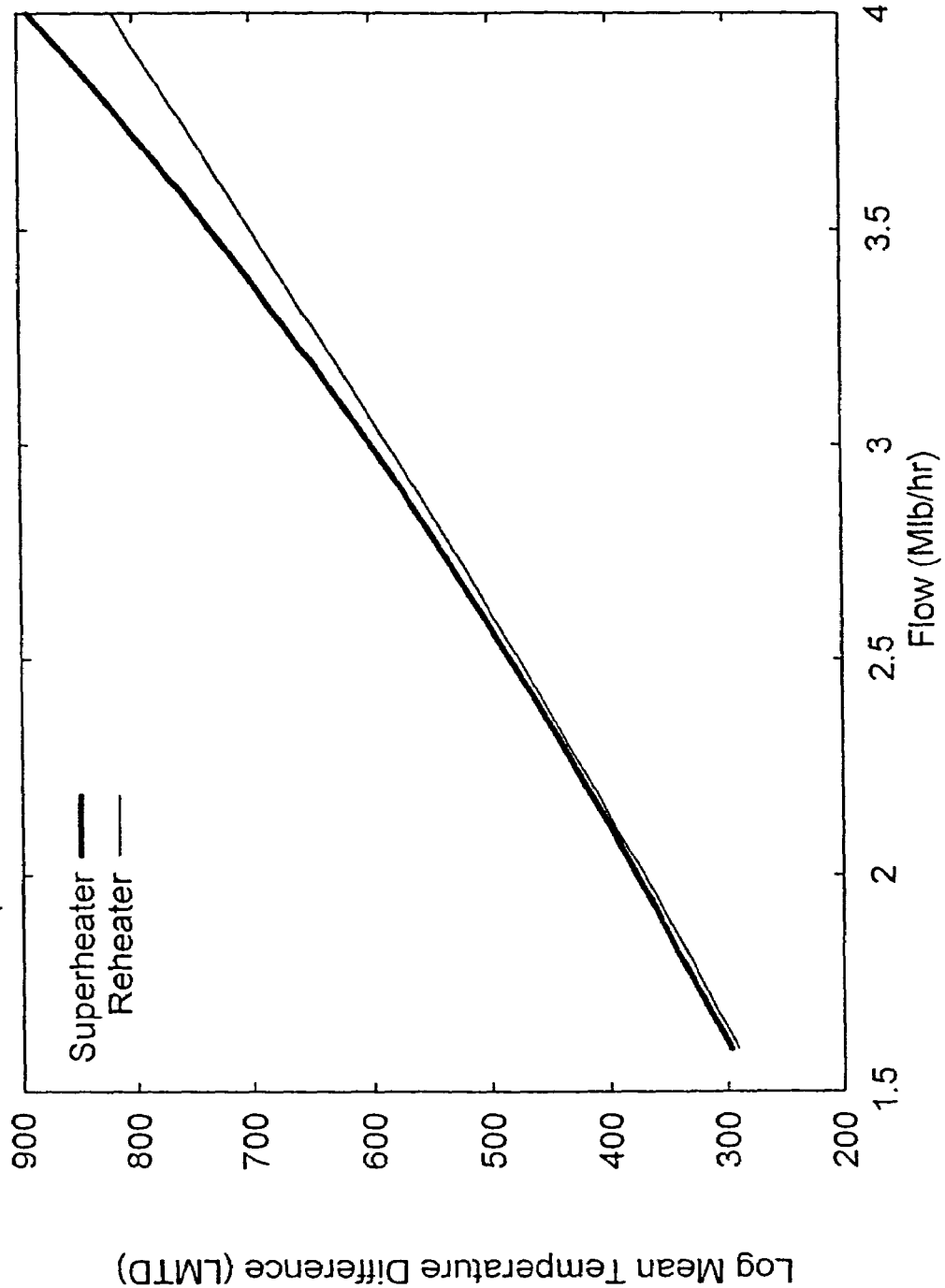
FIG. 14 illustrates a typical graph of required log mean temperature difference (LMTD) versus fluid flow for a superheater and reheater application.

FIG. 14 is a set of curves illustrating the heat requirements for the superheater and reheater sections as a function of flow. These curves do not include small effects for desuperheating, extraction flows, heat loss in the pipe, or other minor adjustments. Notice that both these sections require proportional amounts of heat with flow (ST load) changes. Therefore, it may be advantageous, although not necessary, to build these two sections as one in the HRSG, each with its own appropriate heat exchange surface area.

HRSG Surface Areas

In order to obtain the necessary heat transfer from the GT exhaust gases to the water/steam, it is required that sufficient amounts of heat exchange surface area be provided in each section. The controlling equation that describes this overall heat exchange is $$Q = U \times A \times LMTD$$

where
Q=heat transferred in BTU/hr
U=overall heat transfer coefficient in BTU/hr/ft$^2$/° F.
A=total surface area in ft$^2$
LMTD=log mean temperature difference
with the log mean temperature difference (LMTD) being defined as $$LMTD = (GTTD - LTTD)/ln(GTTD/LTTD)$$

where
GTTD=greater terminal temperature difference
LTTD=lesser terminal temperature difference
The terminal temperature differences are
1. the temperature of the exhaust gas into an HRSG section minus the water or steam temperature out, and
2. the temperature of the exhaust gas exiting an HRSG section minus the water or steam temperature in.

Obviously, the larger value is the GTTD and the smaller value is the LTTD. If they are equal, then either one equals the LMTD. If either the GTTD or the LTTD become too small, the surface area, A, must become very large to compensate. Since the surface area is essentially the total effective surface area of all the tubes and fins in the HRSG section, adding area adds size, weight, and cost to the HRSG.

The other factor in the heat exchange equation, U, is based upon the surface coefficient of heat transfer between the water/steam and the tube inner wall, the heat conductance of the tube material and its thickness, and the surface coefficient of heat transfer between the exhaust gases and the tube outer wall.

For general purposes, the controlling factor in this equation is the surface coefficient between the exhaust gases and the tube outer wall. This is because it is the largest resistance to heat transfer, and like a group of resistors in series in an electrical circuit, the largest resistance controls the flow. Therefore, factors that have the greatest effect in changing the outer heat transfer coefficient are of the most concern to engineers designing the HRSG and selecting the areas for each section.

From a control standpoint, selection of the areas in each section is critical, because once the HRSG is built, these areas cannot be changed, but become a fixed value. Factors which affect changes in the value of U are those which change the velocity of the exhaust gases over the tube surfaces. The predominant deviation is a change in the exhaust gas flow. Since the GT is a constant volume machine, this occurs with changes in the ambient air temperature. In addition, it occurs with load changes on the GT. If these factors can be minimized, the HRSG can be more readily designed for operation within a narrow band and better optimized.

As will be illustrated in the example of a preferred exemplary embodiment of the present invention, the disclosed system and method allows for GT operation at full load (temperature control) over a wide range of total combined cycle plant load. This contrasts sharply to the prior art that utilized changes in GTs load to modulate the overall combined cycle plant load. Therefore, at most operating points, the only significant changes in HRSG flow will be attributed to ambient temperature changes (fuel from supplemental firing adds less than 1% to the exhaust gas flow). With an ambient temperature range of −20° F. to 100° F., the exhaust gas flow would vary approximately 13%. For GTs in the prior art, load changes alone could account for large changes in exhaust gas flow. The GE Model PG7241(FA) gas turbine, at 55% load, produces only 70% of full load exhaust flow. With ambient changes, this total flow change could be only 61% of HRSG design flow. This off design flow results in inefficiency in the HRSG and requires design compromises to accommodate such a wide range of operating conditions.

Due to the large temperatures in the HRSG as a result of continuous supplemental firing, the LMTDs seen in several preferred exemplary embodiments are greater than those in the prior art. Therefore, the required surface areas are reduced and the overall size of the HRSGs may be smaller. This results in a substantial cost savings in terms of both construction and floor space costs.

HRSG Controls

In the prior art, HRSG controls for balancing the heat transfer were limited. Desuperheating controls in the superheater and the reheater were common. Supplemental firing to control the steam production is not typically used due to its negative impact on efficiency, and its added cost. Bypasses around some economizer and feedwater sections were sometimes utilized in the prior art.

With several of the preferred exemplary embodiments, steam production is essentially controlled by the supplemental firing rate. More energy input means more steam output. Multiple duct burner rows can be utilized for improved section heat transfer control. Multiple duct burner rows allow fuel (heat) input at more than one position along the exhaust gas stream of the HRSG, and with limited heating and subsequent section cooling at several locations along the HRSG, serves to lower overall HRSG temperatures (possibly avoiding the more expensive water-wall construction).

As with the prior art, desuperheating controls will be used in the superheater, while desuperheating in the reheater should be limited to emergency control of reheat steam temperatures. Reheat steam temperatures can be maintained by careful selection of the HRSG heat exchange areas and by adjustment of trim flow in a split superheater arrangement.

Figure 6:
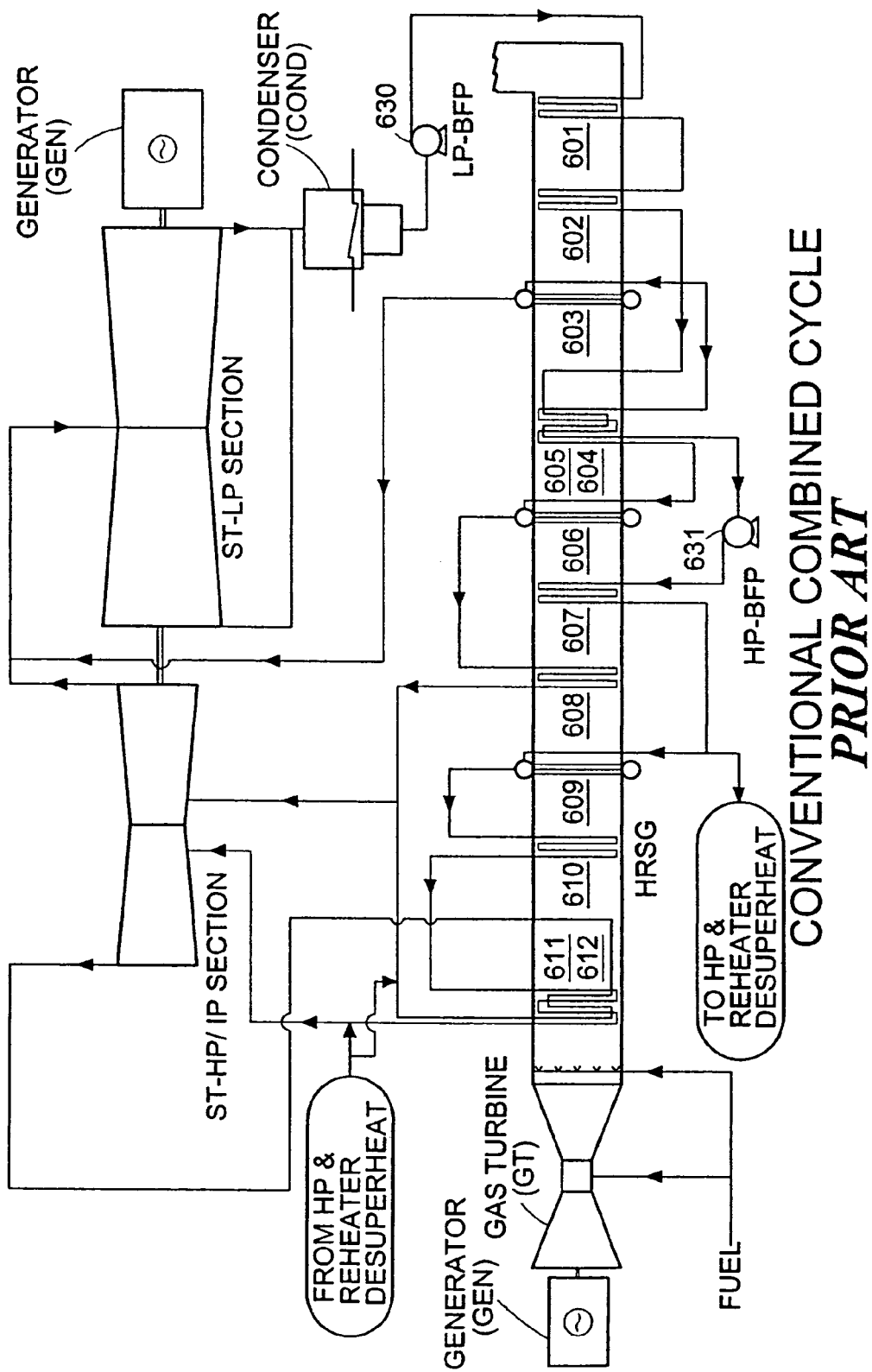
FIG. 6 illustrates a schematic of the prior art for a combined cycle power plant utilizing gas turbines, HRSGs, and steam turbines.
Figure 7:
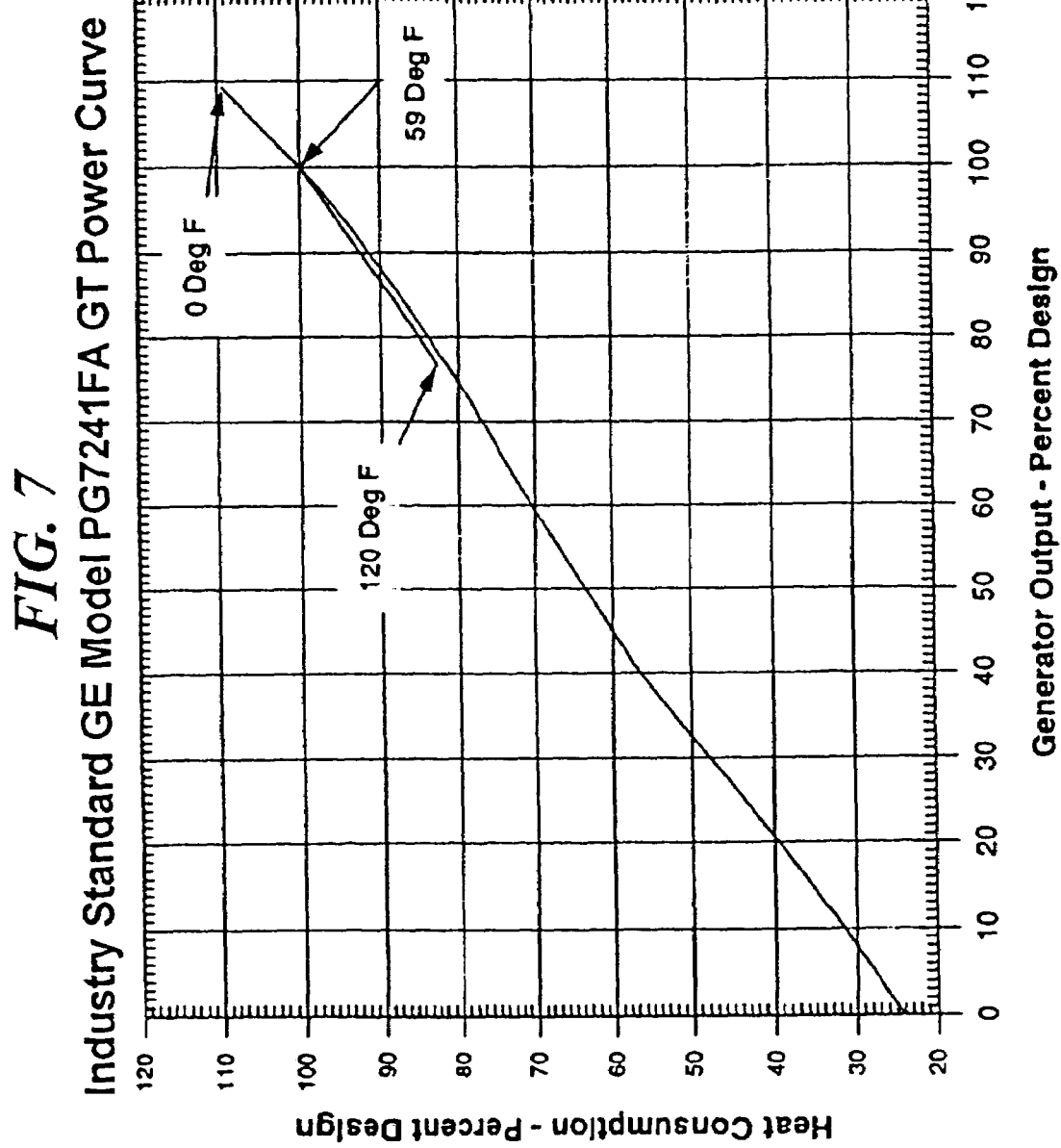
FIG. 7 illustrates a curve of heat consumption versus generator power output for an industry standard General Electric (GE) Model PG7241(FA) Gas Turbine.

Feedwater flow through the HP economizer is controlled to the optimum exhaust gas/feedwater flow ratio as is the LP economizer flow. With only one pressure level and six sections, the HRSG in this exemplary embodiment is much simpler to control and adjust than the 12-section, three pressure level boiler from the prior art illustrated in FIG. 6.

HRSG Comparison—Preferred Embodiment to Prior Art

The HRSG in several preferred exemplary embodiments may in many circumstances be similar to the HRSG in the prior art in that it will have a large number of tubes that transport the feedwater and recover heat from the GT exhaust gases and transfer it to the water/steam in the tubes through convective heat transfer. This device will be very large. Both a preferred exemplary embodiment and the prior art HRSGs will be contained in a large housing that directs the GT exhaust gases from the GT exhaust to the HRSG exhaust stack. The HRSG may be oriented in either a horizontal or vertical orientation as required to meet mechanical construction constraints.

Several preferred embodiments of the present invention, however, will have only one pressure level. This does not exclude the use of additional pressure levels, only that single pressure level is exemplary of a preferred best mode exemplary embodiment. This arrangement contrasts with the prior art which utilized multi-pressure level HRSGs to maximize heat recovery.

With only one pressure level and design for continuous supplemental firing, a preferred exemplary HRSG embodiment may require less heat exchange area than the prior art. This will serve to reduce overall size, footprint, weight and cost. Some of the cost savings, however, will be offset by the need for higher temperature materials and/or perhaps waterwall construction in a preferred exemplary HRSG embodiment.

With less surface area in a preferred exemplary HRSG embodiment, it is likely that the exhaust backpressure experienced by the GT due to the HRSG will be reduced. This will serve to increase the GT output and efficiency. Supplemental firing, however, tends to increase this backpressure and will reduce some of the performance gains achieved as a result of lower exhaust gas restriction.

Due to the flexibility added by a preferred exemplary embodiment to the steam cycle, the GTs will operate at full load over a wider range of total combined cycle plant output. This factor serves to provide a more constant flow to the HRSG, provide for a more optimized design, and eliminate inefficient operation at part load conditions.

With only one pressure level, the HRSG from a preferred exemplary embodiment will be easier to monitor and control. With only small changes in flow and/or temperatures in the HRSG, a preferred exemplary embodiment is able to make small adjustments in the section feedwater/steam flows to compensate for these changes. With the added sections, greater variations in exhaust gas flow, and its less comprehensive control system, the HRSG in the prior art was more of a reactive system to the ever changing system parameters, versus a preferred exemplary embodiment which is more of a proactive system.

New Overall Combined Cycle Power Plant

The new overall combined cycle power plant of a preferred exemplary embodiment will be similar to the prior art, but will have both subtle and major differences. The major pieces of equipment, their operation, and cost impact will now be examined and compared relative to the prior art.

Gas Turbines

The GTs utilized in several preferred exemplary embodiments may be standard GTs as would be used in the prior art. The only difference would be from a performance standpoint regarding the amount of pressure drop through a preferred exemplary HRSG embodiment. The basic engine, controls, packaging, and overall arrangement may be unchanged from the prior art. Therefore, there are no engineering or development costs associated with this major piece of equipment. This allows the use of proven technology and helps maintain a high level of power plant reliability. Obviously, GT performance enhancements such as inlet chilling, evaporative cooling, and other such methods to increase GT output may be utilized.

HRSGs

The HRSGs from a preferred exemplary embodiment may be smaller, more compact, single pressure level, have controlled heat transfer, and be optimized for continuous supplemental firing. With one pressure level versus multi-pressure levels, some preferred exemplary HRSG embodiments may be simpler to operate and monitor. Controls may be employed which control the firing rate, sectional flows, and/or section outlet temperature to provide optimum heat recovery and cycle efficiency for a given set of operating parameters.

With the operational flexibility designed into the steam cycle, the GTs will be able to operate at full load over a wide range of power plant load, providing a more consistent exhaust gas flow to the HRSGs and thus much more efficient performance. Fewer pressure levels, higher cycle efficiency, more consistent operation, all lead to better reliability and lowered O&M costs.

The need for higher temperature materials or perhaps water-wall construction in some preferred exemplary HRSG embodiments will tend to raise the initial cost and also increase the O&M costs. It is doubtful that these increased costs will be more than the savings realized from eliminating other pressure levels, associated controls, and extra heat exchange area.

HRSGs such as those illustrative of the present invention teachings currently do not exist in the form as described. However, conventional steam power plant boilers have been built for decades, and this technology could certainly be applied to some preferred exemplary HRSG embodiments. In addition, numerous HRSGs have been built with multi-pressure and single pressure levels, and many have been built with some degree of supplemental firing (including the higher temperature water wall construction). Of all the major components in a preferred exemplary embodiment, this one will require the most engineering and design effort. However, as stated previously, the continuously fired HRSG with a single pressure level is a novel concept for this application, but is not beyond technological practice or capability for those skilled in the art.

Steam Turbines

In the prior art, the STs were designed basically by the heat recovered by the HRSG. On large combined cycle plants, a rule of thumb is that the ST output is approximately 50% of the combined GT output. With supplemental firing this percentage could be increased, but due to the negative effect on efficiency that was experienced utilizing the hardware, systems, and methods of the prior art, these increases were typically small. GE informative document GER-3574F (1996), entitled "GE Combined-Cycle Product Line and Performance" by David L. Chase, Leroy O. Tomlinson, Thomas L. Davidson, Raub W. Smith, and Chris E. Maslak, in Table 14 indicates that HRSG supplemental firing can increase combined cycle plant output in the prior art by 28%, but only with an increase in overall combined cycle heat rate (specific fuel consumption) of 9%.

The prior art focused on multi-pressure level HRSGs and STs that used this steam. Consequently, the STs had relatively small HP flows, moderate IP flows due to the addition of IP steam from the HRSG, and relatively large LP flows due to the further addition of LP steam from the HRSG. This yields lower volumetric efficiency for the HP and IP sections of the ST, and potential exhaust end loading problems for the LP section. In addition, the steam cycles themselves were somewhat inefficient, as the IP and LP steam produced by the HRSG had less potential to produce work than the HP steam. Finally, the IP and LP steam flows detrimentally add to both the ST exhaust end loading and also the heat rejection requirements.

Due to the volumetric efficiency problems and cost/benefit ratios, the inlet pressure ratings for combined cycle plant STs has been limited to approximately 1800 psia. As multi-pressure HRSGs have been employed, there has been no need for the use of conventional feedwater heating as there has always been ample heat in the HRSG to provide this function. Thus, the increases in steam cycle efficiency from this efficiency enhancement feature are not commonly applied.

The ST utilized in a preferred exemplary embodiment may be larger and more efficient than that from the prior art. The ST utilized in a preferred exemplary embodiment can have a rating of approximately 0.75 to 2.25 times (or more) than that of the total GT output. For an equivalent number of GTs and HRSGs capable of firing to 2400° F., overall combined cycle plant capacity may be increased by a factor of 2.00 or more over the prior art. This equates to a ST in several of the preferred embodiments that can be rated at up to 4.50 times the rating of the ST from the prior art (a ST that was associated with the same GTs).

The ST may be similar to that from the prior art, but will likely have an increased inlet pressure rating. In addition, the ST in a preferred exemplary embodiment may utilize extraction steam fed feedwater heating, which will increase the steam cycle efficiency. With no IP or LP steam from the HRSG, the steam flow to the HP section of the steam turbine at rated conditions will be the maximum flow through any section. This increases HP section volumetric efficiency. From this point, steam will be extracted from the ST to various feedwater heaters, fuel preheaters, a smaller steam turbine driven BFP, and/or other plant services. This operation reduces the exhaust end flow, reducing the possibility of high exhaust end loading in the ST. All these features are typical of a ST that would be used in a conventional steam power plant.

Due to its large increase in rating, (from approximately 50% of GT total capacity to approximately a range of 100% to over 200% of GT total capacity), the ST may require larger last stage blades and/or more LP sections. This represents a relatively low cost addition for capacity compared to extra GTs, HRSGs, switchgear, transformers, foundations, etc. that would be required in the prior art to provide this extra capacity.

Other than its larger flow passing capability, higher rating, improved efficiency, and larger blading and/or extra LP section(s), the ST may appear similar to a ST in the prior art. It is designed typically to extract steam flow from the turbine for conventional feedwater heating, rather than admit flow to the turbine from the IP and LP HRSG sections. However, the ST would be extremely similar to a ST of similar rating and inlet conditions found in a modern conventional steam power plant. Therefore, this new combined cycle method allows for the use of more conventional, higher efficiency ST hardware and more efficient steam turbine cycles. This maximizes the bottoming cycle efficiency, vastly increases capacity, and reduces overall combined cycle power plant size and installed cost, all without a sacrifice in reliability.

Operation

With the large amounts of supplemental firing (high ST/GT ratio), and the ability to vary this rate of firing, several preferred exemplary embodiments become an arrangement where the bottoming cycle is much more independent than in the prior art. Due to this phenomenon, and the fact that from an emissions and efficiency standpoint it is best to operate the GTs at full load, most of the overall combined cycle plant load variations in a preferred exemplary embodiment are accomplished by varying the rate of supplemental firing and subsequently the ST load, while the GTs continue to operate at or near full load. This contrasts from the prior art where supplemental firing was utilized to obtain only minor increases in plant output during peak operation, and overall plant load control was achieved mainly through load changes on the GTs.

In several preferred exemplary embodiments, at overall plant full load, the GTs will be at full load, and either the HRSG will have reached its firing temperature limit, or the ST will have reached its inlet pressure limit. From this point, as plant load is reduced, supplemental firing is reduced, steam production is reduced, and subsequently the ST load is also reduced. This process of load reduction continues until adequate flows can no longer be maintained in the HRSG.

Figure 43:
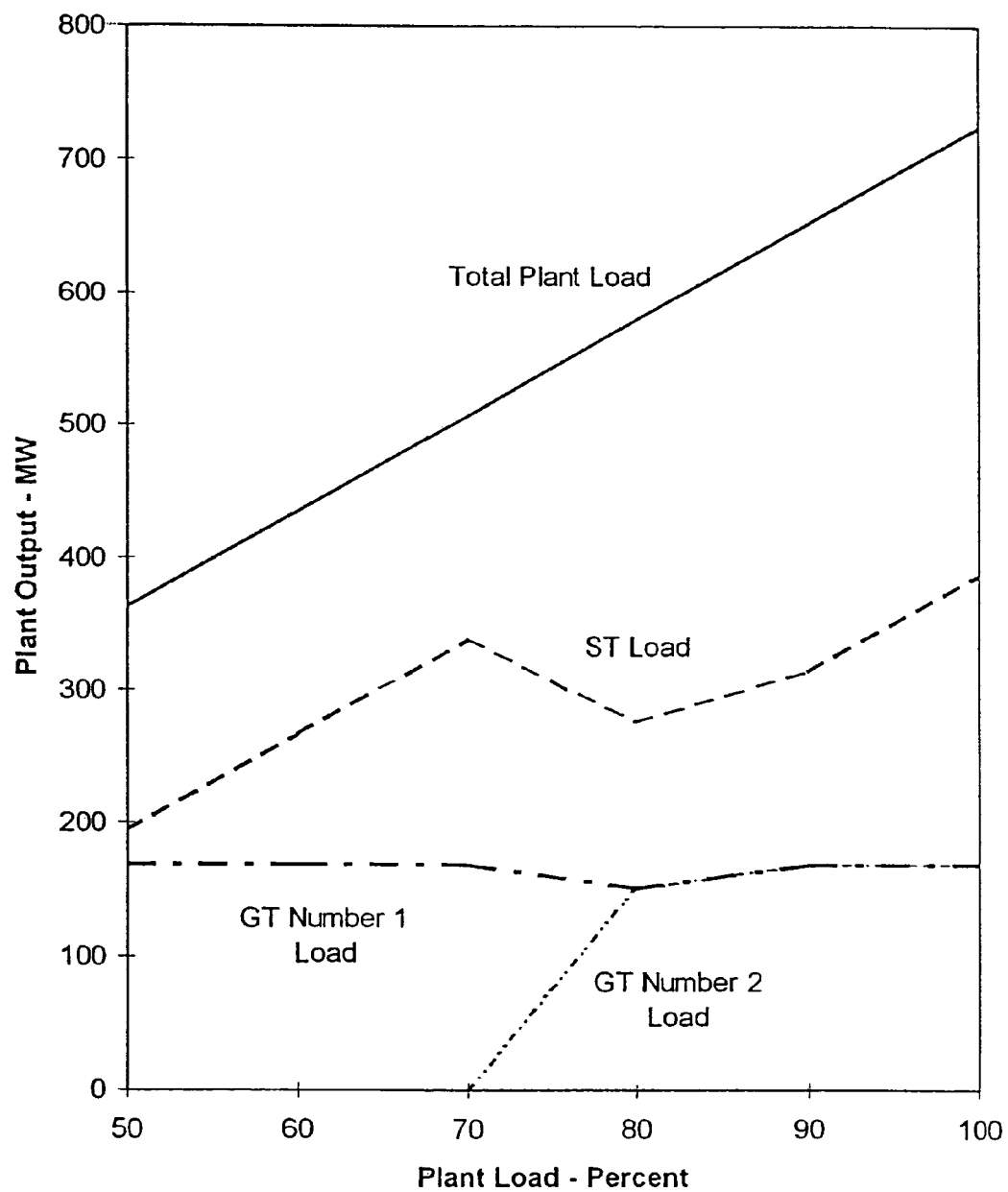
FIG. 43 graphically illustrates a power plant load control method that may be used with a combined cycle of the present invention in which two or more GTs are utilized.
Figure 46:
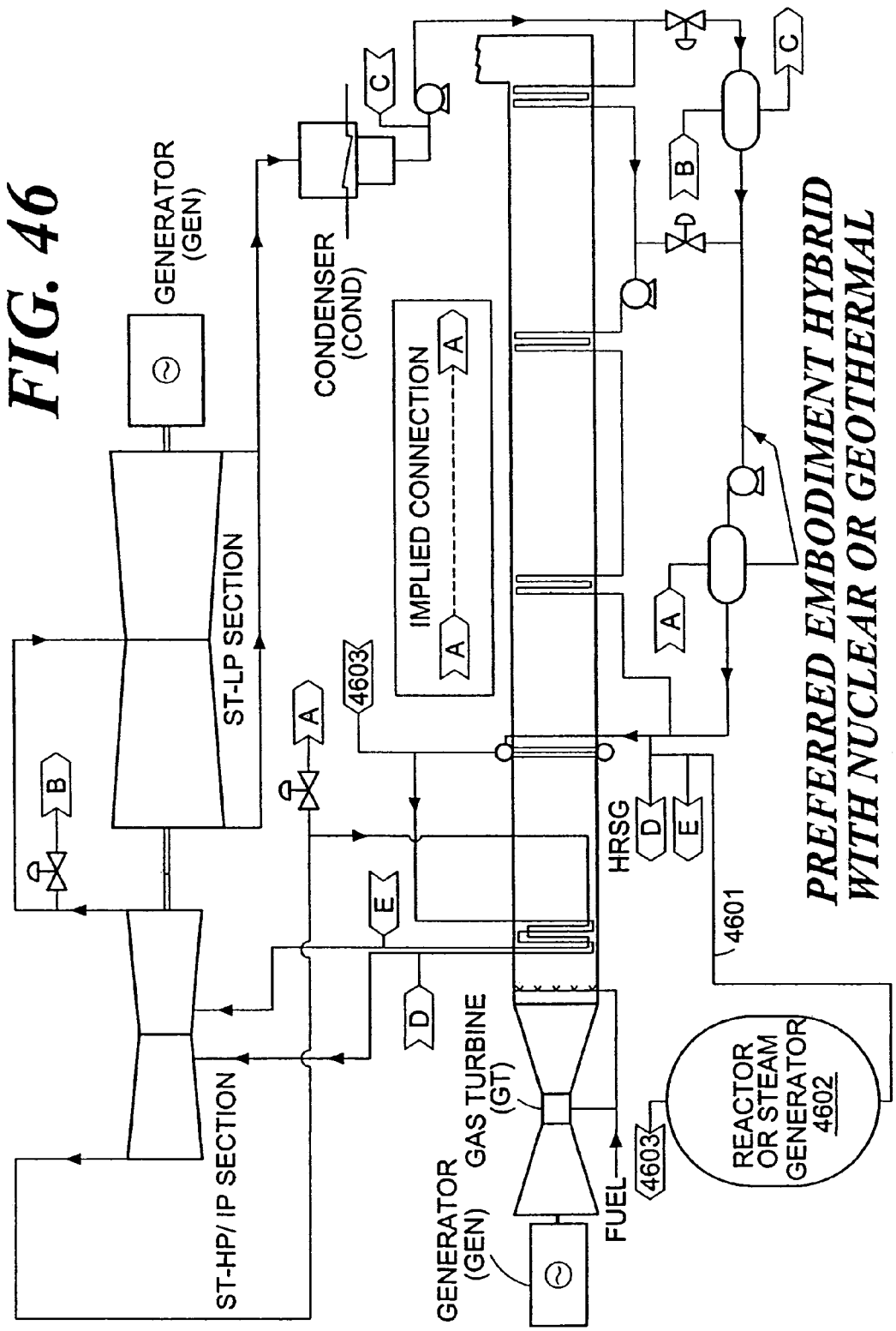
FIG. 46 illustrates a preferred embodiment combined cycle power plant utilizing a hybrid fuel arrangement with a nuclear reactor, geothermal steam generator, or other steam producing energy source.

Once adequate flows can no longer be maintained in the HRSG, the ST and/or HRSG will reach an operational limit. At this point it will be necessary to decrease load on a GT or GTs. As the total GT load is reduced, ST load can be increased to meet system load. Refer to FIG. 43 for a suggested mode of operation with multiple GTs. This control method may be used to reduce load from overall plant full load down to the HRSG and/or ST low limit by varying the rate of supplemental firing only, and allowing the GTs to operate at full load. Once at this low limit, one GT can be unloaded, and its HRSG will begin to produce less steam. Concurrently, the remaining GT can remain at or near fall load, and its HRSG can increase its rate of supplemental firing. This results in more steam to the ST. The net result is a transitional zone of operation where one GT is reduced in load while the ST compensates for most of this load reduction. After reducing overall plant load sufficiently to pass through this transitional zone of operation, one GT will be taken out of service (shut down), and the remaining HRSGs will be supplemental firing at high rates and the ST will be operating at a much higher load than at the upper end of the transitional zone. This scheme of operation allows the GTs to remain at or near full load through a large range of the overall plant's expected output (approximately 50 to 100% of plant rating) with only a narrow band of operation in the transitional zone where one GT is brought from full load to an out-of-service condition. For FIG. 43, this transitional zone of operation is between 70% and 80% of plant load.

An exemplary embodiment of a control structure implementing the above procedures is illustrated conceptually in the flowcharts of FIGS. 16–19. Discussion of this embodiment is detailed later in this document.

Performance

Since the rate of supplemental firing is large compared to the prior art, the ST capability is greatly increased. By utilizing an HRSG capable of 2400° F. inlet temperatures, the ST can be designed (for example) at its rated point to be approximately 2.25 times the output of all the GTs combined. This is substantially more than a ST from the prior art, as in these applications, ST rated output was typically in the range of 0.4 to 0.6 times the output of all the GTs. This greatly increases the capacity of the power plant, as the ST is now capable of ratings that are up to 4.50 times that of the ST in the prior art. Also, as previously mentioned, the operational flexibility afforded by this arrangement allows for operation of the GTs at full load over a wide range of overall plant output. This increases the plant's part load efficiency and lowers NOX emission levels for GTs which typically demonstrate increased NOX emissions at part load operation.

With this large increase in capacity over the prior art, the added flexibility, and lowered cost per kW of capacity, this example of a preferred exemplary embodiment combined cycle plant is more adept both operationally and economically to provide the temporary power requirements of seasonal peak loads. In addition, small operational variables (like the isolation of feedwater heaters or operation with the HP inlet pressure at 5% over rated) will allow this example of a preferred exemplary embodiment to attain even greater capacity than rated, but at a slight cost in efficiency. Since seasonal peaks may have durations that last for only a matter of days each year, this is an inexpensive method to generate more power during peak periods (which may be sold at very high rates) for minimal cost. The increased revenue is envisioned to more than compensate for the inefficiencies and the increased fuel costs incurred during these temporary peak loading conditions, thus making this an economically advantageous alternative for plant designers and electric utilities. As reported in POWER MAGAZINE, (ISSN 0032-5929, March/April 1999, page 14):

"Reserve margins are down nationwide . . . Last summer's Midwest price spikes, up to [US]$7000/MWh [(US$7.00/kWh)], garnered most of the press coverage, but spikes of [US]$6000/MWh [(US$6.00/kWh)], also occurred in Alberta . . .

Although it has been stated in the prior art that supplemental firing decreases overall combined cycle thermal efficiency, this example of a preferred exemplary embodiment has shown this assumption to be incorrect. By utilizing the fuel added in supplemental firing to not only add heat, but upgrade the bottoming cycle efficiency, it is possible to meet or exceed prior art overall combined cycle efficiencies. This is accomplished through the use of higher inlet steam pressures, larger more efficient STs, the conversion of lower pressure steam utilized in the prior art to high-pressure steam, and the use of conventional feedwater heating. Part load operation is also improved as the GTs in this example of a preferred exemplary embodiment will operate at full load (where they are most efficient) for a vast majority of their operation (neglecting the time when they may be out of service).

Part Load Performance

As system load is reduced, the combined cycle plant load must be reduced to meet the electrical system demand. In the prior art, this was accomplished by a reduction in load on the GTs. This mode of load control causes a decay in the GT efficiency as well as the overall combined cycle plant efficiency. With several of the preferred embodiments of the present invention, however, load control is accomplished more through the variation of the amount of supplemental firing. In this manner, the GTs remain at or near full power where they are the most efficient and have the lowest emissions. The bulk of the load modulation is then accomplished by a reduction in the amount of steam production and a subsequent reduction in the output of the ST. This mode of operation provides for improved part load efficiency for the overall combined cycle plant, as well as a reduction in maintenance on the GTs as a result of the reduction in thermal cycling operation (GT internal temperatures typically vary with changes in GT loading).

Figure 33:
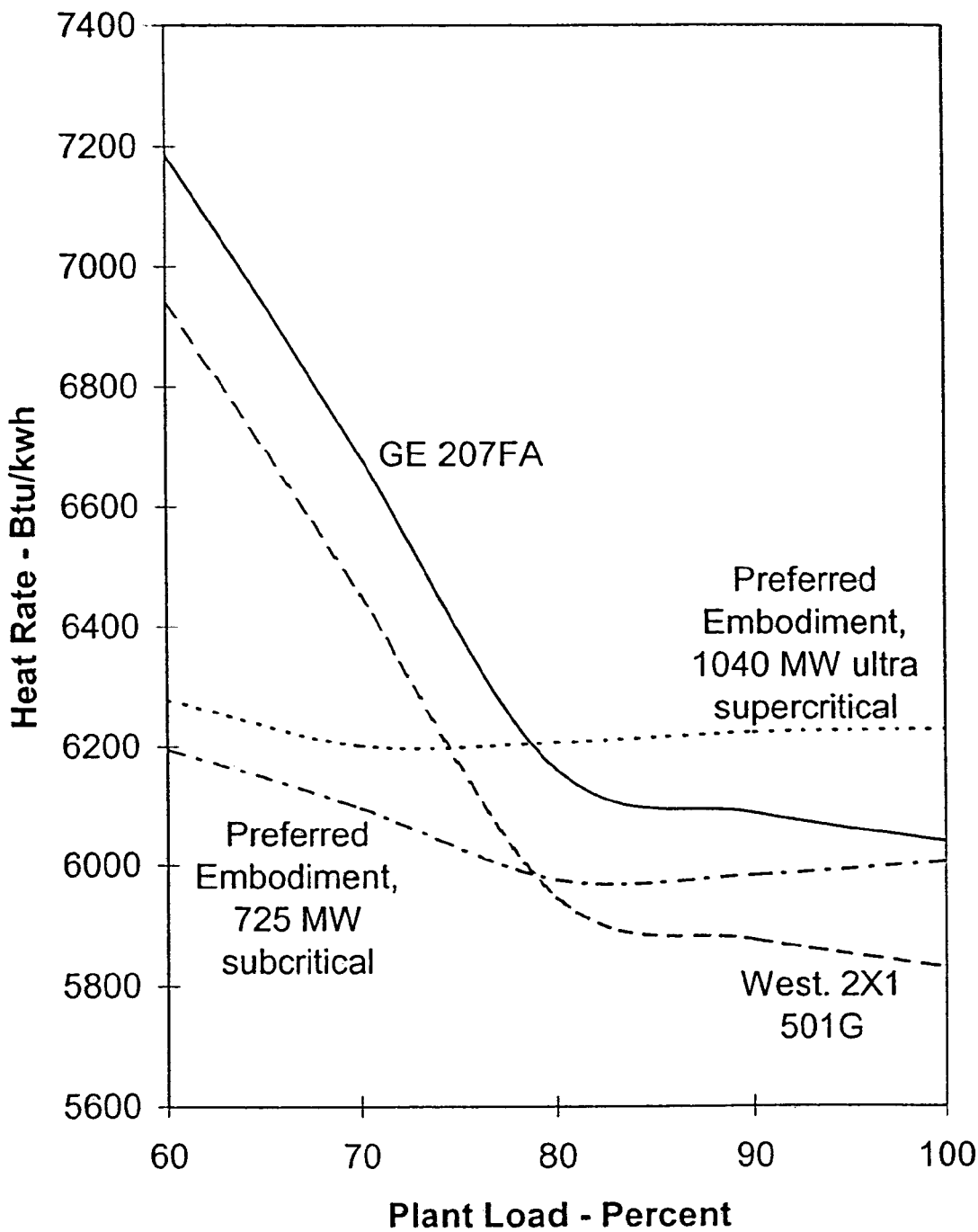
FIG. 33 graphically illustrates the part load efficiencies of several exemplary power plants of the present invention as well as several examples from the prior art.

FIG. 33 indicates some part load efficiencies that can be expected from conventional combined cycle power plants in the prior art and also those that can be attained with several of the preferred embodiments of the present invention. As can be seen from these curves, the prior art combined cycles continually degrade from their optimum performance as load is reduced from 100%. However, several of the preferred embodiments of the present invention actually experience an increase in efficiency as load is initially reduced from 100% before it begins to degrade below about 80%. This part load efficiency profile for several of the preferred embodiments of the present invention provide for substantial fuel savings as compared to the conventional combined cycle in the prior art.

Peak Load Performance

The present invention is particularly well suited for providing power at periods of peak load. During these periods, the output of a preferred embodiment combined cycle power plant may be temporarily extended beyond its nominal rated load. As mentioned previously, this temporary extension beyond rated power plant load may provide an enormous economic benefit, as peak power can sell for hundreds of times the normal price of non-peak generated electric power. Therefore, there is a strong incentive for power plant owners to generate this power. As previously mentioned, the prior art has addressed this problem by utilizing supplemental firing in the HRSG. Not only does this reduce the conventional combined cycle efficiency in the prior art at peak loads, but also due to the need for added ST capacity the base prior art combined cycle efficiency is also reduced at non-peak loads as well (ST is already at part load with no supplemental firing). Thus, the ability to extend the peak power rating of conventional combined cycle power plants comes with a detriment to the overall plant efficiency at all plant load operating points.

Since ST capacity can be increased through greater mass flow, techniques that increase steam flow through the ST will normally increase overall ST output. Since the present invention teaches a predominantly Rankine cycle combined cycle, and as such, increases in the ST output affect a wider variation in the overall combined cycle power plant capacity. Therefore, this effect to ST output is much more effective than in the primarily GT-based combined cycle power plants as taught by the prior art.

Note in the following table that as the pressure is increased a corresponding increase in steam flow takes place. If this pressure increase is coupled with a corresponding decrease in inlet steam temperature, further increases in mass flow are attainable. In conjunction with this, isolation of feedwater heaters will serve to direct more steam flow to the exhaust of the ST, further increasing ST output. Unlike the prior art, this method provides the ability to extend the peak power rating of combined cycle power plants implementing the present invention without incurring a detriment to the overall plant efficiency at non-peak plant load operating points.

| Peak Power Extension Example | | | | | |
|---|---|---|---|---|---|
| Inlet Pressure (psia) | Inlet Temperature (degrees F.) | Specific Volume (ft³/lb) | Mass/Steam Flow (lb/hr) | Volume Flow (ft³/hr) | Steam Flow Increase (new/old) |
| 2400 | 1050 | 0.338245 | 2000000 | 676490 | Baseline |
| 2520 | 1050 | 0.320349 | 2111730 | 676490 | 1.055865 |
| 2520 | 1000 | 0.304021 | 2225143 | 676490 | 1.112571 |
| 2520 | 950 | 0.286872 | 2358162 | 676490 | 1.179081 |
| 2640 | 1000 | 0.288236 | 2346998 | 676490 | 1.173499 |
| 2640 | 950 | 0.271554 | 2491183 | 676490 | 1.245591 |

Cost

A substantial advantage to this exemplary preferred embodiment is the cost savings. As mentioned previously, a plant with HRSGs designed for up to 2400° F. inlet temperature through supplemental firing can easily have a ST rated 2.0 times the total GT capacity. Therefore, total plant output is 3.0 (2.0 ST+1.0 GT) times the GT capacity. A combined cycle plant from the prior art would have a ST rated at approximately 0.5 times the total GT capacity. Therefore, the capacity ratio is essentially (3.0/1.5)=2.0. In other words, the combined cycle plant from this preferred exemplary embodiment will have 100% greater capacity than the prior art. An example of this trend is demonstrated in FIG. 39, which is a heat balance for a 1040 MW exemplary preferred embodiment utilizing two (2) industry standard GE model PG7241FA GTs and a large ST. FIG. 22 illustrates a combined cycle from the prior art utilizing the same quantity and model of GTs and the standard smaller ST, nominally rated at 520 MW.

This means that to provide capacity equal to that from this example, a combined cycle plant from the prior art would need to add 100% more equipment. This means more GTs, another ST, more HRSGs, switchgears, transformers, and all the necessary systems and real estate required to support this equipment. This will serve to raise the plant installed cost by essentially 100%.

In terms of 1999 dollars, a modern high efficiency large combined cycle power plant could be installed for approximately US$450 per kW of capacity. Therefore, a 720 MW plant (720,000 kW) would cost US$324 million to construct. If this plant were to be expanded to 1050 MW, the installed cost would climb to US$472 million. In contrast, the present invention teaches that it is possible to use less equipment to affect this expansion, thus decreasing the cost per kW of rated plant capacity.

Retrofits

Another prime application for this example of a preferred exemplary embodiment is in retrofit applications of existing plants. Many steam-powered plants in existence today will produce expensive power compared to the highly efficient combined cycle plants discussed herein. With electrical deregulation on the horizon, it will be imperative that power producers be competitive. Therefore, technology that will help existing steam plants compete with new combined cycle plants is needed.

Since this example of a preferred exemplary embodiment operates (predominantly) on a single pressure level, utilizes higher steam pressures that are typical for STs found in conventional steam plants, has a higher ST/GT output ratio, and provides for a compact design, it is ideally suited for retrofit applications of existing steam power plants. With a preferred exemplary embodiment, large steam plants could actually bypass their existing boilers and utilize steam directly from the HRSGs. This increases cycle efficiency and (in many cases) would reduce plant emissions drastically. This could be accomplished using the existing ST, condenser, and other infrastructure already in the existing plant. This would provide the owners with a highly efficient combined cycle plant with reduced capital investment and minimal real estate requirements.

Exemplary Preferred Embodiments—Typical Configuration

Overview

The configuration of several of the preferred embodiments is similar to the prior art, in that GTs and HRSGs are utilized to produce power and convert exhaust gas heat into steam. However, several of the preferred embodiments will utilize a continuously fired HRSG that produces significantly more steam, and do so at a single pressure level (or primarily a single pressure level). This higher quantity (and typically higher pressure) steam drives a ST that is much larger in comparison to the ST in the prior art that was associated with the same GTs.

Due to the large feedwater flows, feedwater will be heated in the HRSGs as well as in a separate feedwater heating loop which utilizes conventional ST extraction steam fed feedwater heaters. Fuel gas heaters will also be employed to improve cycle efficiency.

Embodiment of FIG. 9

Design

Refer to FIG. 9 for a schematic representation of one exemplary preferred power plant embodiment utilizing the teachings of the present invention. The GTs (920) each exhaust into their respective HRSGs and drive their respective generator (921). These exhaust gases produce steam in the HRSG that subsequently produces power in the ST and which is ultimately condensed in the condenser (939).

Feedwater Heating—HRSG Feedwater Heating Loop

Condensate from the condenser (939) goes to the LP-BFP (930) where it is pumped to an intermediate discharge pressure. From here, the LP feedwater control valve (960) maintains an optimum flow through the LP economizer (901) while diverting the excess feedwater flow to the conventional feedwater heater(s) (933). Flow exiting the LP economizer continues to the HP-BFP (931) and is pressurized to a pressure that is equal to inlet steam pressure plus an allowance for pressure drops in the system. From here it flows through the HP economizer (902) and (903). Some feedwater flow, however, after exiting the LP economizer, is diverted through the feedwater balancing valve (967) so as to maintain an optimum flow through the HP economizer sections (902) and (903). The diverted feedwater that passes through the feedwater balancing valve (967) combines with the feedwater exiting feedwater heater (933). This combined flow now continues to the second HP-BFP (932) where it is pressurized to a pressure similar to that of HP-BFP (931). The diverted feedwater flow exiting HP-BFP (932) goes to feedwater heater(s) (934). The feedwater exits feedwater heater(s) (934) and combines with the feedwater flow exiting the HP economizer. This flow is now available at desuperheating lines (950) and (951), while the bulk of the flow continues to the evaporator section (904).

Evaporator

In the evaporator section, the feedwater is boiled into steam and travels to the superheater section (905). If the superheated steam is too hot, condensate is sprayed through line (950) into the superheater supply line to control the HP turbine section (935) inlet temperature to the desired temperature. Steam expands in the HP turbine section down to the exhaust point, and becomes known as cold reheat steam. The cold reheat steam continues to the reheater section (906) in the HRSG.

Reheater

On its way to the reheater section, some steam passes through non-return valve (964) to line (954). This steam travels to the feedwater heater (934), which preheats the feedwater flowing through same. The condensed steam from this feedwater heater cascades down to the inlet of the HP-BFP (932).

The cold reheat steam from the HP turbine section exhaust now travels through the reheater section of the HRSG (906) for return to the IP section of the ST. If its temperature is too high, condensate is sprayed through line (951) into the reheater supply line to control the IP turbine section (936) inlet temperature to the desired temperature. Steam expands in the IP turbine section down to its exhaust point, and becomes known at this point as crossover steam.

Crossover Steam

The crossover steam continues to the LP sections (937) of the ST. On its way to the LP section, some crossover steam is diverted through non-return valve (965) to line (955). This steam travels to feedwater heater (933), which preheats the feedwater flowing through same. The condensed steam from this feedwater heater flows to the outlet of the condenser.

Steam expands in the LP turbine sections and exhaust into the condenser (939). Shaft horsepower produced in the ST drives the generator (938), which produces electrical power.

Note that in this example cold reheat and crossover steam is used to provide extraction steam to the feedwater heaters. Although these are traditional points for the supply of this steam, this does not preclude the utilization of extraction steam from any practival point on the ST to provide this function.

Low Load Operation

For operation at low loads, there is insufficient HP steam flow to maintain optimum levels of feedwater through the HRSG. In this mode of operation, valves (960) and (967) are closed. With no feedwater flow to remove heat, all extraction lines (954, 955) pass no flow. All feedwater flow, therefore, passes through the HRSG as the parallel feedwater loop is closed off.

As load is decreased from this point by a reduction in steam flow (reduction in supplemental firing), the feedwater flow through the HRSG is no longer sufficient to absorb the exhaust gas heat and yet still maintain optimum exhaust gas temperature. Therefore, operation below this point will result in increased exhaust gas temperatures and lower combined cycle efficiency. At this point, the design engineer will need to evaluate performance parameters and determine if it is more economical at this point of operation to reduce load of the GTs, or continue modulating supplemental firing rates and allowing the HRSG exhaust gas temperature to increase. At some point of reduced load, however, it will become economically favorable to reduced load on the GTs.

Figure 15:
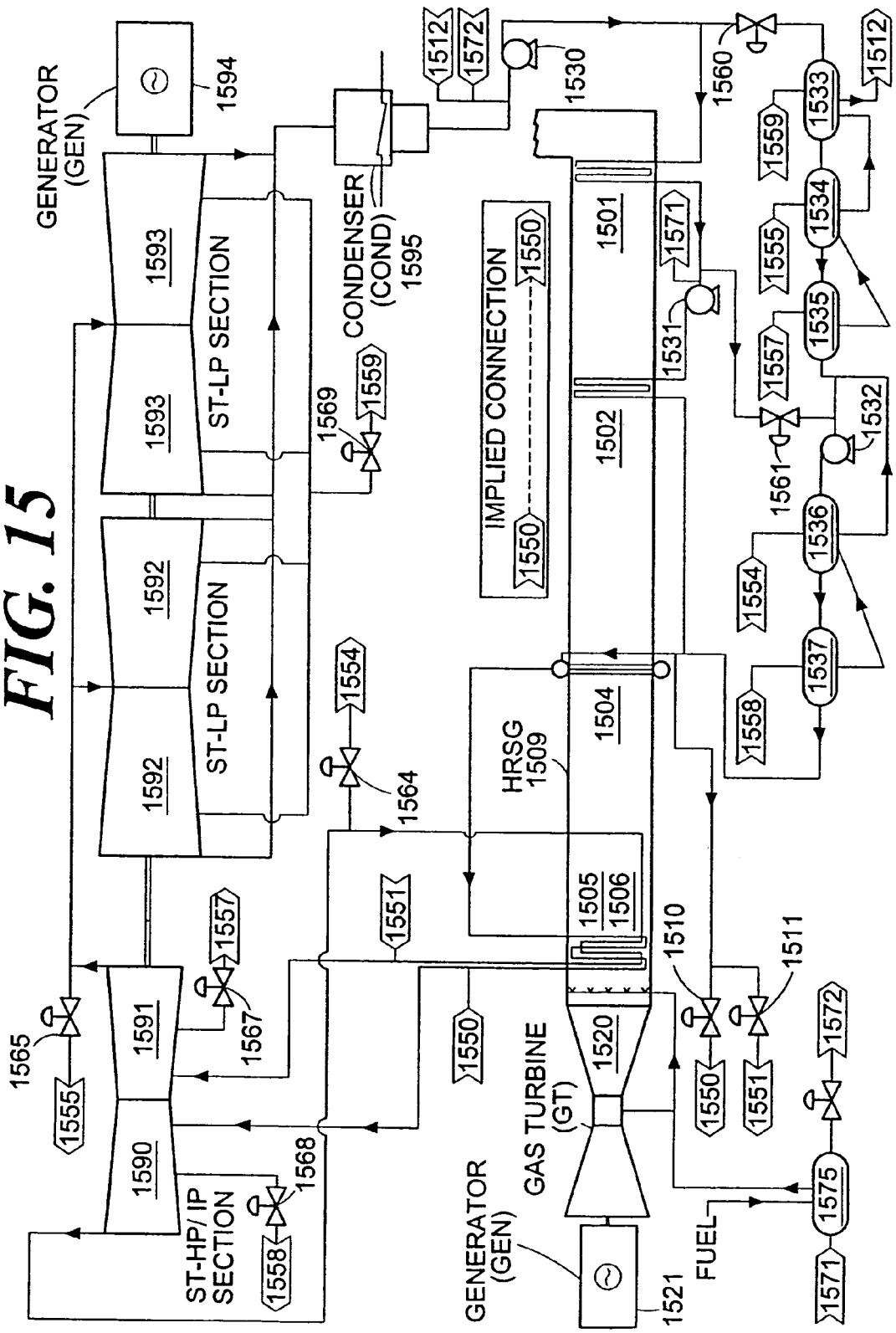
FIG. 15 illustrates an exemplary embodiment of a combined cycle power plant application utilizing the teachings of the present invention.

Embodiment of FIG. 15

Design

Refer to FIG. 15 for a schematic representation of another exemplary preferred power plant embodiment utilizing the teachings of the present invention. The GTs (1520) each exhaust into their respective HRSGs (1509) and drive their respective generator (1521). These exhaust gases produce steam in the HRSG that subsequently produces power in the ST and which is ultimately condensed in the condenser (1595).

Feedwater Heating—HRSG Feedwater Heating Loop

Condensate from the condenser (1595) goes to the LP-BFP (1530) where it is pumped to its discharge pressure. From there, the LP feedwater control valve (1560) maintains an optimum flow through the LP economizer (1501) while diverting the excess feedwater flow to the first of a series of conventional feedwater heaters (1533). Flow exiting the LP economizer continues to the HP-BFP (1531) and is pressurized. From here it flow through the HP economizer (1502). However, after exiting the LP economizer some feedwater flow is diverted through the feedwater balancing valve (1561) so as to maintain an optimum flow through the HP economizer section (1502). In addition, some flow is diverted to the fuel gas heater (1575) through line (1571). After pre-heating the fuel gas, this flow is returned to the inlet of the LP-BFP (1530) via line (1572). The remaining feedwater continues to the HP economizer, and flow exiting the HP economizer combines with the feedwater flow exiting the final feedwater heater (1537). This flow is now available at desuperheating valves (1510) and (1511), while the bulk of the flow continues to the evaporator section (1504).

Feedwater Heating—Conventional Feedwater Heating Loop

In the parallel feedwater heating loop, feedwater proceeds through the first feedwater heater (1533) where it is heated. This flow then travels through the second and third feedwater heaters (1534) and (1535) respectively. At the exit of feedwater heater (1535), flow diverted from the HRSG parallel loop through the feedwater balancing valve (1561) combines with this feedwater and continues to a HP-BFP (1532) where it is pressurized. From here it travels through the fourth and fifth feedwater heaters (1536) and (1537) respectively. The feedwater from this heating loop now combines with the feedwater from the HRSG parallel loop and is fed to the evaporator section (1504) of the HRSG (minus flow required by the desuperheating valves (1510) and (1511)).

Evaporator

In the evaporator section, the feedwater is boiled into steam and travels to the superheater section (1505). If the superheated steam is too hot, desuperheating valve (1510) modulates to spray condensate from the desuperheating line (1550) into the superheater supply line and control the HP turbine section (1590) inlet temperature. Steam expands in the HP turbine section until reaching the first extraction where a small portion of the steam is removed from the turbine through non-return valve (1568) to line (1558). This steam is fed to the fifth feedwater heater (1537) which preheats the feedwater flowing through same. The condensed steam from the fifth feedwater heater cascades down to the fourth feedwater heater (1536). The steam in the HP section of the ST (1590) that is not extracted continues to the section exit point, and becomes known as cold reheat steam. The cold reheat steam continues to the reheater section (1506) in the HRSG.

Reheater

On its way to the reheater section, some steam (second extraction) passes through non-return valve (1564) to line (1554). This steam travels to the fourth feedwater heater (1536) which preheats the feedwater flowing through same. The condensed steam from the fourth feedwater heater cascades down to the inlet of the HP-BFP (1532).

The cold reheat steam now travels through the reheater section of the HRSG for return to the IP section of the ST. If its temperature is too high, desuperheating valve (1511) modulates to spray condensate from the desuperheating line (1551) into the reheater supply line and control the IP turbine section (1591) inlet temperature. Steam expands in the IP turbine section until reaching the third extraction where a small portion of the steam is removed from the turbine through non-return valve (1567) to line (1557). This steam is fed to the third feedwater heater (1535) which preheats the feedwater flowing through same. The condensed steam from the third feedwater cascades down to the $2^{nd}$ feedwater heater. The steam in the IP section of the ST (1591) that is not extracted continues to the section exit point, and becomes known as crossover steam.

Crossover Steam

The crossover steam continues to the LP sections (1592) and (1593) of the ST. On its way to the LP section, some steam (fourth extraction) is diverted through non-return valve (1565) to line (1555). This steam travels to the second feedwater heater (1534) which preheats the feedwater flowing through same. The condensed steam from the second feedwater heater cascades down to the first feedwater heater (1533).

Steam expands in the LP turbine sections until reaching the fifth extraction where a small portion of the steam is removed from the turbine through non-return valve (1569) to line (1559). This steam is fed to the first feedwater heater (1533) which preheats the feedwater flowing through same. The condensed steam from the first feedwater heater is returned via line (1512) to the inlet of the LP-BFP (1530).

The steam in the LP sections of the ST (1592, 1593) that is not extracted continues through the section to exit at the condenser (1595). Shaft horsepower produced in the ST drives the generator (1594) which produces electrical power.

Low Load Operation

For operation at low loads, there is insufficient HP steam flow (thus low flows of condensate from condenser) to maintain optimum levels of feedwater through the HRSG. In this mode of operation, valves (1560) and (1561) are closed. With no feedwater flow to remove heat, all extraction lines (1558, 1554, 1557, 1555, 1559) pass no flow. All feedwater flow, therefore, passes through the HRSG as the parallel feedwater loop is closed off.

As load is decreased from this point by a reduction in steam flow (reduction in supplemental firing), the feedwater flow through the HRSG is no longer sufficient to absorb the exhaust gas heat and yet still maintain optimum exhaust gas temperature. Therefore, operation below this point will result in increased exhaust gas temperatures and lower combined cycle efficiency. At this point, the design engineer will need to evaluate performance parameters and determine if it is more economical at this point of operation to reduce load on the GTs, or continue modulating supplemental firing rates and allowing the HRSG exhaust gas temperature to increase. At some point of reduced load, however, it will become economically favorable to reduce load on the GTs.

Exemplary Preferred Embodiment—725 MW Power Plant

Overview

As an example of another preferred exemplary embodiment, a 725 MW nominal capacity combined cycle power plant design will be examined. This exemplary power plant will utilize two (2) GE Model PG7241(FA) GTs. These GTs will each exhaust into its own single pressure HRSG designed for 2400 psia operation. A nominal 400 MW reheat ST will be used exhausting to a once through condenser operating at 1.2 inches HgA (inches of mercury absolute) exhaust pressure. Due to the large feedwater flows, feedwater will be heated in the HRSGs as well as in a separate feedwater heating loop which utilizes conventional ST extraction steam fed feedwater heaters. Fuel gas heaters will also be employed to improve cycle efficiency.

Design

Figure 35:
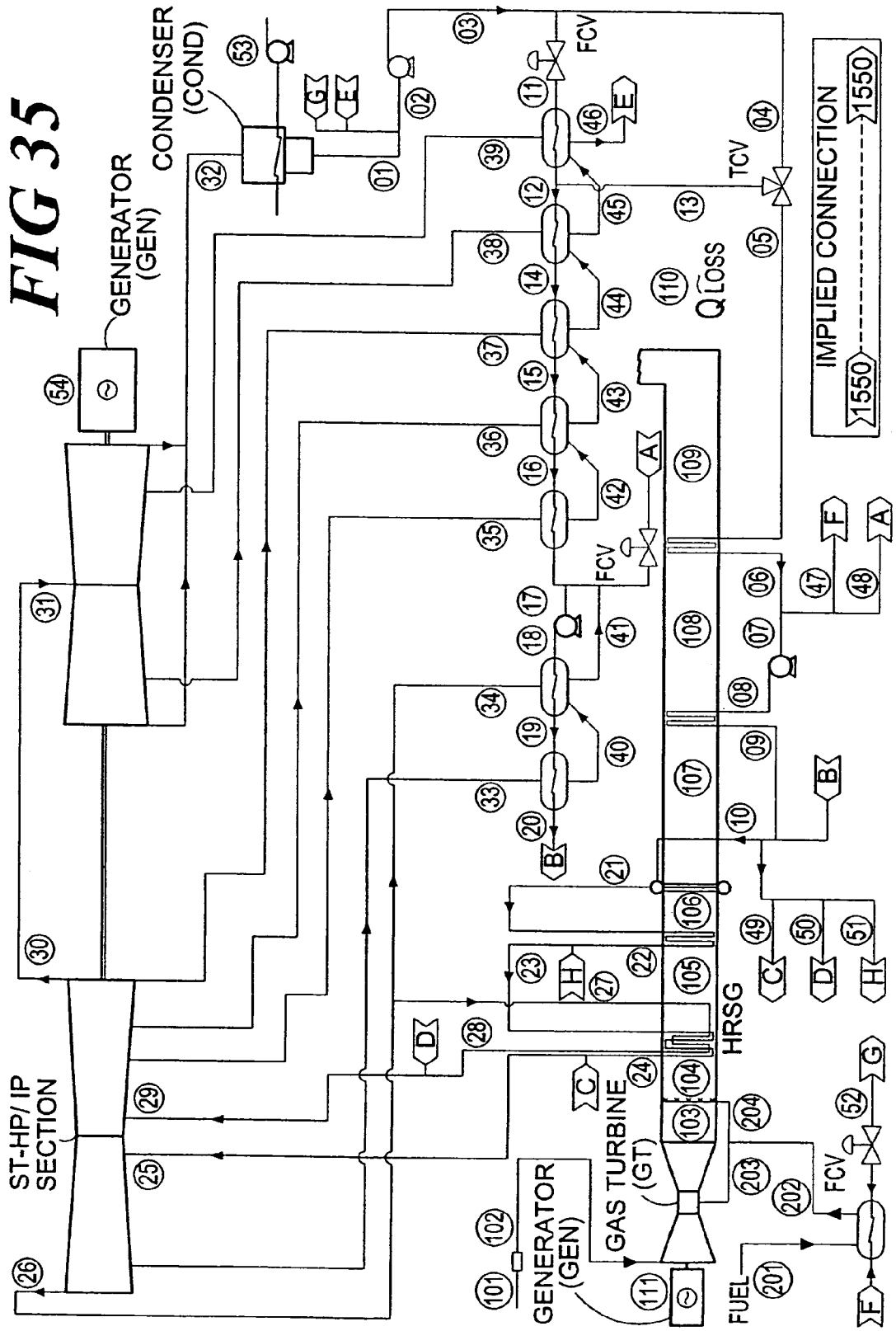
FIG. 35 is a typical heat balance process flow diagram for the subcritical exemplary power plant embodiment of the present invention used in FIGS. 26, 27A, 27B, 28, 33 and 34.

The GE GT design is rated 170,770 kW based upon ISO conditions, with a 3.0 inches of $H_2O$ inlet air pressure drop and 10.0 inches $H_2O$ exhaust gas pressure drop through the HRSG. Total GT output is therefore 341,540 kW. Refer to FIG. 35 for a schematic representation of this exemplary power plant. The numbers indicated at various points along the process correspond to "point" numbers tabulated in FIGS. 36, 37, and 38. The data corresponding to the "point" numbers tabulated in FIG. 36, FIG. 37, and FIG. 38 identifies the pressure, temperature, enthalpy, and flow at the corresponding "point". This overall information contained in FIGS. 35–38 represents what is termed a "heat balance", which is an overall energy and mass balance for the cycle. Note for this example, deaeration is completed in the condenser.

Layout

FIG. 26 illustrates the physical plant layout of this example of several of the preferred embodiments. Note that it is extremely similar to the GE S207FA combined cycle power plant in the prior art, shown in FIG. 22. The most noticeable difference between the two layouts is the configuration of the ST. In the prior art, the ST has a relatively underutilized HP/IP section, and one LP section. In several of the preferred embodiments, the HP/IP section is similar to the prior art, but has considerably increased volumetric flow. To efficiently use the higher steam flows at lower pressure, a second LP section is shown. However, this second section may not be required, depending upon the economic evaluation.

Comparison to Prior Art

Figure 24:
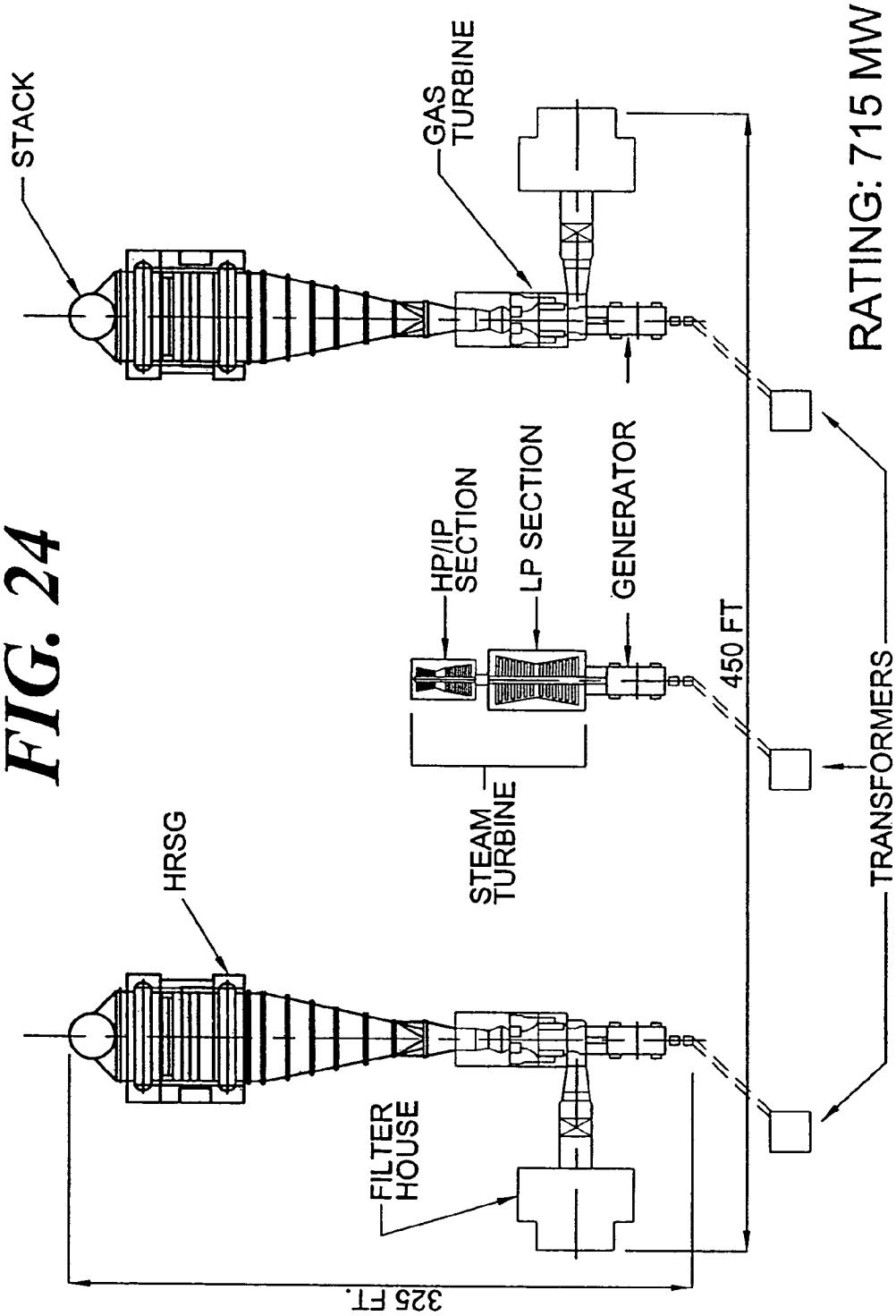
FIG. 24 illustrates a typical Westinghouse 2X1 501G 715 MW combined cycle power plant configuration.
Figure 28:
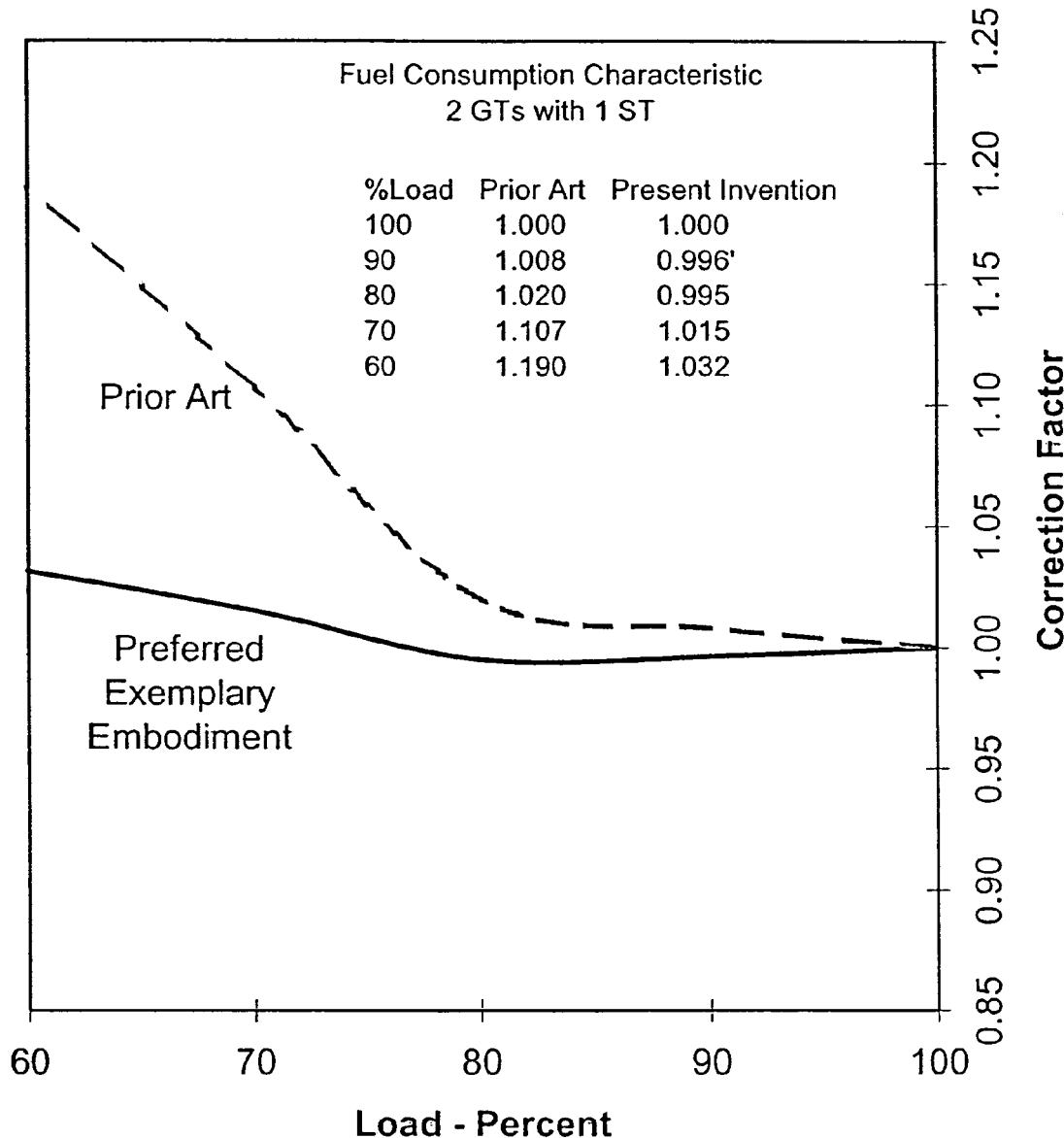
FIG. 28 graphically illustrates the relative part load performance difference between a conventional combined cycle power plant and a preferred embodiment of the present invention.

FIG. 22 and FIG. 24 are layouts of the GE S207FA combined cycle and the Westinghouse 2X1 501G combined cycle power plants respectively. The GE facility requires approximately 2.3 acres of real estate while the Westinghouse facility requires approximately 3.3 acres. The power density is nearly the same for these two options at 220 MW per acre. Several of the preferred embodiments, however, can be designed as shown in FIG. 26 to be 725 MW as in the example, which is 315 MW per acre, or it can be designed for up to 1050 MW (see FIG. 29) which is 455 MW per acre. This allows for the production of significantly more power with only a given amount of real estate. This factor is advantageous for new construction, but will also be especially appreciated for retrofit of existing plants where real estate comes at a premium.

Besides the premium for real estate, the combined cycles in the prior art are also more expensive from a fuel consumption, capital cost, and maintenance perspective. FIG. 23 and FIG. 25 are economic pro forma for the GE S207FA combined cycle and the Westinghouse 2X1 501G combined cycle power plants respectively. These figures tabulate the annual costs for fuel, capital, and maintenance for each power plant. FIG. 27 is the economic pro forma for an exemplary preferred embodiment of the present invention. Note that each individual cost for fuel, capital, and maintenance is less than the each individual cost for combined cycle power plants from the prior art. Therefore, the cost to produce electricity is reduced in all major cost categories by several of the preferred embodiments.

Exemplary Preferred Embodiment—Supercritical Steam Conditions

Overview

As another example of a preferred exemplary embodiment, a 1040 MW nominal capacity combined cycle power plant design utilizing ultrasupercritical steam conditions with elevated steam temperatures will be examined. This exemplary power plant will utilize two (2) GE Model PG7241(FA) GTs. These GTs will each exhaust into its own single pressure HRSGs designed for 3860 psia operation. A nominal 730 MW double reheat ST will be used exhausting to a once through condenser operating at 1.2 inches $H_{gA}$ (inches of mercury absolute) exhaust pressure. Due to the large feedwater flows, feedwater will be heated in the HRSGs as well as in a separate feedwater heating loop which utilizes conventional ST extraction steam fed feedwater heaters. Fuel gas heaters will also be employed to improve cycle efficiency.

Design

Figure 39:
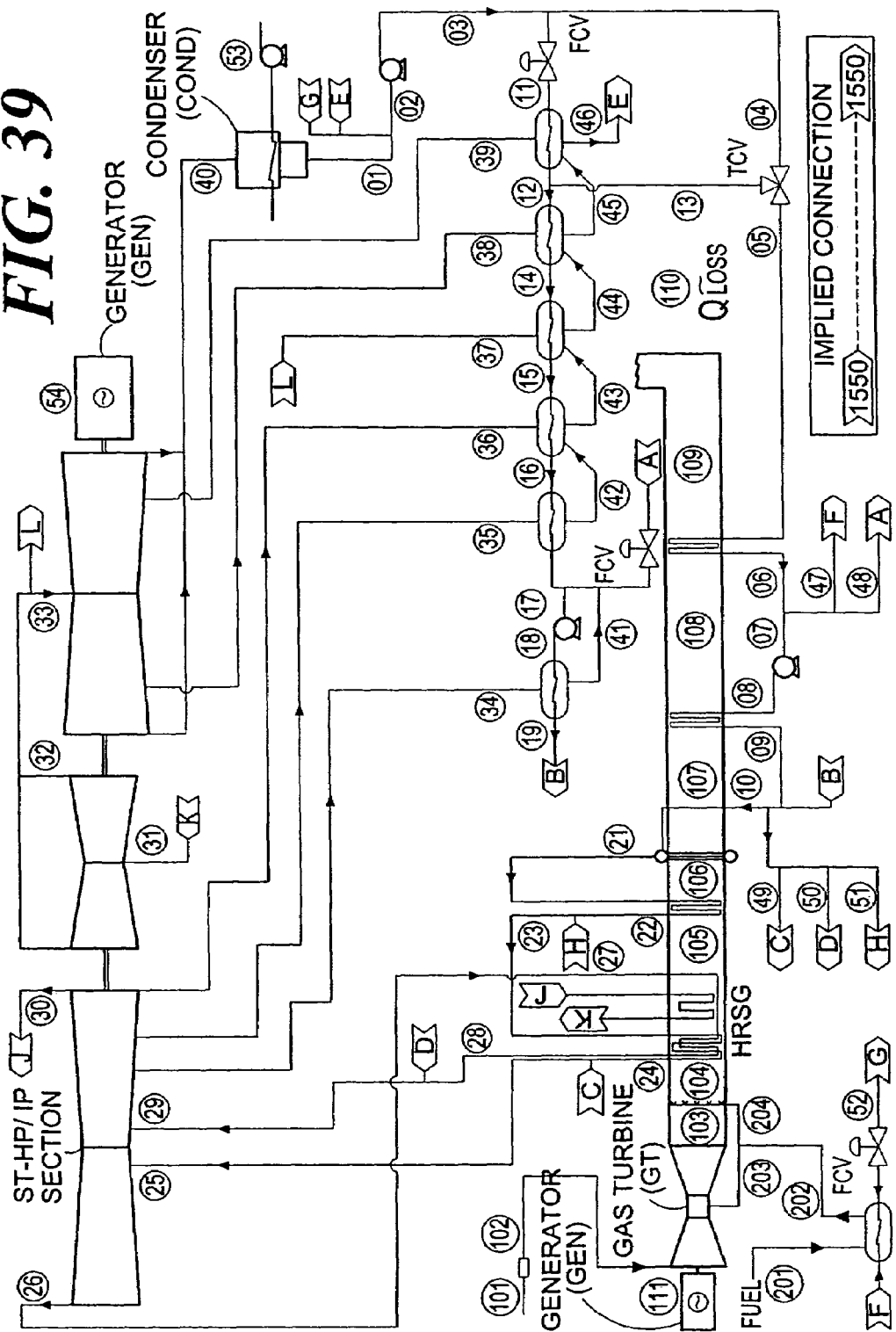
FIG. 39 is a heat balance process flow diagram for the ultrasupercritical exemplary power plant embodiment of the present invention used in FIG. 33.

The GE GT design is rated 168,815 kW based upon ISO conditions, with a 3 inches of H20 inlet air pressure drop and a 10.0 inches H2O exhaust gas pressure drop through the HRSG. Total GT output is therefore 341,540 kW. Refer to FIG. 39 for a schematic representation of this exemplary power plant. The numbers indicated at various points along the process correspond to "point" numbers tabulated in FIGS. 40, 41, and 42. The remaining data corresponding to the "point" numbers tabulated in FIG. 40, FIG. 41, and FIG. 42 identifies the pressure, temperature, enthalpy, and flow at the corresponding "point". This "heat balance" is an overall energy and mass balance for the cycle. Note for this example, deaeration is completed in the condenser.

Comparison to Prior Art

The elevated steam temperatures (1112° F.) and pressures (3860 psig) are indicative of those used in advanced steam cycles, sometimes referred to as ultrasupercritical. Refer to the informative document entitled "Steam Turbines for Ultrasupercritical Power Plants" by Klaus M. Retzlaff and W. Anthony Ruegger (General Electric Reference GER-3945, 1996) for information on ultrasupercritical steam turbines and their cycles. Note that at an exhaust temperature of 1123° F., the industry standard General Electric (GE) Model PG7241(FA) Gas Turbine does not have sufficient high temperature exhaust energy to produce these steam temperatures at the required flows. Therefore, such conditions were not even available in the prior art.

The supercritical steam power plant of the preferred embodiment of the present invention is similar to the subcritical steam power plant of the preferred embodiment, with the primary difference being improved efficiency. Greater steam pressures, higher steam temperatures, and the use of the second reheat provides the added efficiency for this application. Note that with these steam conditions, and even with the large extension in capacity (100%) the combined cycle efficiency for the preferred embodiment of the present invention approaches that of the prior art with the same technology GTs (6229 BTU/kWh versus 6040 BTU/kWh).

However, efficiency is only one part of the economic equation. The other major costs, capital expenditure and maintenance, will be greater with the supercritical preferred embodiment versus subcritical. Therefore, as previously discussed, a total economic analysis must be completed to determine the optimum arrangement for an individual preferred embodiment combined cycle power plant. In general, when fuel costs are high, supercritical applications will become the economic optimum, and when fuel costs are low, subcritical applications will be preferred.

Power Plant Load Profile

Dispatched Power Plants

As previously discussed, to maintain a constant frequency of power (60 Hz in the US), the power produced by all power plants connected to the grid must equal the power being consumed by the users on the grid. Therefore, power plants have their output "dispatched", or controlled by the Power Pool to meet the system demand.

As a result of being dispatched, most power plants will spend very little of their operational time at rated output. Instead of operating at full rated capacity, most power plants will operate at some intermediate load and share the system load with all other power plants connected to the grid. This statistic may be visually confirmed by inspecting the load duration curve of FIG. 31B, which represents a typical long-term distribution of utilized plant load versus percentage of time. Note that using this long-term data, most power plants will operate at peak load less than 10% of the time, and will be at intermediate load levels for 70% of the time.

FIG. 31A provides typical hourly load data for the South Atlantic Region of the U.S. over a 24-hour period. As can be seen from this data, the peak load of 62,000 megawatts (MW) for the day is substantially higher than the low of 40,000 megawatts. In addition, the total system capacity is likely higher than 62,000 MW, perhaps 70,000 MW (70 gigawatts, GW). This means that except for seasonal peaks (i.e. hot summer days), even during non-seasonal peak hours, many power plants are not operated at rated capacity. Therefore, dispatched power plants can expect to see large load variations and potentially spend only a matter of hours annually at rated capacity.

To determine a typical conservative load profile, the data from FIG. 31A was blocked into segments. The periods when the load was above 60 GW was determined to be peak operation. The periods of operation between 50 and 60 GW was considered to be intermediate power operation, and periods below 50 GW were considered to be night operation. This profile was considered to be an average weekday. For weekends, 8 hours per day was considered intermediate, while the remainder was taken to be night operation (using weekday averages for intermediate and night power on weekends). FIG. 32 provides the details of these calculations. Utilizing the data calculated in FIG. 32, a typical load profile to be used for comparison purposes is as follows:

| Period | Average Plant Capacity (%) | Hours Per Week |
|---|---|---|
| Night | 60 | 77 |
| Intermediate | 80 | 71 |
| Peak | 100 | 20 |

Note that although the capacity per FIG. 32 for peak is only 87.86%, this number has been adjusted to 100.00% for discussion purposes. The night and intermediate capacity numbers have been adjusted by less than 1% from the values in FIG. 32, and are adjusted downward to compensate for the upward adjustment to peak operation.

Exemplary Power Plant Load Profile

Utilizing the data from the above table, the calculated load profile can be used for the purpose of determining an annual capacity factor and quantity of fuel consumed for a given combined cycle power plant, based upon part load operation data in FIG. 33. It is significant to note from the table above and FIG. 31B that the plant efficiency using the prior art technology will rarely (if ever) reach optimum economic performance. In contrast, the present invention embodiments as illustrated in FIG. 33 will always be more optimal than the prior art configurations.

Economics of the Present Invention

Economic Considerations

The costs for operating a combined cycle power plant are varied. However, the three largest costs for the power plant operators typically are fuel, capital cost (debt), and maintenance. These three costs constitute the major portion of the cost (expressed in $/kWh) to produce electricity at large combined cycle power plants. Some of the minor costs include payroll for the operations staff, taxes, insurance, license fees, and other miscellaneous expenses. For an economic comparison of several of the preferred embodiments of the present invention to the prior art, focus will be on the three major expenses: fuel, debt, and maintenance.

Fuel Costs

The largest cost that typically is incurred by a large, modern, combined cycle facility is the cost of fuel. Whether the fuel is natural gas, fuel oil, or some other combustible fuel, the combined cycle facility must consume large quantities of fuel to produce large quantities of electricity. In essence, a power plant actually converts energy in one form (raw fuel), into energy of another form (electricity). Therefore, since the function of a power plant is to perform this conversion process, the efficiency of this conversion process is the key to the power plant's economic success.

Prior art combined cycle power plants have efficiencies in the general range of 48% (LHV) for an older design such as a GE S106B combined cycle up to 60% (LHV) for the proposed GE S107H advanced cycle which has not yet seen commercial service. These efficiencies are based upon the lower heating value (LHV) of the fuel. However, these efficiencies are for full load operation, and as noted in FIG. 31A and FIG. 31B, most power plants actually spend little time at full load. For part load operation, FIG. 8 provides an indication of the efficiency loss that can be expected at reduced loads for combined cycle power plants in the prior art. Utilizing this data, FIG. 33 illustrates the dramatic improvement in part load efficiency that is realized by several of the preferred embodiments of the present invention as compared to the combined cycle in the prior art (here a lower heat rate indicates more optimal performance). This part load efficiency improvement, along with improved efficiency at full load, enables several of the preferred embodiments of the present invention to be more economical than the prior art in terms of fuel consumption.

Based upon the load profile in FIG. 32, and utilizing the heat rate (efficiency) data from FIG. 33, FIG. 34 tabulates the annual fuel costs for this exemplary combined cycle power plant of the preferred embodiment versus current state-of-the-art combined cycle power plants in the prior art. In either case, many of the exemplary combined cycle power plants of the preferred embodiment use less fuel on an annual basis than either of the prior art combined cycles.

Capital Costs

Next to fuel costs, the most significant cost for a new combined cycle power facility is capital cost. This is the amount of money required to service the debt (loan payments). Although plant efficiency is important, the overall cost of the power plant is also an important economic consideration. As discussed prior, just as the economics of small portions of the combined cycle plant must be evaluated (i.e. larger ST exhaust sections), the economics of the overall combined cycle power plant must also be evaluated. Minor decreases in plant heat rate (minor increase in efficiency) must not be more than offset by increases in capital cost. Therefore, the power plant developers and engineers strive to construct the best economic alternative that is available.

Due to its higher power density, utilization of less equipment, and reduced construction costs, several of the preferred embodiments of the present invention have significantly lower capital costs (up to a 30% reduction) than combined cycles in the prior art. Again, FIG. 34 tabulates the capital costs for this exemplary combined cycle power plant of the preferred embodiment versus current state-of-the-art combined cycle power plants in the prior art. In either case, many exemplary combined cycle power plants of the preferred embodiment require significantly less capital than either of the prior art combined cycles.

Maintenance Costs

Another large expense for power plant owners is average annual maintenance costs, especially maintenance costs for the large pieces of equipment. For a large 725 MW plant in the prior art, as shown in the example, these costs can exceed $10 million annually. Therefore, power plants with reduced maintenance costs are economically advantageous.

By utilizing a high power density design which reduces the amount of major equipment, and by utilizing low maintenance STs as the major power producing machines instead of high maintenance GTs, several of the preferred embodiments of E the present invention have appreciably lower maintenance costs than combined cycles in the prior art. In FIG. 34 maintenance costs for this exemplary combined cycle power plant of the preferred embodiment versus current state-of-the-art combined cycle power plants in the prior art are tabulated. In either case, the exemplary combined cycle power plant of the preferred embodiment is less maintenance intensive than either of the prior art combined cycles.

Overall Cost Comparison

FIG. 34 provides an economic comparison of the exemplary combined cycle power plant of a preferred embodiment of the present invention in contrast to state-of-the-art combined cycle power plants in the prior art. As can be seen from the data, this exemplary combined cycle power plant of the preferred embodiment is less expensive to operate than combined cycles in the prior art in all three of the major cost categories: fuel, capital expenditures, and maintenance.

In addition, compared to the Westinghouse 2X1 501G combined cycle power plant, NOX emissions are reduced by a factor of more than three, or by approximately 180 tons/yr. For a 20-year plant operational life, the exemplary combined cycle power plant of the illustrated preferred embodiment saves US$469 million as compared to the Westinghouse model 501 G combined cycle from the prior art. These savings are more than the initial plant construction costs of US$340 million for the Westinghouse 2X1 501G combined cycle power plant, and represent a significant economic advantage for power producers in a deregulated, competitive environment.

Operation of the Present Invention

Exemplary HRSG Control Method

Figure 16:
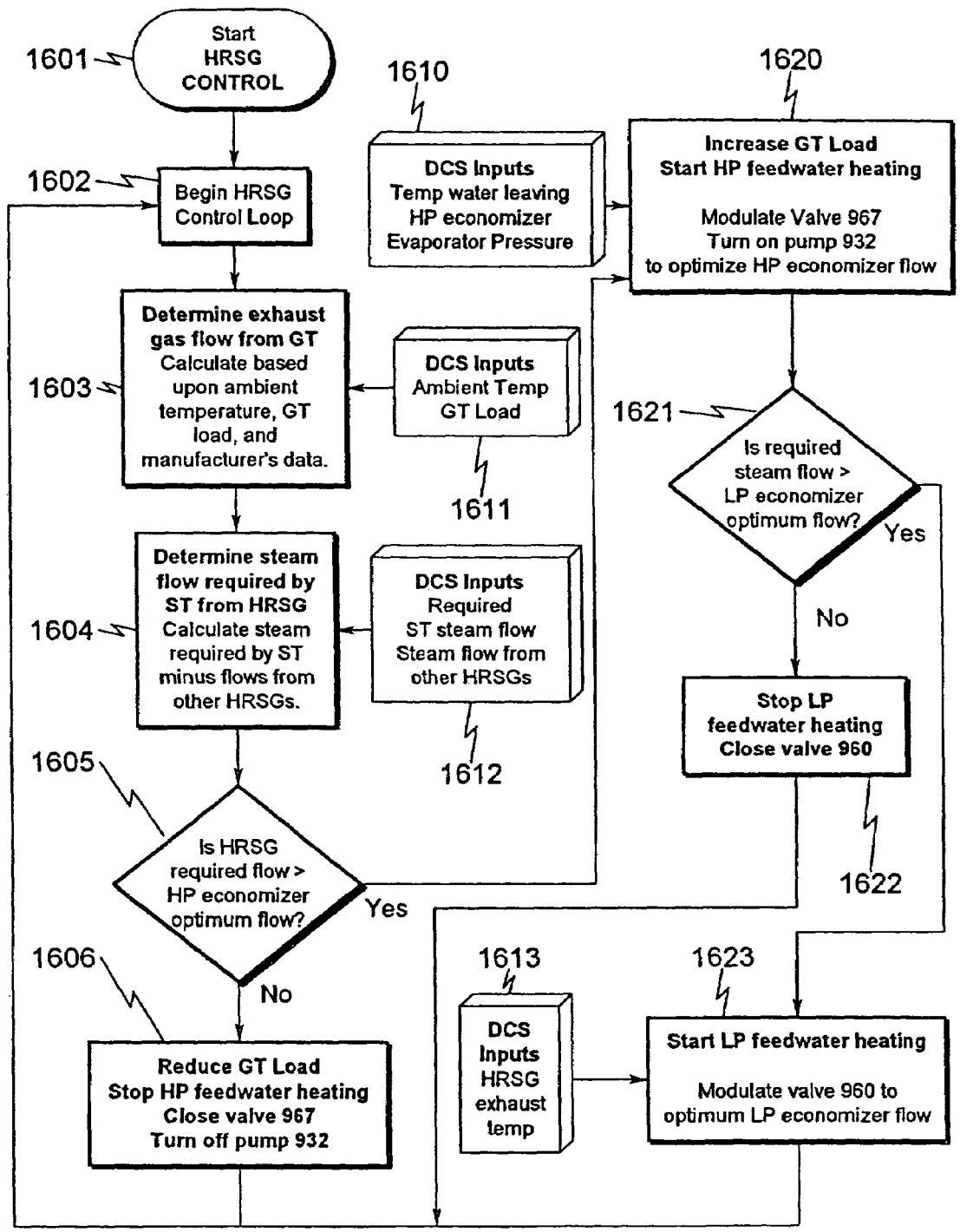
FIG. 16 illustrates an exemplary system control flowchart that may be used to control one or more heat recovery steam generators (HRSGs) as per the teachings of the present invention.

Due to the unique arrangement of equipment, the use of a predominantly single pressure level HRSG, and the need to optimize heat recovery, an exemplary control system to meet these objectives is illustrated in FIG. 16. The control system is exemplary of a combined cycle described in the preferred embodiments illustrated in FIG. 9 and FIG. 15, although it may have a wide application to other embodiments of the present invention. There is one HRSG for each GT in this example. Note that this is an example of an HRSG control system for this particular application, and is a demonstration of the principles in flow management, optimum heat transfer, and integration of HRSG and feedwater heating loops. For other applications, this arrangement could be modified for the particular circumstances. However, many of the principles outlined in this control schematic would be employed.

In FIG. 16, the control begins at (1601) and continues to process block (1602) where the loop control begins. Control then flows to process block (1603). At this point the controller examines inputs from process block (1611) which include ambient temperature and GT load (in particular, the GT exhausting into the HRSG in this control loop). Based upon a characteristic curve programmed into the software, the controller determines the GT exhaust flow.

Utilizing the DCS inputs for ST required steam flow and steam flow already being produced by the other HRSGs, at process block (1604) the controller calculates its required steam flow as the ST required flow minus flow from other HRSGs. Control proceeds to decision block (1605) and compares the HRSG required steam flow to the optimum flow for the HP economizer.

If the power plant is operating at reduced load, control flows to process block (1606). At this point of operation, there is less than the optimum HP economizer flow required from the HRSG. Therefore, more heat will be available in the GT exhaust gases than can be recovered in the HRSG. As a first phase of load reduction, the controls will begin to modulate valves (960) and (967) in a closing direction to reduce flow through the parallel feedwater heating loop. Once the parallel feedwater heating loop has been completely isolated, the second phase of control lowers the power output of the GT. Control now returns to the initial process block (1602).

From decision block (1605), if the HRSG required flow is greater than the HP economizer optimum flow, then control proceeds to process block (1620). If the GT is operating at less than full load, the first phase of control is to increase GT load. Once the GT is operating at full load, valve (967) is modulated to begin feedwater heating in the parallel loop. Utilizing inputs from the DCS at process block (1610) for the evaporator section pressure and the temperature exiting the HP economizer, valve (967) is modulated to obtain the optimum water temperature at the exit of the HP economizer. Pump (932) begins operation once flow begins to pass through valve (967).

Control now proceeds to decision block (1621). If the HRSG required steam flow is less than the LP economizer optimum flow, then control proceeds to process block (1622). At this power plant load, there is still no need for LP feedwater heating as there is more than sufficient heat available in the exhaust gases to heat the feedwater in the LP economizer. Therefore, valve (960) is closed. Control returns to the initial process block (1602).

From decision block (1621), if the HRSG required steam flow is greater than the LP economizer optimum flow, then control proceeds to process block (1623). At this power plant load, conventional LP feedwater heating is required as there is insufficient heat available in the exhaust gases to heat the feedwater in the LP economizer. Therefore, valve (960) is modulated to control flow through the LP economizer to its optimum. Control returns to the initial process block (1602).

Exemplary Overall Power Plant Control Method

In providing a control logic for the overall plant, some of the major objectives include improved efficiency and continuous low emission levels. These objectives are best attained by operating the GTs at or near full load. The control logic for the overall combined cycle control in this example will focus on these objectives. Obviously, one skilled in the art will recognize that to achieve other objectives, this control scheme may be easily modified to support other priorities.

Main Control Loop

Figure 17:
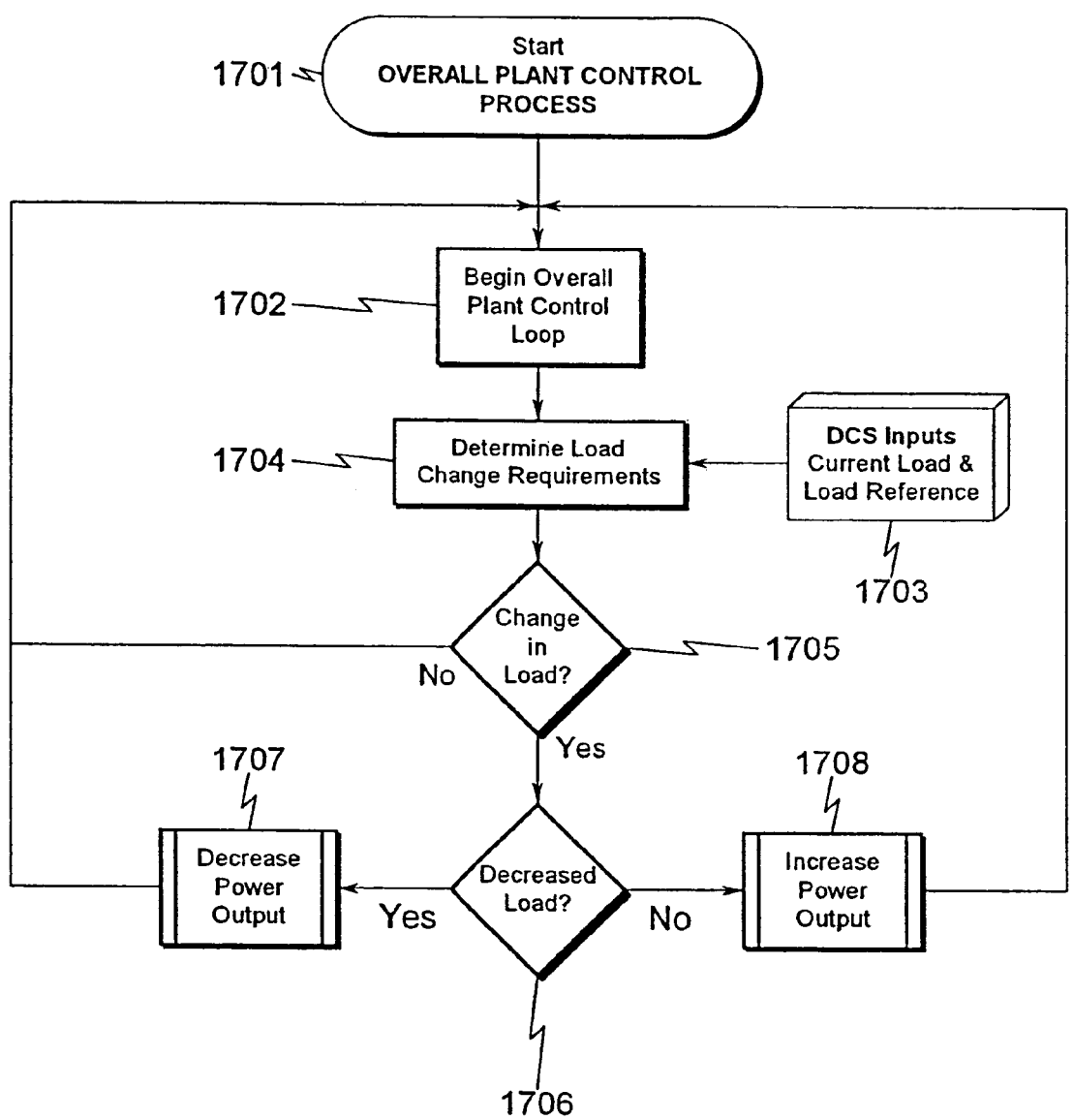
FIG. 17 illustrates an overall exemplary system control flowchart that may be used to provide overall power plant system control as per the teachings of the present invention.

Referencing FIG. 17, the control starts at (1701) and continues to process block (1702) where the loop control begins. Control then flows to process block (1704). At this point the controller examines inputs from process block (1703) which include the current overall plant load and the load reference (desired plant load). Based on these inputs, the controller determines the load change requirements. At decision block (1705) the controller examines the need for a change in load. If there is no need to change load, the control is returned to the initial process block (1702).

Figure 18:
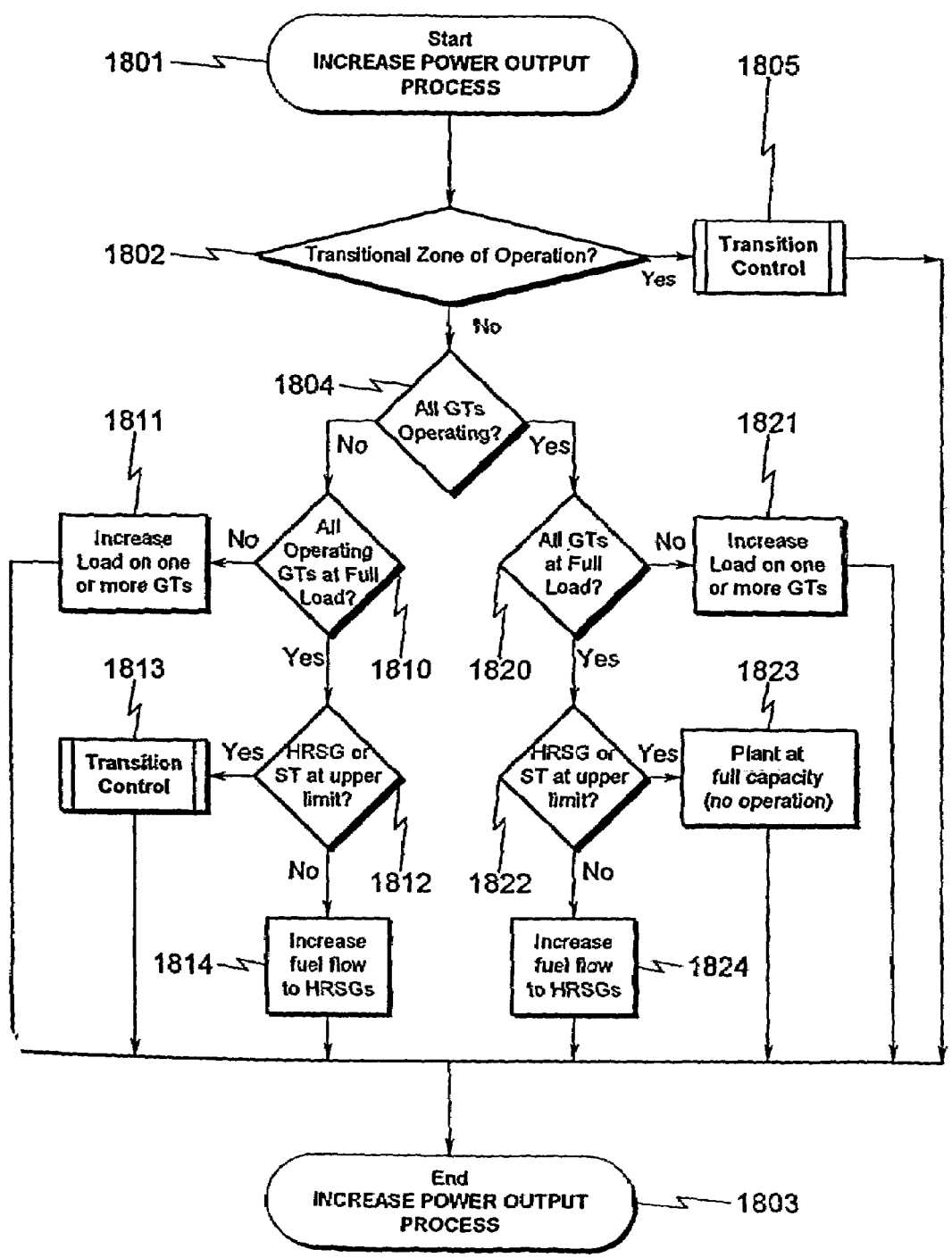
FIG. 18 illustrates an exemplary system control flowchart which may be used to control and direct increased power plant output as per the teachings of the present invention.
Figure 19:
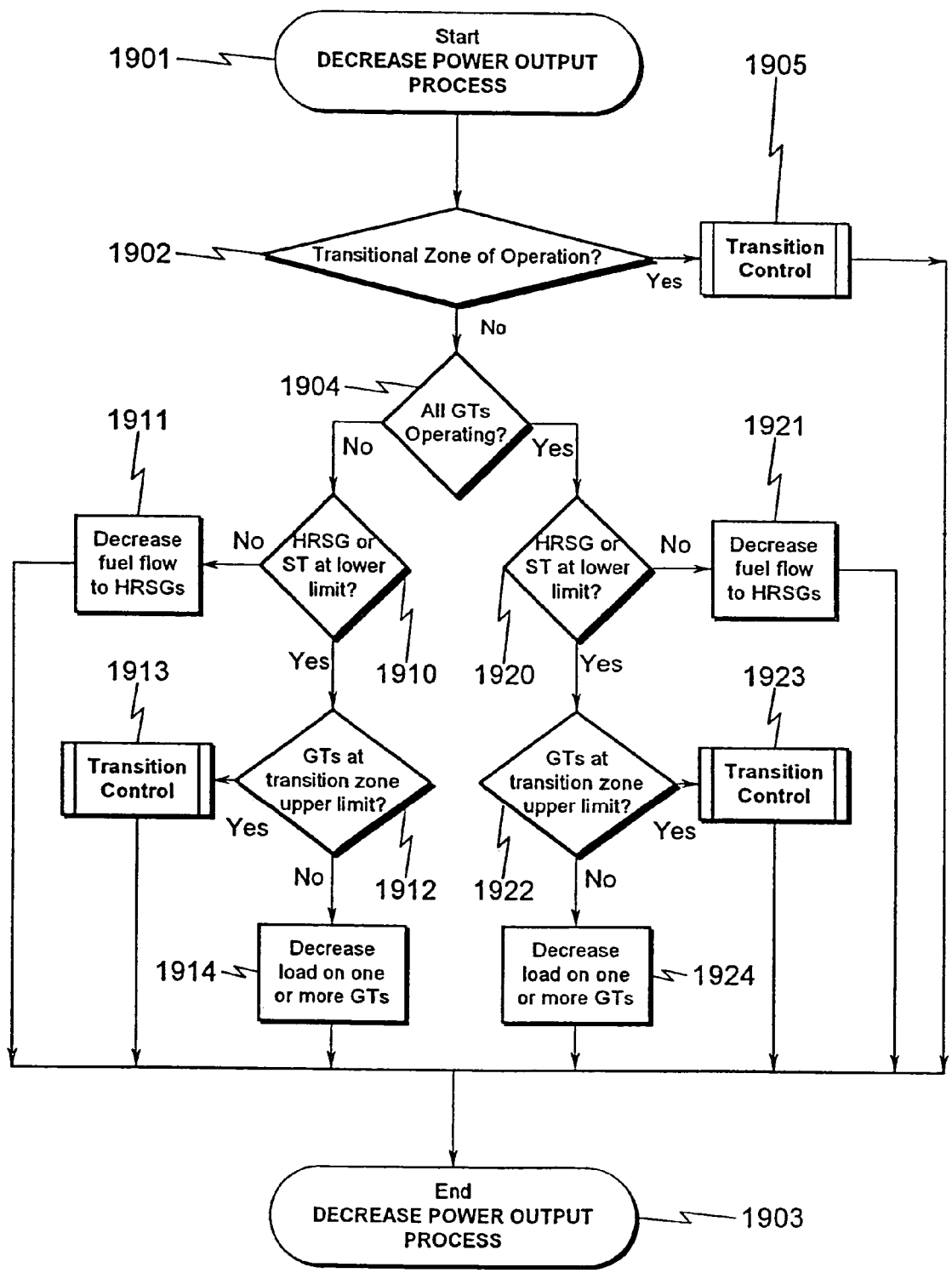
FIG. 19 illustrates an exemplary system control flowchart which may be used to control and direct decreased power plant output as per the teachings of the present invention.

If a load change is required, control flows to decision block (1706) where it must be determined whether the overall plant load needs to be increased or decreased. If it needs to be increased, process control proceeds to the Increase Power Output subroutine (1708). An exemplary embodiment of this subroutine is illustrated in the flowchart of FIG. 18. If it needs to be decreased, process control proceeds to the Decrease Power Output subroutine (1707). An exemplary embodiment of this subroutine is illustrated in the flowchart of FIG. 19.

Increase Power Output

Referencing FIG. 18, the Increase Power Output subroutine begins at step (1801) and proceeds to decision block (1802). If the plant is not operating in a transition zone of operation (zone where one GT is in the process of either being brought into or out of service), then process control flows to decision block (1804). Note that in FIG. 43, the transition zone of operation is between 70% and 80% of plant load. This zone range may be varied by one skilled in the art to achieve a variety of plant performance objectives.

Figure 20:
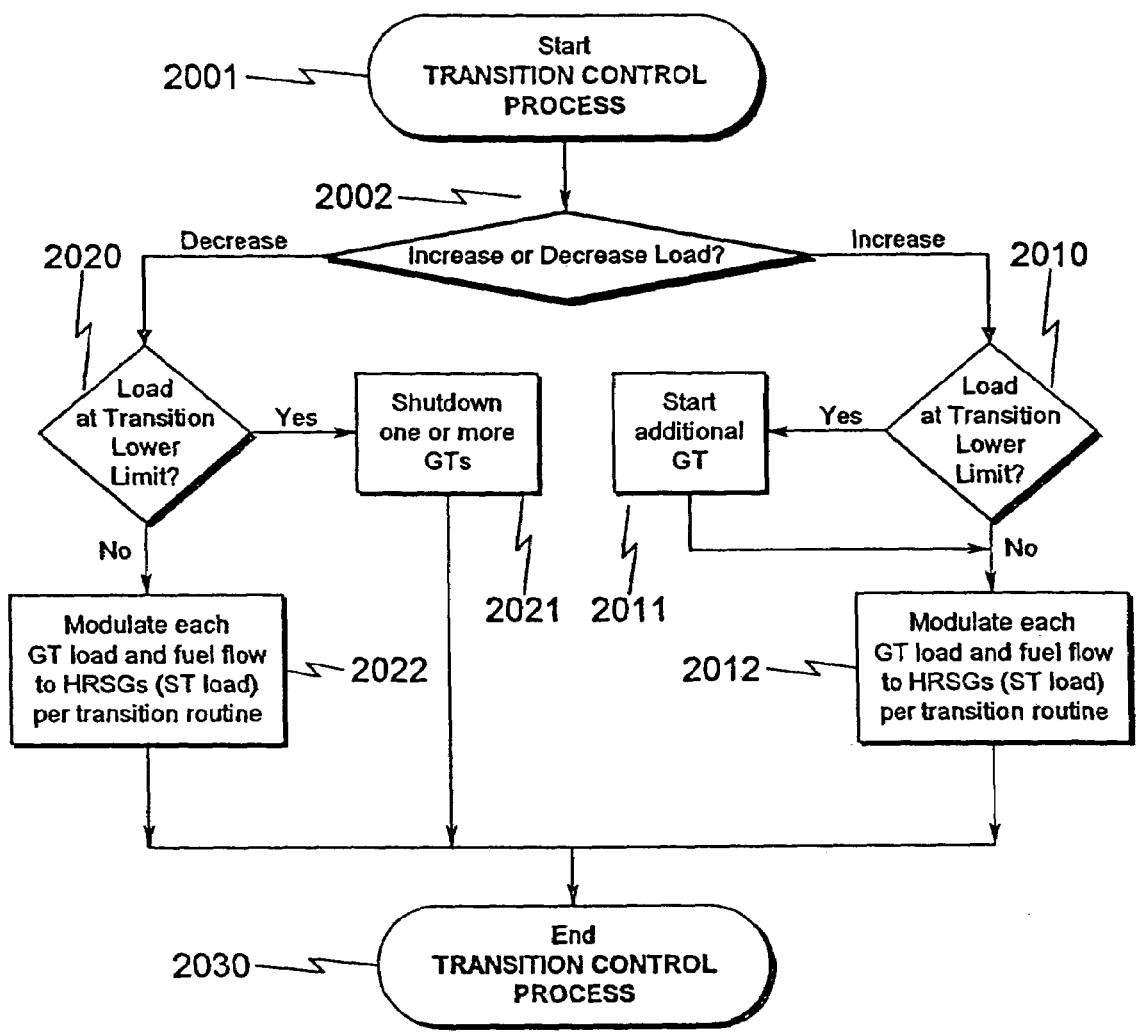
FIG. 20 illustrates an exemplary system control flowchart which may be used to control and direct transitional power control as per the teachings of the present invention.

If the plant is operating in a transition zone of operation, then process flows to the Transition Control subroutine, (1805). An exemplary embodiment of this subroutine is illustrated in the flowchart of FIG. 20. Control then returns to the end subroutine process block (1803). All process returns to this block (1803) are returned to subroutine block (FIG. 17, 1708), and finally to the initial process block for overall plant control (FIG. 17, 1702).

At decision block (1804), if all of the plant's GTs are operating, then process flow proceeds to decision block (1820). At this juncture, the controller determines if all of the GTs are operating at fall load. Since the best method to achieve the objectives is to operate the GTs at full load, if all GTs are not at full load, control flows to process block (1821) where load is increased on one or more GTs. Control now returns to the end subroutine process block (1803).

From decision block (1820), if all GTs are at fall load, then control flows to decision block (1822). This block determines whether or not either the ST or HRSG is operating at an upper limit. For the HRSG, this is typically the supplemental firing temperature. For the ST, this would typically be the inlet pressure. This could also be an operational limit based upon efficiency or another parameter. If any of these limits is reached, control flows to process block (1823) which will energize a status light in the control room indicating to the operators that the plant is at full capacity. Control now returns to the end subroutine process block (1803).

From decision block (1822), if the ST or HRSG is not at an upper limit, then control flows to process block (1824), where the fuel flow to the HRSGs is increased. Control now returns to the end subroutine process block (1803).

From decision block (1802), if all of the plant's GTs are not operating, then process flow proceeds to decision block (1810). At this juncture, the controller determines if all of the GTs that are currently operating are at full load. Again, since the best method to achieve the objectives is to operate the GTs at full load, if all GTs are not at full load, control flows to process block (1811) where load is increased on one or more GTs. Control now returns to the end subroutine process block (1803).

From decision block (1810), if all operating GTs are at full load, then control flows to decision block (1812). This block determines whether or not either the ST or HRSG is operating at an upper limit. In addition to a temperature or pressure limit, this could also be an operational limit based upon power plant efficiency or other system requirements. If any of these limits are reached, control flows to the Transition Control subroutine, process block (1813). An exemplary embodiment of this subroutine is illustrated in the flowchart of FIG. 20. Control then returns to the end subroutine process block (1803).

From decision block (1812), if the ST or HRSG is not at an upper limit, then control flows to process block (1814), where the fuel flow to the HRSGs is increased. Control now returns to the end subroutine process block (1803).

Decrease Power Output

Referencing FIG. 19, the Decrease Power Output subroutine begins at (1901) and proceeds to decision block (1902). If the plant is not operating in a transition zone of operation (zone where one GT is in the process of either being brought into or out of service), then process control flows to decision block (1904). Note that in FIG. 43, the transition zone of operation is between 70 and 80% of plant load.

If the plant is operating in a transition zone of operation, then process flows to the Transition Control subroutine, (1905). An exemplary embodiment of this subroutine is illustrated in the flowchart of FIG. 20. Control then returns to the end subroutine process block (1903). All process returns to this block (1903) are returned to subroutine block (FIG. 17, 1707), and finally to the initial process block for overall plant control (FIG. 17, 1702).

At decision block (1904), if all of the plant's GTs are operating, then process flow proceeds to decision block (1920). At this juncture, the controller determines whether or not either the ST or HRSG is operating at a lower limit. For the HRSG and ST, these limits would be determined by the plant engineers who would specify the optimum point to begin shutdown of a GT. If neither of these limits is reached, then control flows to process block (1921), where the fuel flow to the HRSGs is decreased. Control now returns to the end subroutine process block (1903).

From decision block (1920), if the GT or HRSG is at a lower limit of operation, then process control proceeds to decision block (1922). If the plant output is greater than the upper limit of the transition zone of operation, control flows to process block (1924) where load is decreased on one or more GTs. Control now returns to the end subroutine process block (1903).

From decision block (1922), if the plant output is at the upper limit of the transition zone of operation, then control flows to (1923), the Transition Control subroutine. An exemplary embodiment of this subroutine is illustrated in the flowchart of FIG. 20. Control then returns to the end subroutine process block (1903).

From decision block (1904), if all of the plant's GTs are not operating, then process flow proceeds to decision block (1910). At this juncture, the controller determines whether or not either the ST or HRSG is operating at a lower limit. For the HRSG and ST, these limits would be determined by the plant engineers who would specify the optimum point to begin shutdown of a GT. If neither of these limits is reached, then control flows to process block (1911), where the fuel flow to the HRSGs is decreased. Control now returns to the end subroutine process block (1903).

From decision block (1910), if the GT or HRSG is at a lower limit of operation, then process control proceeds to decision block (1912). If the plant output is greater than the upper limit of the transition zone of operation, control flows to process block (1914) where load is decreased on one or more GTs. Control now returns to the end subroutine process block (1903).

From decision block (1912), if the plant output is at the upper limit of the transition zone of operation, then control flows to (1913), the Transition Control subroutine. An exemplary embodiment of this subroutine is illustrated in the flowchart of FIG. 20. Control then returns to the end subroutine process block (1903).

Transition Zone Operation

Referencing FIG. 20, the Transition Control subroutine begins at (2001) and proceeds to decision block (2002). If a load increase is desired, the process control proceeds to decision block (2010).

If the plant is at the lower limit of the transition zone of operation, process control proceeds to (2011) and an additional GT is started and brought on line. Control then returns to process block (2012). At this point, plant load is modulated by prescribed, programmed outputs for the GTs and STs for a particular transition zone output. Control now returns to the end subroutine process block (2030).

If a load decrease is required, the process control proceeds to decision block (2020).

If the plant is at the lower limit of the transition zone of operation, process control proceeds to (2021) and a GT is taken off line and shutdown. Control now returns to the end subroutine process block (2030).

If the plant is not at the lower limit of the transition zone of operation, process control proceeds to (2022) where load is modulated by prescribed, programmed outputs for the GTs and STs for a particular transition zone output. Control now returns to the end subroutine process block (2030).

Summary

The preceding method of controlling the HRSGs and power plant has illustrated how the teachings of the present invention can be advantageously applied to power plant operations. It should be noted that the exemplary system control flowcharts of FIGS. 16–20 may be augmented or trimmed of steps with no loss in generality or scope of teachings in regards to the present invention.

The gist of the present invention is that while a large number of control schemes may be employed to achieve overall cost and environmental savings, the basic use of single (or near single) pressure HRSGs in conjunction with supplemental firing can improve the overall economics and environmental costs of existing plant technologies. Furthermore, the novel disclosed method of maximizing power plant operation over a wide range of load while still maintaining the GTs at full load operation (as contrasted with the prior art) makes the disclosed control technique a significant improvement in power plant control system engineering.

Preferred System Context of the Present Invention

The numerous innovative teachings of the present application will be described with particular reference to the presently preferred embodiment, wherein these innovative teachings are advantageously applied to the particular problems of a HIGH POWER DENSITY COMBINED CYCLE POWER PLANT. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Retrofit Applications

Today, many nuclear, coal, and oil-fired power plants are still in operation. With increasing pressure to be efficient in a competitive electrical marketplace, along with environmental concerns for the production of greenhouse gases and other pollutants, the retrofit of these existing steam turbine power plants to combined cycle power plants becomes more and more likely. However, conventional combined cycle power plants produce steam at three pressure levels, while the existing steam turbines at conventional steam power plants are designed for utilizing only HP steam.

In GE informative document GER-3582E (1996), entitled "Steam Turbines for STAG™ Combined Cycle Power Systems", by M. Boss, the author describes a basic difference between a ST in a conventional steam power plant versus a ST in a conventional combined cycle power application:

"Mass flow at the exhaust of a combined cycle unit in a three-pressure system can be as much as 30% greater than the throttle flow. This is in direct contrast to most units with fired boilers, where exhaust flow is about 25% to 30% less than the throttle mass flow, because of extractions from the turbine for multiple stages of feedwater heating."

This stated phenomenon greatly complicates the retrofit of conventional steam power plants to conventional combined cycle power plants in the prior art. Since conventional power plants accept steam at the inlet only, at HP pressure, they are not designed to accept the IP and LP steam produced from conventional combined cycle HRSGs. In order to be effective, it has already been discussed that conventional combined cycle power plants in the prior art have a ST to GT power ratio of approximately 0.5:1. Therefore, to retrofit a 400 MW conventional steam power plant to a conventional combined cycle would require 800 MW of GT capacity, bringing the total plant capacity to 1200 MW. The existing infrastructure, fuel lines, available real estate, and most importantly, high voltage power lines, may not be of sufficient size or rating to allow such an uprate (a 200% increase).

In addition, to obtain the high levels of efficiency for the combined cycle from the prior art, the ST would need to be modified to accept IP and LP steam, and would need to have its entire steam path (internal components including rotating and stationary blades) modified, as the ratio of exhaust steam to throttle steam would change from 0.75 in the conventional steam power plant to 1.30 in the conventional combined cycle power plant. This is a change of 1.3/0.75 or 1.73. This is a major change to the steam path of the ST that is very costly and perhaps even restrictive, as the present turbine casings may not be usable in a redesign. To further complicate matters, much of the existing equipment at the existing steam power plant (condensers, pumps, piping, etc.) would no longer be correct for the conventional combined cycle configuration. Items such as feedwater heaters are not even used in the prior art combined cycle.

Many of the preferred embodiments of the present invention, however, are an ideal solution to the retrofit option of conventional steam power plants to combined cycle technology. Since several of the preferred embodiments of the present invention specify the production of primarily HP steam, this is an ideal option for this retrofit. The current combined cycle technology produces steam at up to 1800 psig, while a typical utility standard for steam power plants is 2400 psig, one preferred inlet pressure for several of the preferred embodiments. In addition, since the present invention can utilize a higher ST to GT output ratio (for example, approximately 1.2:1.0), only 330 MW of GT capacity is required to retrofit a 400 MW conventional steam power plant to become a clean, efficient combined cycle power plant as described by several of the preferred embodiments of the present invention. Also, much of the conventional steam power plant equipment, including the ST, feedwater heaters, condenser, pumps, and other auxiliaries could be used with little or no modification.

Retrofit Comparison—Preferred Embodiment to Prior Art

In U.S. Pat. Nos. 5,375,410 and 5,442,908 Briesch and Costanzo respectively propose a hybrid style power plant suitable for use in retrofit applications, but still utilize a three pressure level HRSG. However, supplemental firing is not utilized, and neither is cooling of the HRSG exhaust gases by feedwater. Such retrofit power plants operate as a conventional combined cycle when boiler fuel is not used. In contrast, the preferred embodiments of the present invention utilize boiler fuel and/or HRSG supplemental firing to determine the best balance between fuel types, fuel economics, part load requirements, and/or plant emission levels.

An example for comparison of retrofits for existing steam plants is illustrated in FIG. 44. In this example, an existing steam plant designed for standard steam conditions of 2400 psig inlet pressure with a single reheat and inlet/reheat temperatures of 1050° F. is to available for retrofit. These steam conditions would normally be associated with a fossil-fueled power plant, such as coal or oil fired. Although the plant's steam turbine is in good condition, the plant may be having difficulty with environmental permits, facing expensive boiler repairs, or be concerned with economic factors in a deregulated power generation market. Any one or combination of these factors could be incentive for the plant owners to consider a retrofit of the existing power plant to the cleaner and more efficient combined cycle technology.

The conventional steam power plant is rated at 400 MW and has a heat rate of 7620 BTU/kWh. If fuel is expensive, it will be advantageous to upgrade this facility to combined cycle technology. However, this plant may (partly due to its lower heat rate) have a low appraised value. For this example it is assumed that this plant has a value of US$50 million, which equates to only US$125 per kW. With low fuel costs, retrofit may not be economical.

To design an economical retrofit, it is necessary to select the best equipment combinations that maximize the ST efficiency and capability. For a large ST such as the one in this example, its construction would be similar to that shown in FIG. 51. As can be seen from this illustration, the rotating and stationary blades in the HP/IP casing to the left of the figure are much smaller than those in the LP casings to the right of the figure. Although it is possible to change the blading in the LP casing, it usually requires a change in the LP casing, which affects the foundation, support structure, and condensers. The foundation, support structure, and condensers associated with the LP casings are large heavy components that are difficult and expensive to modify. Therefore, it is desirable to utilize the ST LP casings with little or no modifications, and make steam path changes only to the HP/IP section.

To maximize the existing ST LP section, it is desirable to match its exhaust flow in the new combined cycle application to that of the former steam plant, approximately 1,587,000 lb/hr. Utilizing the industry standard General Electric (GE) Model PG7241(FA) Gas Turbine as the GT engine for this uprate, the total steam production from a 3 pressure level HRSG used with this GT would only be 528,000 lb/hr. Therefore, 3 GTs of this model would be required in the prior art to effect this retrofit. This new combined cycle plant from the prior art would be rated at approximately 800 MW with a heat rate of 6040 BTU/kWh. However, due to the substantially reduced flows in the HP/IP section of the existing ST, the blading in these sections would need to be modified. Also, due to the lower volumetric flows, the ST inlet pressure would be derated to 1800 psig. The rating of the modified ST would be approximately 300 MW. Note that since the combined cycle from the prior art doesn't utilize feedwater heaters, these devices would be isolated from service. Total plant modifications, including those to the HP/IP section of the ST would be extensive and costly, and US$10 million has been allotted to account for these ST modifications.

Utilizing the technology described by the preferred embodiment on the present invention, there are at least two options for this retrofit, demonstrating the flexibility that is offered by the invention. The first option utilizes only one industry standard General Electric (GE) Model PG7241(FA) Gas Turbine and HRSG. This option requires a great deal of supplemental firing, but also produces a great deal of steam. With matched exhaust flow to the conventional steam plant, the flows to the inlet of the ST are approximately 93% of the conventional steam plant design. Therefore, this ST can be used without modification, with only a 7% reduction in inlet pressure at rated conditions. In addition, this design will make use of the existing feedwater heaters. The rating of the modified ST would be approximately 375 MW, with a total combined cycle plant heat rate of 6235 BTU/kWh.

The second option utilizes two industry standard General Electric (GE) Model PG7241(FA) Gas Turbines and HRSGs. With this option, the exhaust flow of the ST exceeds its former design by about 15%. Therefore, the exhaust pressure will climb by about this same amount and overall efficiency will be decreased. In this option of the preferred embodiment on the present invention, inlet steam flows are 87% of the steam plant design value, therefore, the ST can be utilized without modification, but with a reduction in inlet pressure at design conditions. This design will also make use of the existing feedwater heaters. The rating of the modified ST for this second option would be approximately 395 MW, with a total combined cycle plant heat rate of 6060 BTU/kWh.

FIG. 44 tabulates the data for the various retrofit options. As described previously, the ultimate determining factor for the retrofit will be the economic evaluation. If either fuel costs or the plant utilization factor are extremely low, the retrofit may not be warranted. Higher fuel costs may dictate a more efficient plant, but still one with reasonable cost. Limitations on fuel delivery, power line capacity, or real estate may place restrictions on the power output or the amount of equipment. Ultimately, the preferred embodiment of the present invention offers more options, better utilization of the existing ST, less infrastructure change, and lower cost than the retrofit combined cycle power plant from the prior art.

Combined Cycle Power Plants

The present invention is particularly amenable to application in combined cycle power plants, where the current trend is toward gas-fired combined cycle turbine systems. The features of the present invention are attractive in this configuration particularly because of the reduced hardware, space, and capital costs using the teachings of the present invention. For example, it is entirely feasible using the teachings of the present invention to design a high power density combined cycle power plant having an initial capital cost which is 25% lower than an equivalent prior art combined cycle configuration.

For example a US$340 million (reference FIG. 25) conventional combined cycle power plant from the prior art which can be constructed through the methods described by the preferred embodiment of the present invention, could be built for US$240 million in (reference FIG. 27) capital costs. Initial savings are US$100 million dollars. These savings equate to US$10 million annually in financed capital costs assuming an 8% interest rate amortized over 20 years. Assuming fuel costs for a 725 MW plant from the prior art of US$93.4 million per year (reference FIG. 25), the annual savings of US$10 million in capital costs equates to 10.7% of the total annual fuel costs for the plant. This means that the present invention can be up to 10.7% less fuel efficient than current combined cycle configurations and still be more economically viable. Obviously, the goal of the present invention is to be as fuel efficient and as environmentally efficient as possible. Thus, the cost savings over the life of the plant can be significant.

In many new power plant constructions or especially in situations where the power plant is a retrofit or upgrade to an existing installation, the amount of real estate available to construct the new plant is fixed. Thus, the present invention capability of providing an equivalent amount of power output with less plant real estate becomes very attractive, especially when overall plant efficiencies can be maintained at or above current levels.

Furthermore, the ability of the present invention to operate efficiently over a wide range of part loads is a drastic improvement over the prior art, both from a fuel efficiency standard as well as an exhaust emissions standpoint. Finally, the ability of the present invention when targeted toward this application to reduce the overall heat rejection of a high capacity power plant is extremely attractive in light of the negative impact that this waste heat has on the environment, especially considering recent scientific studies concerning global warming and the like.

Energy Transport Fluids

As will be well known by one skilled in the art, while the preferred embodiments have made use of energy transport fluids (ETF) comprising primarily air in the topping cycle and steam and/or hot water in the bottoming cycle, the present invention is amenable to application with a wide variety of other energy transport fluids such as ammonia, chlorinated fluorocarbons, oil, etc.

These are just a few of the exemplary energy transport fluids that will work in some context with the present invention, and any mention of "energy transport fluid" or "ETF" should be given its broadest meaning when interpreting the intended applications in which the teachings of the present invention are germane.

Combustible Fuel and/or Fuel/Heat Sources p As will be well known by one skilled in the art, while the preferred embodiments have made use of combustible fuel (CF/CFT/CFB) comprising primarily natural gas, the present invention is amenable to application with a wide variety of other combustible fuels such as hydrocarbon based fuels, fossil fuels, fuel oil, diesel fuel, and jet fuel. Of course, combinations of single combustible fuels may be either mixed and fired or fired separately to generate a hybrid combustible fuel system that would also be within the anticipated scope of the present invention. These are just a few of the exemplary combustible fuels that will work in some context with the present invention, and any mention of "combustible fuel" should be given its broadest meaning when interpreting the intended applications in which the teachings of the present invention are germane.

Similarly, any mention of the term "fuel/heat source (FHS)" while specifically including heat generated from the combustion of natural gas, may also include heat generated from any combustible fuel (CF/CFT/CFB) as defined above, but also may comprise in whole or in part heat derived from a geothermal source, nuclear reactor, nuclear fission, indirect combustion and/or other source of energy.

GT Engine Availability

With the onset of electrical deregulation, there has been a flurry of activity by power plant developers to be the first to the marketplace with new capacity. The business strategy for these developers is that after enough power plants have been constructed in a particular region, the banks and other financial institutions will be reluctant to finance additional power plants in that region. Therefore, the general consensus seems to be that he who builds his plant first, wins the economic race.

This rush to the marketplace has had an effect on the GT manufacturers. At the current time (2nd quarter of 1999) there is approximately a 3 year wait for a GE frame 7 GT. In recent years, the lead time for one of these GTs was less than 10 months. This is also noted in POWER MAGAZINE, (ISSN 0032-5929, March/April 1999, page 13):

"Gas turbines, which have sold at a modest clip for the past few years, suddenly are selling like stocks with a "dot-com" address, as regulated utilities and independent power producers (IPPs) rush to develop capacity throughout North America. Some companies are placing orders for dozens of turbines, locking up production slots of the major manufacturers for years to come."

This spike in demand for GTs has not only increased the selling price of most GTs by a considerable margin, but has made it difficult to even purchase some models of GTs without a 2–4 year wait for delivery. Therefore, the preferred embodiment of the present invention serves to circumvent this problem by producing more power in the ST. This alleviates the need for such large amounts of GT capacity, and in some exemplary preferred embodiments, twice the capacity can be attained while utilizing the same GTs that would have been used in a combined cycle from the prior art.

Westinghouse Model 501G GT Engine

The Westinghouse model 501G gas turbine engine is the next step in technology from the "F" class engines (includes GE frame 7FA and Westinghouse 501F). The "G" technology engines have higher pressure ratios, more sophisticated turbine blade materials, and a firing temperature of 2600° F. To avoid serious thermal distortion or other damage due to high temperature in the combustor/turbine section of these GTs, it is necessary to provide steam into the gas turbine for cooling purposes. Thus, in this new technology, the GT is dependent upon the steam cycle for proper operation. This equipment arrangement has provided for higher overall combined cycle efficiencies at full load power, however, there are numerous drawbacks to this technology. Some of these drawbacks are listed below:

1. This technology is not yet proven.
2. The cycle does not offer a great deal of flexibility, as supplemental firing is limited to less than 10% power augmentation. Additionally, this supplemental firing lowers the overall plant efficiency.
3. With the higher combustion temperatures, NOX is more readily formed, and anticipated NOX levels are 42 PPM on natural gas versus only 9 PPM for a GE frame 7FA GT.
4. With the integral steam cooling of the model 501 G combustion section, comes the requirement for ultra pure steam. Since the steam cooling passages in the GT components are small, deposits and build-up that can result from steam impurities are not tolerable. Therefore, special condensate polishing systems are required to produce this highly pure steam.
5. An examination of a heat balance for a model 501G indicates that some of this cooling steam is consumed in the GT (probably traveling into the turbine section). For a 2X1 501G combined cycle plant this appears to be 35,000 to 45,000 lb/hr of steam. This increases the make-up water requirements, increases the duty on the condensate polishing systems, and may be subject to increase with time as the small passages which leak this steam increase in size due to thermal distortion, erosion, or other factors, thus degrading the efficiency.
6. Most combined cycles operate with a sliding pressure on the steam cycle to improve efficiency. However, the cooling steam, which emanates from the IP boiler on the HRSG, must be maintained at nearly constant pressure for adequate cooling. This will have detrimental effects on efficiency at part load conditions compared to even conventional combined cycle power plants in the prior art.
7. Due to the higher pressure ratio, the model 501G requires a fuel gas pressure of 600 to 650 psig, versus 350 to 370 psig for a GE frame 7FA. Many pipeline companies will not guarantee pressures to satisfy the model 501G requirements, so fuel gas compressors are needed in many applications where they would not be required for the "F" technology engines.
8. These GTs require more than 3 hours to reach full load, versus less than 30 minutes for "F" technology engines. This limits their use in providing peak power demands.

As can be seen from this list of drawbacks, the newer technology engines (including the proposed GE "H" technology engines), have a host of new schemes to enhance combined cycle efficiency by a few percent, but require a vast amount of restrictive, expensive, and complicated technology to achieve these relatively small incremental increases in efficiency. Although the preferred embodiment of the present invention can be used with some of these more advanced engines like the model 501G (however, some changes would be required for cooling steam), many of the exemplary preferred embodiments have focused on the GE frame 7FA and other commercial GT systems due to their proven history, simplicity, low emissions, and improved efficiency when packaged with the cycle described by the preferred embodiment of the present invention.

Combined Cycle Comparison: "G"/"H" GT Technology vs. "F" Technology

In light of the impending deregulation of the electric power generation marketplace and the subsequent competitive economic environment that this deregulation will spawn, the electric power generation industry has migrated towards a more sophisticated and complicated means of power generation. Specifically, "G" and "H" GT technologies have become the preferred GT based combined cycles for many proposed combined cycle power plant installations.

However, the use of this technology will not be without its drawbacks, both economic and environmental. Specifically, the "G" and "H" GT technologies provide less operational flexibility than their previous "F" technology counterparts. These newer technologies require a mandatory integration of the GT and ST cycles, as the newer GTs require steam cooling of internal GT components. Without this ultrapure, precisely metered cooling steam, these GTs will not operate. Therefore, as the combined cycle plant load changes, the steam cycle will not be able to respond as well as even in the prior art, as cooling steam requirements will dictate the conditions of some steam that is produced.

For control, these new technologies still focus plant operation on modulation of GT operation to meet plant load requirements, just as in the prior art. However, due to the nature of their integrated cycles, little or no supplemental firing will be allowed using this technology. This characteristic, when coupled with the plant requirements during part load conditions, results in substantially decreased part load heat rates even as compared to older "F" technology plants where there is no direct coupling between the GT cooling and ST operation. Thus, these newer technology GTs are generally designed to be base loaded power plants. This is in contrast to much of the new plant demand load, which varies on a daily and seasonal basis.

Additionally, these newer technology plants have higher firing temperatures, resulting in the need for more exotic materials in their construction. These higher temperatures therefore lead notably to higher maintenance costs, and also higher NOX emission levels.

Additionally, these newer GTs to achieve the higher efficiencies, utilize higher engine pressure ratios. This results in the need for higher natural gas inlet pressures, requiring the addition of fuel gas compressors in many situations. These fuel gas compressors consume a good deal of power, and serve to lower efficiency, increase cost, and reduce reliability of combined cycle power plants.

In light of the constraints on operational flexibility, part load efficiency, increased NOX levels, potential fuel gas compression requirements, along with the fact that these "G" and "H" technology machines have not been proven in even short term operation, the present invention has focused on the use of older GT technologies such as the "F" technology. In doing so, the present invention permits decoupling of the gas turbine and steam turbine cycles while simultaneously allowing the GTs to operate at peak fuel and emission efficiencies. The present invention using "F" technology provides a power plant that drastically improves part load efficiency, improves plant flexibility, lowers emissions, and drastically lowers overall installed plant cost.

With a heat rate of 6006 BTU/kWh, for a preferred embodiment of the present invention, versus 5830 BTU/kWh for Westinghouse "G" technology and 5690 BTU/kWh for GE "H" technology, this represents only a 3% and a 5.5% increase in efficiency at rated load for these more sophisticated (yet operationally limited) combined cycle plants from the prior art. Given the lower part load efficiencies, added maintenance costs, increased capital costs, and lack of operational flexibility, it is unlikely that the "G" and "H" technologies (even with their incrementally higher full load efficiencies) will provide the economic benefits available via use of the teachings of the present invention as applied to combined cycle power plants.

Although the teachings of the preferred embodiments of the present invention focus on "F" technology GTs, they may be applied to the "G" and "H" technologies, but only with careful guidance by the GT manufacturers. Note, however, that the teachings of the present invention do not specifically limit application to any particular GT or GT manufacturer, but are valid throughout the range of commercially available GTs, as are known by one skilled in the art.

Preferred Embodiment Plant Design Method

Since the preferred embodiment consists of a more flexible design for a combined cycle, it offers high efficiency (both at full and part load), and has significant cost advantages associated its high power density design. This method for selecting the optimum power plant for operation and financing is described in subsequent sections below.

Selection

Figure 47:
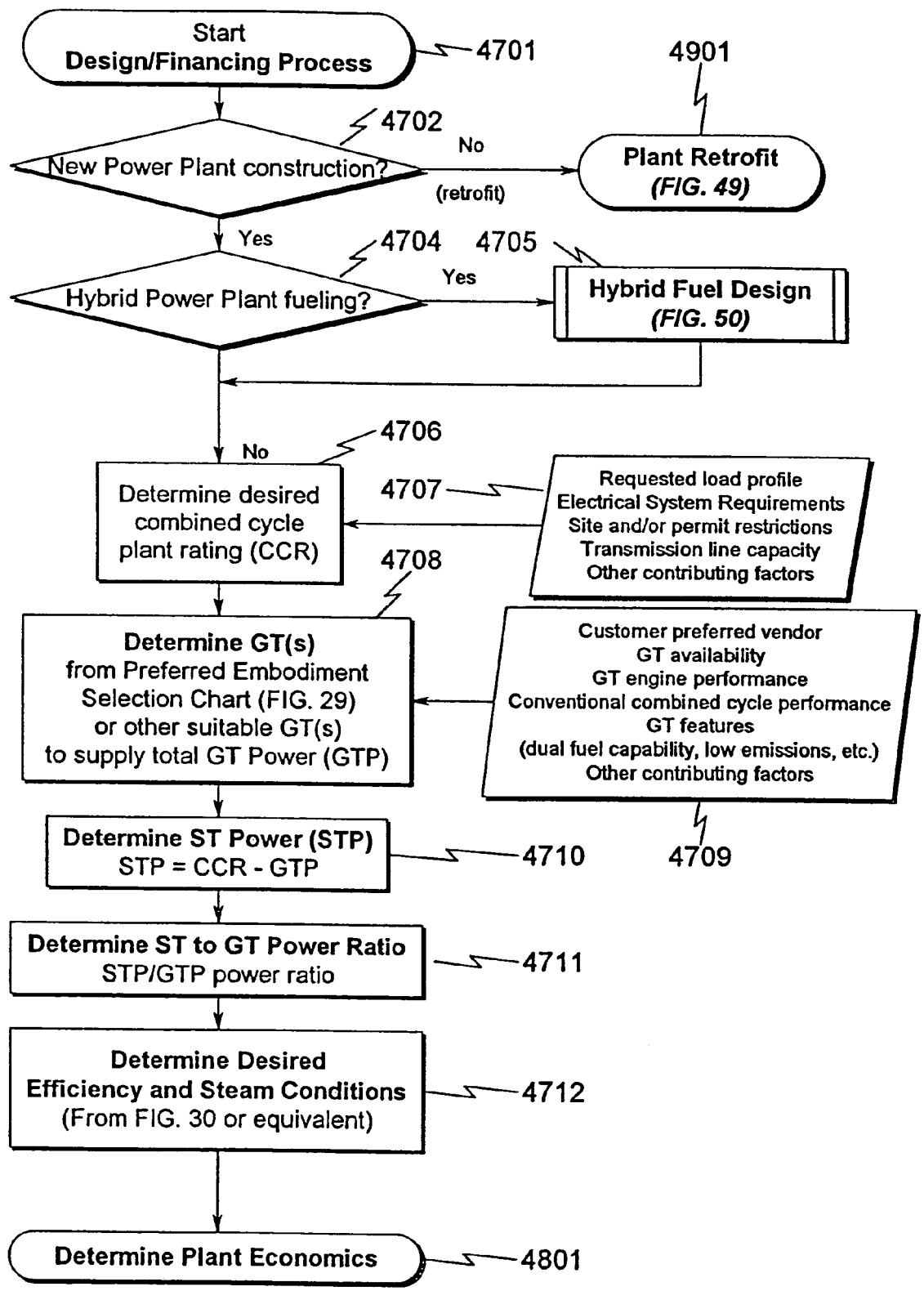
FIG. 47 is an exemplary design/financing process flowchart for determining a preferred and/or optimal arrangement of a given invention embodiment for a particular power plant application.

Referring to the exemplary flowchart of FIG. 47, the process begins at the start block (4701), and continues to decision block (4702), where it is determined whether to investigate new construction or the retrofit of an existing plant. If the plant will be new construction, process control flows to decision block (4704). If the plant is to be a hybrid fuel design, process control proceeds to the Hybrid Fuel Design Subroutine (4705). Otherwise, process control continues to (4706), where the plant developer, using information in (4707) and other information about his proposed power plant site such as transmission line capacity, real estate availability, and the commercial value of electricity, will select a desired combined cycle plant rating (CCR).

Knowing the CCR, the plant developer will proceed to (4708) and, utilizing the input data from (4709), select the GTs for a preferred embodiment combined cycle from a list of selections, such as that illustrated in FIG. 29 (note that FIG. 29 is only a partial exemplary list for demonstration purposes). With the GTs selected, the total gas turbine power output, GTP, can be determined. Proceeding to (4710), the steam turbine power, STP, can be determined as CCR-GTP.

Knowing GTP and STP, process control flows to (4711) where the STP/GTP ratio is calculated. Process control now proceeds to (4712) where the desired efficiency and steam conditions are determined based upon a characteristic curve similar to that illustrated in FIG. 30. Process control now proceeds to (4801) for an economic evaluation of the selected combined cycle.

Economic Evaluation

Figure 48:
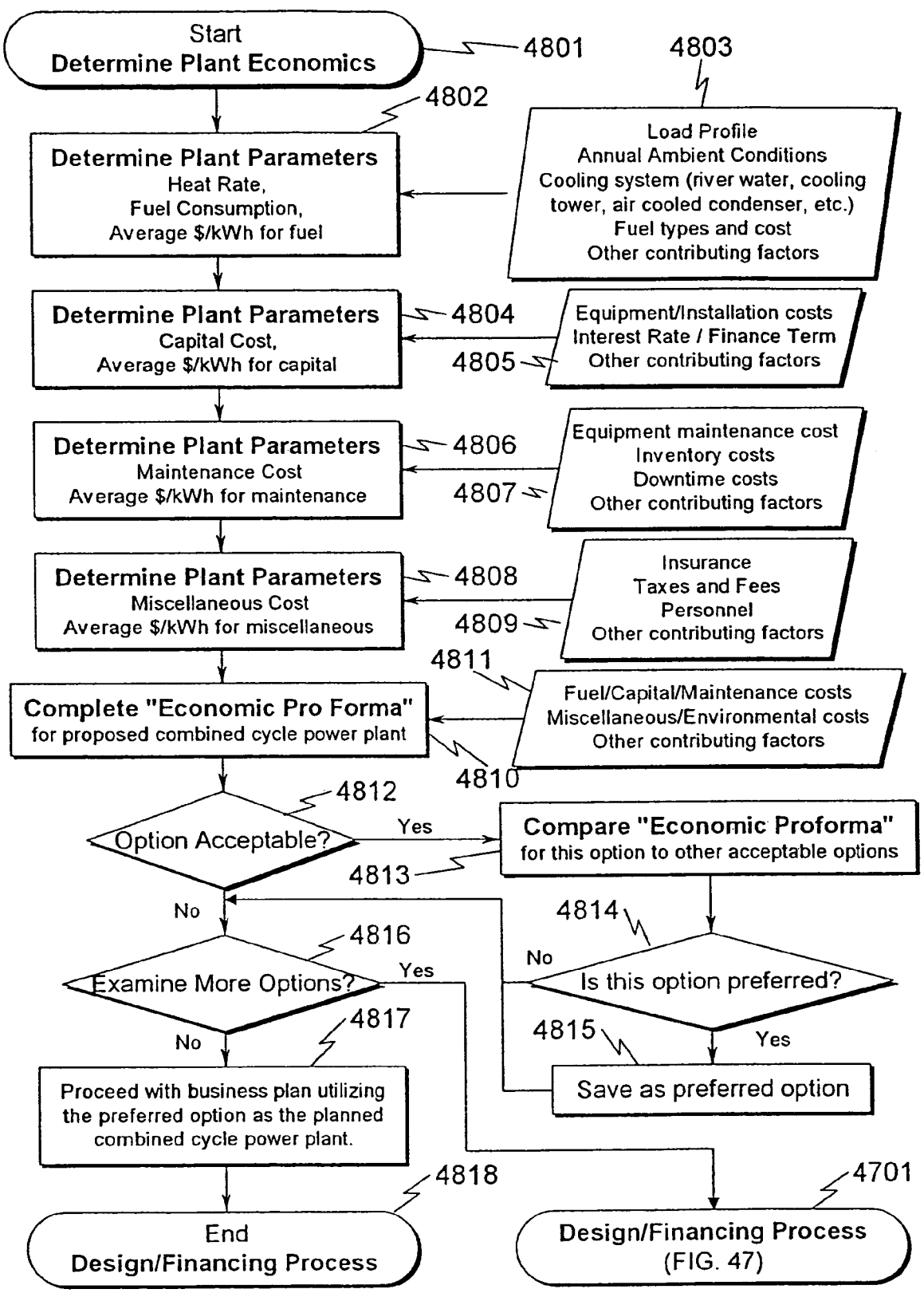
FIG. 48 is an exemplary plant economics process flowchart for determining a preferred and/or optimal arrangement of a given invention embodiment for a particular power plant application.

Referring to FIG. 48, the economic evaluation begins at (4801) and proceeds to block (4802), where inputs for the load profile, fuel types, fuel cost, and other contributing factors listed in (4803) are used to determine fuel costs and average annual specific fuel cost in $/kWh.

The process continues to (4804), where inputs for the equipment cost, installation, financing, and other contributing factors listed in (4805) are used to determine capital costs and average annual capital cost in $/kWh.

Process flow continues to (4806), where inputs for inventory cost, maintenance, tools, and other contributing factors listed in (4807) are used to determine maintenance costs and the average annual maintenance cost in $/kWh.

The process flows to (4808), where inputs for personnel cost, taxes, insurance, and other contributing factors listed in (4809) are used to determine miscellaneous costs and the average annual miscellaneous costs in $/kWh.

Utilizing the data for fuel, capital, maintenance, and miscellaneous costs, along with the factors listed in (4811), a complete "Economic Pro Forma" is determined for the proposed combined cycle plant from the preferred embodiment of the present invention.

The process continues to decision block (4812) to determine if the option selected is acceptable. If so, process flows to (4813) where this option is compared to other acceptable options. Process control proceeds to decision block (4814). If the option calculated is proven to be advantageous over other acceptable options, it becomes the preferred option and is saved as such in (4815). Process control continues to decision block (4816). If the new option is not preferred, process control continues to decision block (4816), bypassing (4815).

From decision block (4816), if more options are desired, process control returns to the Design/Financing process (4701) in FIG. 47. Otherwise, process flows to (4817) where the preferred option is selected as the business plan for the combined cycle project and process flow then ends at (4818).

Retrofit Plants

Figure 49:
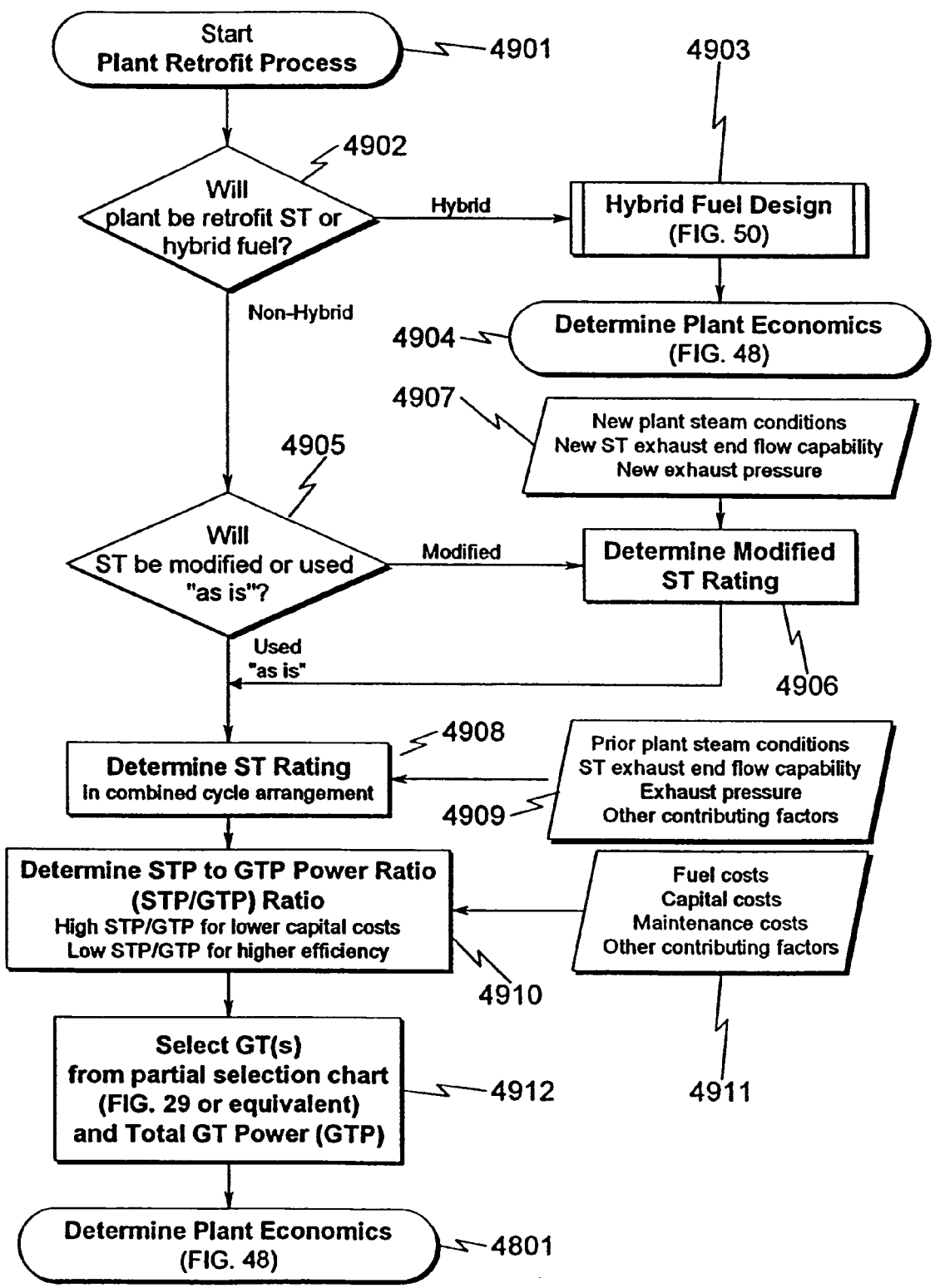
FIG. 49 is an exemplary plant retrofit process flowchart for determining a preferred and/or optimal arrangement of a given invention embodiment for a particular power plant retrofit application.

Referring to FIG. 49, the Plant Retrofit Process begins at (4901) and proceeds to decision block (4902), where it is determined whether the retrofit is for a hybrid fuel plant or not. If the plant is to be a hybrid design, process flows to the Hybrid Fuel Design Subroutine (4903). After return from this subroutine, the process flows to (4904) to determine the plant economics (see FIG. 48).

If the plant is not a hybrid design, control proceeds to decision block (4905). At this juncture, it must be determined if the existing ST will be modified (new steam path) or used "as is". If is to be modified, the process goes to (4906) where the new ST rating is determined utilizing inputs from (4907). From here the process returns to (4908). From decision block (4905), if the ST is to be used "as is", then process control proceeds to (4908).

Using inputs from (4909), the ST rating in the proposed combined cycle is determined and the process continues to (4910). With inputs for fuel, capital, and other contributing factors listed in (4911), a ST/GT power ratio is selected. Proceeding to (4912), utilizing data similar to that illustrated in FIG. 29, the GTs can be selected. The process now continues to (4801) which is the determination of plant economics (see FIG. 48).

Hybrid Fuel Plants

Hybrid fuel plants can utilize a number of combustible fuels to provide energy, as well as nuclear, geothermal, or other heat sources. By integrating the combined cycle described by the preferred embodiment of the present invention along with the hybrid fuel cycle, improved overall efficiencies and economics are possible.

Figure 50:
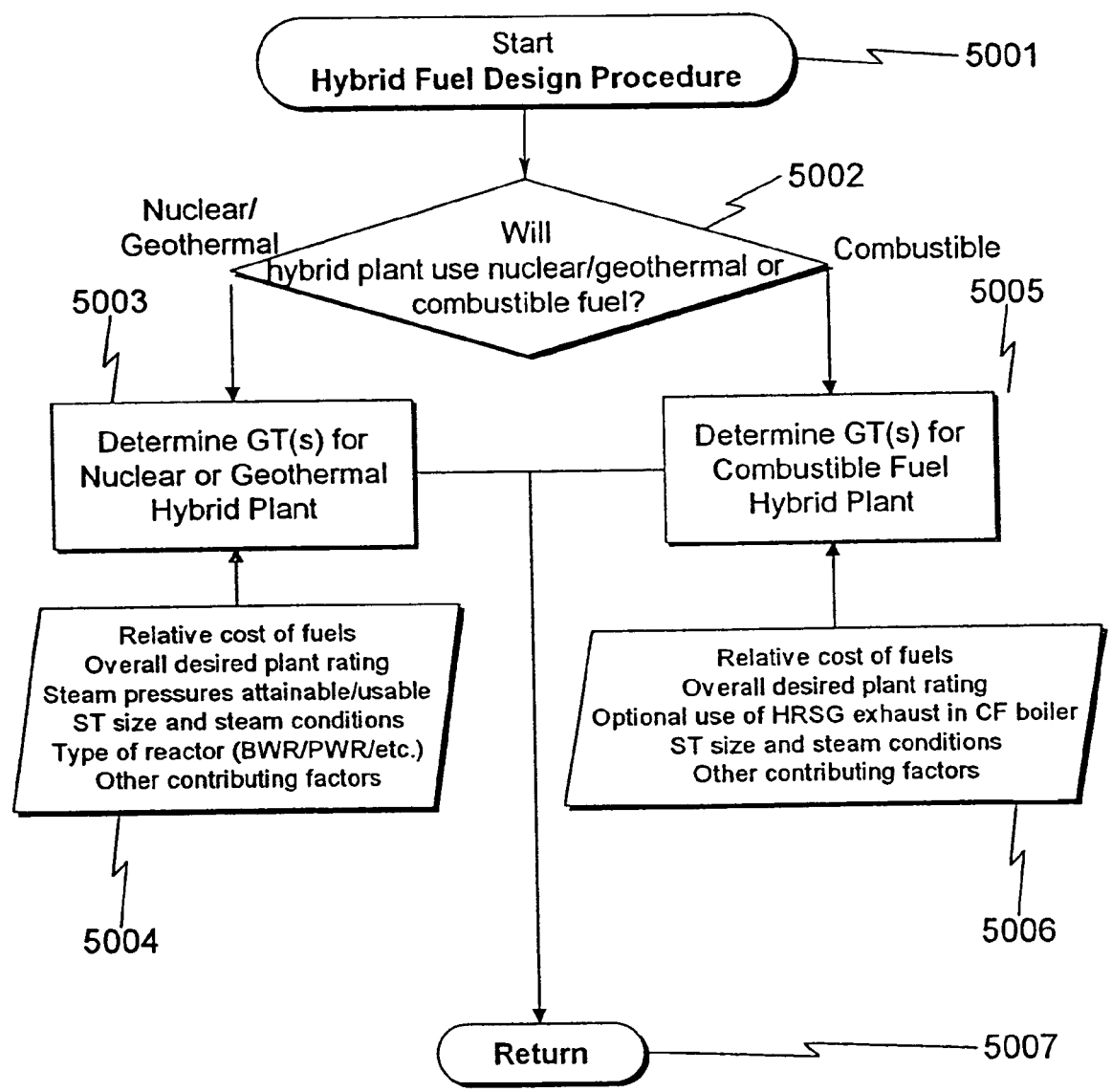
FIG. 50 is an exemplary hybrid fuel design process flowchart for determining a preferred and/or optimal arrangement of a given invention embodiment for a particular power plant application utilizing hybrid fuel.

Referring to FIG. 50, the Hybrid Fuel Design Procedure begins at (5001). Control flows to decision block (5002) where the process decides whether the hybrid will use combustible fuel or a heat source like nuclear or geothermal. If combustible fuel is to be used, process flows to (5005) where the GTs are selected for the hybrid plant based upon relative cost of fuels, ST size, desired plant rating, and other contributing factors as indicated in (5006). From here the subroutine returns to the point of invocation.

From decision block (5002), if a heat source like nuclear or geothermal is to be used, the process flows to (5003) where the GTs are selected for the hybrid plant based upon relative cost of fuels, ST size, desired plant rating, and other contributing factors as indicated in (5004). From here the subroutine returns to the point of invocation.

Options

General

As noted in previous discussion, one of the prime advantages of the preferred embodiment of the present invention is flexibility. This is not only apparent in the selection of the combined cycle plant rating, but also in its ability to manifest other power solutions such as the retrofit of existing steam plants or the integration of cycles with hybrid fuels. Following is a list of other options that can be effectively utilized in the preferred embodiment of the present invention.

Equipment Arrangement

In U.S. Pat. No. 5,649,416, James H. Moore describes various equipment arrangements which include GTs and STs coupled together driving a common generator. Although the arrangements in FIG. 26 illustrate the GTs and ST each with its own respective generator, there is no reason to insist that this arrangement be required. The teachings of the preferred embodiment are for a new system and method, and the equipment arrangement could very well be as described by Moore in his patent, or another arrangement if so desired. Thus, any combination of single-shaft system configurations are anticipated by the present invention.

Other Topping/Bottoming Cycles

The present invention has been discussed primarily with respect to the use of conventional Brayton/Rankine cycles for the combined cycle application discussed herein. However, it should be noted that the teachings of the present invention are equally applicable to the use of other cycles. While there is no practical limit as to what other cycles may be utilized within the context of the present invention, it is specifically anticipated that the GE Kalina cycle (a bottoming cycle) may be particularly amenable to use in conjunction with the present invention.

Thus, for the purposes of this document, the terms "topping cycle" and "bottoming cycle" should be given their broadest possible meanings consistent with the use of Brayton, Rankine, Kalina, and other cycles available to one skilled in the art. Additionally, it should be noted that the present invention specifically anticipates the use of multiple cycles within a given combined cycle application.

Small Steam Turbine Driven BFP

For illustrative purposes, the boiler feed pumps (BFP) referenced in this disclosure are assumed to be driven by electric motors. However, in larger steam power plants, these pumps are frequently driven by small steam turbines, referred to as boiler feed pump turbines (BFPT). The BPFTs have several advantages over motors, but the primary advantages are load response and a reduction in exhaust end blade loading.

Since these BFPTs utilize low pressure steam at their inlets (typically less than 200 psia), they typically consume a fair amount of steam. This steam used by the BPFTs equates to a reduction of steam to the LP section of the main ST. This reduces the loading on the last stage blades and can often increase the efficiency of the cycle. Advanced Steam Conditions In U.S. Pat. No. 5,628,183, Rice discusses development work being conducted in Europe on higher steam temperatures and pressures, and in the United States through the Department of Energy (DOE) and the Electric Power Research Institute (EPRI). These include work by Solar Turbines on a pilot project designed for higher cycle efficiencies by utilizing 1500° F. ST inlet steam temperatures. Although not proven in long term reliable service, as these higher steam pressures and/or temperatures prove reliable, this technology will be easily implemented into the preferred embodiment of the present invention.

Advances in GT Technology

Gas Turbine technology continues to improve with advances like more efficient compressors, new metallurgy, higher firing temperatures, higher pressure ratios, and other efficiency enhancements. As these GT advances become available, they should be able to be integrated into the cycle herein described by the preferred embodiment of the present invention.

Non-Corroding LP HRSG Section

The detrimental effects of GT exhaust gas condensation and its ability to corrode tubes and fins in the HRSG LP section has been discussed. One common way to avoid this condensation problem is to provide preheated feedwater to the HRSG, such that the feedwater is sufficiently warm to be above the dew point of the GT exhaust gases and preclude the formation of moisture on the HRSG heat exchange surfaces. This method has been illustrated in some of the exemplary preferred embodiments, including FIGS. 35 and 39.

However, another method that can be utilized is the use of a non-corroding material in the HRSG tubes and fins, typically stainless steel. This construction method eliminates the need for feedwater preheating, and allows for further cooling of the GT exhaust gases, and thus even greater heat recovery of energy from said gases. The drawback, however, is the added cost for the stainless steel material. In many instances, this added cost will outweigh the value of the energy saved. But if fuel prices were high, and material costs relatively low, this option may be economically viable.

Combined HP/LP Pump

In order to produce the required pressures in the steam cycle, a pump is typically employed to pump the feedwater to the desired pressures. In several of the exemplary preferred embodiments, including FIGS. 9, 15, 35 and 39, dual pumps are indicated for LP and HP service. These pumps may be multiple as illustrated or may be a single pump. As with many pumps utilized for this service, they consist of a series of impellers that sequentially pressurize the feedwater.

A single pump housing, with extraction ports at the proper "pressure" (impeller) location can provide an intermediate pressure feedwater, while the remainder of the feedwater continues to the HP outlet. Other pump arrangements can also be devised. The intent of the preferred embodiment of the present invention is not to limit the size or style of pump, but to allow the use of any pump or combination thereof that provides the required service.

Waste Heat Recovery

Throughout the discussion of both prior art combined cycle power plants and the features of the present invention there has been mention of losses that occur due to equipment inefficiencies in the overall system. For example, this might take the form of losses in the generator due to non-ideal (non-zero) resistance in the generator windings. In general, most of the system losses in any combined cycle power plant can be expressed in terms of waste heat, or heat that is generated but not converted to mechanical or electrical energy. Generator losses, boiler feed pump losses, lubrication oil losses, ambient GT heat radiation losses, and ST heat radiation losses are just a few of these waste heat losses in a conventional combined cycle application. In conventional (prior art) combined cycle arrangements, these waste heat sources are generally assumed to be present and not compensated for, as in these plant configurations the cost of recovering the heat is not economical and there is little incentive to use this low energy waste heat in a useful application.

Because of the excess low level heat contained in the GT exhaust gases, the prior art utilized a multi-pressure level HRSG to maximize heat recovery. Through the use of continuous supplemental firing, the energy level at the high temperature section of the HRSG equals or exceeds the energy content at the lower temperature section, introducing the need for ST extraction steam fed feedwater heaters, common Rankine cycle devices not utilized in conventional combined cycles from the prior art.

With this increased need for low level heat in the preferred embodiment of the present invention, other sources of heat may be utilized. Referring to FIG. 21, these include the gas turbine losses, GTL (2102), steam turbine generator losses, STL (2110), and other miscellaneous losses. Now low temperature heat such as heat from engine lube oil, generator heat losses, and GT compartment cooling air can all be used to preheat feedwater and displace the extraction steam used in the lower temperature feedwater heaters. The use of this heat not only improves the plant heat rate, but reduces the heat rejection requirements for the plant.

The present invention is somewhat unique in these circumstances because these waste heat sources can be used in conjunction with feedwater heaters (as illustrated in FIG. 15) to add heat to water that is subsequently superheated within the HRSG. This practical utilization of feedwater heaters was not possible with the prior art, as the HRSG was used to provide this function in the prior art, and feedwater heating would provide no advantage in the prior art combined cycle configurations. Thus, the judicious use of feedwater heating with supplemental firing in some embodiments of the present invention now provide a method of efficiently recovering what was in the prior art unrecoverable waste heat.

It should be noted that the ability to recover this waste heat in a practical manner can be a significant improvement in overall combined cycle efficiency. Consider, for example, the case in which 1–2% of the waste heat generated by the system is recovered and put to good use in the overall combined cycle. Remembering that a large 1000 MW combined cycle power plant will expend approximately US$175 million annually for fuel means that even a 1% increase in overall cycle efficiency will equate to large savings in fuel (US$1.75 million annually). If this improvement can be sustained over a 20-year life cycle of the power plant, the total fuel savings would be US$35 million. Thus, waste heat recovery using the present invention represents a new potential for improving the overall economic efficiency of combined cycle power plants that was not a practical possibility using the prior art.

It should not go unnoticed that the recovery of waste heat represents a direct improvement in overall thermal conversion efficiency in the combined cycle power plant, resulting in a direct reduction in warming of the atmosphere. Given the increasing concerns regarding the effect of global warming on our environment, an emphasis on waste heat recovery by power plant designers should be a concern on par with the reduction of NOX emissions and other forms of pollution. Since it is estimated that over 100,000 MW of additional electric power plant capacity will be put online in the next decade, the concerns regarding the waste heat generated by these plants will be worthy of inspection by those interested in preserving environmental resources. Additionally, since portions of the waste heat generated by combined cycle power plants is expelled into the environment, there are significant concerns regarding the impact of this waste heat on both plant and animal wildlife.

Geothermal Plant Augmentation

The present invention may be amenable in many circumstances where existing or proposed geothermal power plants which have a low degree of efficiency are to be augmented with a gas turbine to either (1) supplement the geothermal energy production to meet the desired load demand or (2) replace losses or reduction in geothermal energy production for existing geothermal power plants. Since the equipment production for a geothermal installation is relatively fixed, the loss of efficiency or energy production in an existing geothermal power plant may result in the plant being inefficient to operate. In some cases, the reduction in geothermal energy flow may result in a plant shutdown, as the amount of power being produced may fall below a critical threshold for practical plant operation.

The present invention can be advantageously applied to these scenarios in much the same way it is applied to the recovery of waste heat in a conventional combined cycle power plant. The only difference in this situation is that the 'waste heat' used in the present invention is recovered from a geothermal source. The result of the use of this geothermal heat in conjunction with an optimally fired GT results in a power plant that can have a stable power output (regardless of the quality or stability of the geothermal energy source). Since the present invention relies heavily on supplemental firing of the HRSG, the geothermal energy source can in this application be used via heat exchangers to supplant this supplemental firing to the HRSG and thus displace the fuel and/or heat normally supplied for this purpose. Thus, as the geothermal energy source declines in output and/or efficiency, this only results in a corresponding increase in supplemental firing from other fuel and/or heat sources. The power plant rated output remains constant, and can even be increased using the retrofit options discussed elsewhere within this document.

Cogeneration Applications

As mentioned previously, the present invention is particularly applicable to cogeneration and combined heat and power (CHP) applications in which both shaft drive and heat are utilized within a single environment, such as a commercial or industrial plant. In such applications, a certain amount of heat from a combined cycle plant may be used for space heating, chemical feedstock processing, pulp processing, paper drying, cogeneration, and/or other industrial processes and the like.

The present invention specifically anticipates that the broadest application of the teachings of the present invention will be applicable to all forms of cogeneration and CHP applications. As such, the above examples are illustrative only of the range of applications of the present invention. Those skilled in the art will no doubt be able to apply the present invention teachings to a wide variety of other applications with no loss of generality.

Performance Comparisons

ST/GT Efficiency Tradeoff

To overcome the part load issues associated with electrical system load fluctuation, several preferred embodiments of the present invention utilize the steam turbine (ST) as the prime engine. The ST can reduce load easily by closing inlet valves or modulating inlet pressure to the engine (through a change in the rate of supplemental firing). This has an attenuated effect on part load efficiency as compared to the dilution of firing temperature as experienced by the GT. Additionally, the ST can actually be designed for optimum efficiency at a designated part load point, where the gas turbine almost always is most efficient at full load.

An understanding of the differences between gas turbines and steam turbines defines the advantages that STs have in operational flexibility. Gas turbines consist of a compressor section that compresses inlet air (usually at ambient conditions) to anywhere from 3 to 30 times atmospheric pressure. This air must then travel to the combustion zone where it is heated through the combustion of fuel to between 1600° F. and 2600° F. at full load, depending upon the GT design. These hot pressurized gases then expand through a turbine section in the GT to produce the power that not only drives the compressor, but also drives an electrical generator. Approximately ⅔ of the power developed by this turbine section is required to drive the air compressor, while the remaining ⅓ is available to drive the electrical generator. Due to the complexity of design, which includes matching the compressor, combustion system, and turbine section to work as an integrated unit, GTs are very structured machines. Manufacturers typically have a variety of models of GTs. However, they are designed for a distinct output or rating. To obtain a custom designed GT is neither feasible nor economical.

Steam turbines, in contrast, have very flexible designs. They rely upon the plant boiler feed pumps to provide pressurized water and the plant boiler to provide the heat to convert that high-pressure water into steam. Therefore, the ST can easily accommodate a change in power requirement at the design stage by simply being configured to pass more steam flow. This is easily accomplished by using incrementally larger stationary and rotating blades in the ST. Typically, a steam turbine design engineer can choose from a family of blades in the high-pressure (HP) sections of the ST that may increment as little as 0.25 inches. Blades in the low-pressure (LP) sections of the turbine usually have higher increment values. Through this design process two different STs may, for example, have ratings that vary from 100 to 300 MW, and still fit in essentially the same casing (from the exterior, these two turbines would look identical). The key difference would be the blading on the interior of ST and its flow passing capability.

Additionally, by proper selection of the LP blading, it is possible to "overload," from an efficiency viewpoint, the last stage blades at full load. Therefore, at full load, these blades are less efficient than at part load. Then, when the load is reduced, the efficiency of the LP section actually increases. This design is preferred for plants that spend a large portion of their operating life at part load, but need to reach peak load for short durations of seasonal peak system demand. It is this flexibility, along with low maintenance requirements and proven reliability, that make the ST desirable as the prime engine in a combined cycle power plant.

Several preferred embodiments of the present invention define a system whereby the exhaust gases enter into an HRSG as in the prior art. However, these exhaust gases typically contain a great deal of oxygen. In fact, the oxygen content of the air is typically reduced from a value of 21% in ambient air to a range of about 12% to 15% in a typical GT exhaust at full load. This leaves a great deal of oxygen remaining in the GT exhaust gases to burn additional fuel. If sufficient quantities of fuel are burned, all the steam that would have been produced as lower pressure steam in the prior art, can be upgraded to HP steam with the proper system modifications as described by the preferred embodiment of the present invention. In this manner, the HP steam flow is greatly increased, and the ST size relative to the gas turbine(s) (ST/GT power ratio) goes from a nominal 0.5 in the prior art to a value typically greater than 1.0. Therefore, rather than being primarily a GT cycle with a ST recovery cycle, the present invention is more like a conventional steam plant with additional GT power production and the ducting of exhaust gases from the GT into the steam power plant's boilers to preheat air and increase boiler efficiency. To maximize efficiency in several preferred embodiments of the present invention, a complete integration of the cycles is required, including utilization of waste heat, feedwater heating, and implementation of controls to optimize heat transfer.

Comparison of Prior Art to Exemplary Preferred Embodiments

As detailed, the prior art combined cycle technology evolved from smaller cogeneration plants. In the state-of-the-art combined cycle power plant from the prior art, the GT exhausts to an HRSG that is typically either two or three pressure levels. The steam from each of these pressure levels is then directed to the ST at the appropriate point corresponding to the pressure level of the HRSG section. Supplemental firing is utilized as a means to obtain higher output, but this done only intermittently to meet peak load, and is accomplished only with a reduction in thermal efficiency. Primary load control for the prior art combined cycle power plant is still achieved by modulating load on the GT(s). Single pressure level HRSGs can also be employed with a corresponding reduction in thermal efficiency. Higher pressure inlets to the steam turbine typically are not justified as the low volumetric flows to the ST offset any cycle gains from higher pressure by reduced turbine efficiency in the HP section.

With the prior art of combined cycle technology, the plant is primarily a GT based plant that added an HRSG to recover the waste heat. The ST is then designed to make the best of this recovered heat (which is converted to steam by the HRSG at multi-pressure levels). The typical ST/GT output ratio for these combined cycle plants is in the 40% to 60% range, with a typical number for a GE S207FA plant being approximately 0.57. With the need to utilize HP, IP, and LP steam, the ST has relatively low flows in the HP section and higher flows in the LP section. This reduces HP volumetric efficiency and increases the relative size and cost of the exhaust section(s). Feedwater heating is done in the HRSG and conventional ST extraction steam fed feedwater heating is not employed. Preheating of the feedwater from the condenser may be utilized, but the purpose for this process is not to enhance efficiency but to avoid condensation of water vapor in the exhaust gases. Since water is contained as humidity in the inlet air, and is also formed as a product of combustion of hydrocarbon fuels, this increased concentration of water vapor in the exhaust gases lowers the dew point. Cold feedwater direct from the condenser can cause condensation on the economizer tubes and fins. This condensation has been demonstrated to corrode these fins, lessen the heat exchange effectiveness, and cause detrimental effects in HRSG performance. Thus the use of a feedwater preheater may be utilized in some applications.

In summary, the combined cycle plant from the prior art is primarily a GT based plant with the steam cycle designed as a compromise between the best cycle efficiency and optimum exhaust gas heat recovery. There are options such as supplemental firing to increase plant rating by a nominal amount (typically less than 25%), but this additional power comes with a penalty on plant heat rate. Due to the rigidity of design of the GT, there is little flexibility in the rating or design of the combined cycle plant from the prior art. In essence, the prior art is a rigid power plant design based on the GT engine or set of engines, with an HRSG, and a ST rated nominally at 50% of the GT output. The ST operates in a dependent mode and follows the GT load.

In several preferred embodiments of the present invention, the GT exhausts to a single pressure level HRSG (or primarily single pressure level) that is designed for continuous supplemental firing. This supplemental firing increases the steam production by a significant amount, and subsequently increases the feedwater flows such that additional pressure levels in the HRSG are not required to cool the exhaust gases to optimum temperature (approximately 180° F.). Feedwater flows that exceed the optimum flow through the HRSG are directed to conventional ST extraction fed feedwater heaters to improve steam cycle efficiency. Due to the flexibility of design, the combined cycle described by several of the preferred embodiments of the present invention has a ST/GT output ratio that can vary from approximately 0.75 to 2.25. Of course, those skilled in the art will recognize that other output ratios are also possible and within the scope of the teachings of the present invention. For most load variations on the plant, the GT(s) remain primarily at or near their most efficient load (100%) and the supplemental firing rate is modulated to change the ST load.

In summary, several of the preferred embodiments of the present invention are in essence a large central steam power plant similar to those known in the prior art of steam power plants, with the boiler replaced by the HRSGs which continuously burn fuel, just like a boiler in a conventional steam plant. However, GTs have now been added to the cycle which provide oxygen rich (12–15%) hot gases to the boiler (HRSG), increasing its efficiency and allowing for the combustion of additional fuel. Feedwater heating is accomplished in both the HRSG low temperature sections and in conventional extraction steam fed feedwater heaters. The ST is larger with more mass flow through the HP and IP sections and less through the LP section (steam extracted for feedwater heating reduces exhaust end flow), increasing volumetric efficiency and decreasing relative exhaust size. Several preferred embodiments of the present invention become combined cycle power plants that are more flexible, have improved full and part load efficiency, and are less expensive to construct, operate, and maintain.

Major Equipment Maintenance Costs

Besides fuel and capital costs, another large expense for combined cycle power plants is the cost for maintenance, and especially maintenance on the major pieces of equipment such as the GT and the ST. These maintenance costs vary with the equipment model, its complexity, and degree of service (high temperature or low temperature, steady or cyclic duty, etc.). Typically maintenance costs are examined on a mills/kWh basis, where a mill is US$0.001 or 0.1 cents U.S. currency. Following is a list of expected maintenance costs for some major pieces of equipment, along with the annual expected maintenance costs based upon a normalized 200 MW output at 70% capacity (1,500,000,000 kWh per year):

| Description | Maintenance Rate (mills/kWh) | Annual Cost (US$) |
| --- | --- | --- |
| 2400 psig ST | 0.5 | 750,000 |
| GE Frame 7FA GT | 2.5 | 3,750,000 |
| Westinghouse 501G GT | 4.5 | 6,750,000 |

As can be seen from the maintenance numbers, it is much more expensive from a maintenance perspective to operate a GT than it is a ST. In addition, the advanced technology GT (model 501G) with its higher firing temperature, single crystalline blades, and steam cooled combustion section, is also projected to be an expensive piece of equipment from a maintenance perspective.

With the prior art, the GTs produce approximately 67% of the power, while the ST produces 33% (ST/GT output ratio of 0.5:1.0). Since the GTs are modulated to change load, and the ST follows, this ratio is fairly constant throughout the load range. Therefore, over a year of operation, in a combined cycle power plant in the prior art, the GT maintenance factor would be applied to 67% of the kWhs produced, and the ST maintenance factor to 33% of the kWhs produced.

With several of the preferred embodiments of the present invention, the ratios are not so simple, for as the total plant load changes, the ST output is modulated to the greatest extent possible, while the GTs are maintained at or near full load.

Part Load Efficiency Comparisons

The teachings of the present invention can be best explained in comparing the performance comparisons illustrated graphically in FIGS. 6, 15, 33, and 22–28.

FIG. 33 graphically illustrates the part load performance difference between two state-of-the-art conventional combined cycle power plants and two preferred embodiments of the present invention. This graph illustrates that the present invention performance is significantly superior to conventional combined cycle power plants at part load operation. As can be seen from a comparison of the tabulated data in FIG. 25 and FIG. 27, over the typical operation profile, the exemplary preferred embodiment of the present invention uses less fuel, costs about US$100 million less to construct, and has NOX emissions which are less than ⅓ of those in the Westinghouse combined cycle power plant. Thus, the present invention embodiment illustrated in FIG. 26 provides both significant cost savings and simultaneous savings in environmental pollution due to reduced NOX emissions.

This characteristic is generally a feature of the present invention teachings and is in essence the best of both worlds—economic efficiency with simultaneous reduction in pollution.

To utilize several of the preferred embodiments of the present invention, the HRSG must generally be of a more stout construction to handle the higher pressures and temperatures than required in the prior art. This can be accomplished in numerous ways. First, the use of a water-wall (vertical tubes filled with feedwater) may be needed to line the combustion area of the HRSG to protect it from the high combustion temperatures. As an alternative, the exhaust gases could first be cooled through the superheater section (to approximately 800° F.), then reheated to 1600° F. before continuing though the HRSG. Currently, 1600° F. seems to be the upper temperature limit that manufacturers specify for standard HRSG construction. Yet another alternative is the use of dual grids of duct burners in the HRSG. After the GT exhaust gases are heated to 1600° F., they are allowed to cool through the initial sections of the HRSG, then more fuel (heat) is added through combustion at a point downstream. This adds approximately twice the heat as one grid burner without exceeding any limiting HRSG temperatures.

CONCLUSION

The present invention permits a wide variety of applications, but it must be noted in summary that the use of the present invention in the field of combined cycle power plants is particularly advantageous in light of current trends in the power generation industry. While the prior art has in general taught away from the use of supplemental firing of HRSGs as a means of increasing overall plant efficiency, the present invention has embraced this concept.

Within the context of an overall improvement in system efficiency, the present invention promotes the use of supplemental firing not to generate more steam as in past power generation applications, but the generation of more high quality steam. By this it is meant that by expending additional fuel in the supplemental firing of the HRSG it is possible to generate steam which is more energetic and thus capable of more efficiently generating power when used in conjunction with a suitably designed bottoming cycle engine.

While the present invention when used in the context of power generation will require the construction of HRSGs which can sustain higher temperatures than are currently the norm, the materials to accomplish this are readily available and both steam plants and HRSGs in the prior art have demonstrated at these elevated temperature levels. Furthermore, data in this disclosure indicates that in many circumstances these HRSGs will be smaller than existing units, meaning that construction and maintenance costs may be comparable to or even lower than existing units. In addition, the fact that the HRSGs in this application may in many cases be of the single pressure variety may in some circumstances provide some economy in their design and construction.

It must be stressed that the potential energy density of the present invention has significant ramifications in regard to the amount of support hardware required to implement a power plant. To achieve reasonable overall efficiency, conventional plants make use of a number of GTs and STs so that when these units are operated at part load that the overall system can be operated with reasonable efficiency. This is primarily because operating the GT at a part load is in general very inefficient. The present invention circumvents this environmentally detrimental effect by endeavoring to operate all GTs at their optimal efficiency (both economic and environmental), thus allowing fewer operating GTs to achieve the same overall efficiency and environmental impact while consuming fewer support resources.

These efficiency enhancements of the present invention are further supplemented by a mechanism whereby the capacity of the plant may be temporarily expanded beyond its normal nominal rating, albeit at a lower efficiency level. This extension of the plant rating to support higher loads can be a critical factor in the economics of power plant construction, because the environmental and logistical hurdles that must be overcome to actually construct new power plants are becoming the paramount economic issues barring new plant construction. As such, the present invention permits the useful performance of a given power plant configuration to be extended beyond that of a conventional power plant, thus permitting the plant rating to be dynamically adapted to meet temporary overload conditions. This capability can have dramatic economic cost and environmental savings in that the present invention permits the incremental economic and environmental costs to be reduced in the face of a demand for a temporary increase in plant output.

Finally, it must be stressed that while past power plant designs have endeavored to optimize their operation based on fuel costs alone, the power plants of the future must incorporate and optimize costs of capital, environmental impacts, real estate costs, regulatory costs, and the ever increasing costs of technology and support machinery. It is the intent of the present invention to address all of these factors in unison and obtain an overall plant design that is a cost effective, power efficient, and environmentally friendly method of generating power.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A combined cycle power plant system comprising:
   two gas turbines configured to produce shaft work and exhaust gas;
   two supplementary fired heat recovery steam generators associated with respective said gas turbines, said heat recovery steam generators being configured to receive feedwater and to generate steam at predominantly a single pressure level using heat from said exhaust gas and from supplemental firing;
   a steam turbine configured to receive said steam from respective said heat recovery steam generators and to produce shaft work, wherein the operational ratio of the rated output of said steam turbines to said gas turbines (ST/GT) is at least about 0.75; and
   a control configured to control at least one of supplemental firing of said heat recovery steam generator and flow of said feedwater such that a balance is maintained between exhaust gas flow and feedwater flow.

2. The combined cycle power plant system of claim 1 wherein each of said heat recovery steam generators is configured to be substantially continuously fired.

3. The combined cycle power plant system of claim 1 further comprising parallel feedwater loops configured to divert said feedwater from respective said heat recovery steam generators and configured to preheat said feedwater in said parallel feedwater loop using steam turbine extraction steam.

4. The combined cycle power plant system of claim 1 wherein said control is configured to control at least one of supplemental firing and flow of feedwater such that a ratio of mass flow through said heat recovery steam generators of said feedwater to mass flow through said heat recovery steam generators of said exhaust gas is substantially equal to a ratio of heat capacity of said exhaust gas to heat capacity of said feedwater.

5. The combined cycle power plant system of claim 1 wherein said heat recovery steam generators include a high pressure evaporator, and wherein said control is configured to control at least one of supplemental firing and flow of feedwater such that said feedwater flow downstream of said high pressure evaporator is nominally about four times said exhaust gas flow.

6. The combined cycle power plant system of claim 1 wherein said heat recovery steam generators are single pressure level heat recovery steam generators.

7. The combined cycle power plant system of claim 1 wherein said heat recovery steam generators are multiple pressure level heat recovery steam generators configured to be operated at predominantly a single pressure level.

* * * * *